US008344068B2

(12) United States Patent
Michie, Jr. et al.

(10) Patent No.: US 8,344,068 B2
(45) Date of Patent: *Jan. 1, 2013

(54) POLYETHYLENE COMPOSITIONS, METHODS OF MAKING THE SAME, AND ARTICLES PREPARED THEREFROM

(75) Inventors: William J. Michie, Jr., Missouri City, TX (US); Dane Chang, Sugar Land, TX (US); Lonnie G. Hazlitt, Lake Jackson, TX (US); Stephanie M. Whited, Charleston, WV (US); Michael A. Kinnan, North Canton, OH (US); Anthony C. Neubauer, Piscataway, NJ (US); Thoi H. Ho, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 532 days.

This patent is subject to a terminal disclaimer.

(21) Appl. No.: 12/446,652

(22) PCT Filed: Oct. 19, 2007

(86) PCT No.: PCT/US2007/081893
§ 371 (c)(1),
(2), (4) Date: Apr. 22, 2009

(87) PCT Pub. No.: WO2008/051824
PCT Pub. Date: May 2, 2008

(65) Prior Publication Data
US 2010/0003439 A1 Jan. 7, 2010

Related U.S. Application Data

(60) Provisional application No. 60/853,652, filed on Oct. 23, 2006.

(51) Int. Cl.
C08F 8/00 (2006.01)
C08L 23/04 (2006.01)
(52) U.S. Cl. ........................................ 525/191; 525/240
(58) Field of Classification Search .................. 525/191, 525/240
See application file for complete search history.

(56) References Cited

U.S. PATENT DOCUMENTS

| 5,189,106 A | 2/1993 | Morimoto et al. |
| 5,250,612 A | 10/1993 | Hazlitt et al. |
| 5,338,589 A | 8/1994 | Bohm et al. |
| 5,380,803 A | 1/1995 | Coutant et al. |
| 6,770,341 B1 | 8/2004 | Bohm et al. |
| 7,714,072 B2 | 5/2010 | Michie, Jr. et al. |
| 2004/0034169 A1* | 2/2004 | Zhou et al. ............. 525/240 |
| 2004/0158011 A1 | 8/2004 | Jain et al. |
| 2004/0266966 A1 | 12/2004 | Schramm et al. |
| 2005/0261435 A1 | 11/2005 | Starita |
| 2008/0221273 A1 | 9/2008 | Michie, Jr. et al. |
| 2009/0246433 A1 | 10/2009 | Michie et al. |
| 2010/0203311 A1* | 8/2010 | Michie, Jr. ............. 428/220 |

FOREIGN PATENT DOCUMENTS

| EP | 0066973 A1 | 12/1982 |
| EP | 0423962 A2 | 4/1991 |
| EP | 0492656 A1 | 7/1992 |
| JP | 07-268141 A | 10/1995 |
| JP | 08-134285 A | 5/1996 |
| JP | 11-106574 | 4/1999 |
| JP | 2003-128848 A | 5/2003 |
| JP | 2003-253063 A | 9/2003 |
| JP | 2003-321583 A | 11/2003 |
| JP | 2004-217802 A | 8/2004 |
| JP | 2004-231844 A | 8/2004 |
| WO | WO-97/29152 A2 | 8/1997 |
| WO | WO-99/14271 | 3/1999 |
| WO | WO-00/01765 A1 | 1/2000 |
| WO | WO-00/18814 A1 | 4/2000 |
| WO | WO-00/40620 A1 | 7/2000 |
| WO | WO 01/02480 A1 | 1/2001 |
| WO | WO-01/25328 A1 | 4/2001 |
| WO | WO-02/34829 | 5/2002 |
| WO | WO-03/016396 A1 | 2/2003 |
| WO | WO-03/020821 A1 | 3/2003 |
| WO | WO-03/033586 A1 | 4/2003 |
| WO | WO-03/051937 A1 | 6/2003 |
| WO | WO-03/102075 A1 | 12/2003 |

OTHER PUBLICATIONS

PCT/US2007/081893 International Preliminary Report on Patentability.
PCT/US2007/081893 International Search Report.
PCT/US2007/081893 Written Opinion.

* cited by examiner

*Primary Examiner* — Nathan M Nutter

(57) ABSTRACT

The invention is related to compositions suitable for the fabrication of pipes, and other articles, with excellent performance properties. The invention provides a composition, comprising a blend, wherein said blend comprises a high molecular weight ethylene-based interpolymer and a low molecular weight ethylene-based interpolymer, and the high molecular weight ethylene-based interpolymer is a heterogeneously branched linear or a homogeneously branched linear ethylene-based interpolymer, and has a density from 0.922 g/cc to 0.929 g/cc, and a high load melt index (I21) from 0.2 g/10 min to 1.0 g/10 min, and the low molecular weight ethylene-based interpolymer is heterogeneously branched linear or a homogeneously branched linear ethylene-based interpolymer, and has a density from 0.940 g/cc to 0.955 g/cc, and a melt index (I2) from 6 g/10 min to 50 g/10 min. The blend has a single peak in an ATREF profile eluting above 30° C., and has a coefficient of viscosity average molecular weight (CM?) less than −0.0032 in the log(calculated Mv) versus elution temperature, said CMv calculated in the range of elution temperatures from 70° C. to 90° C. The Mv is the viscosity average molecular weight.

47 Claims, 33 Drawing Sheets

Sample I513

Sample I922

Sample C453

Sample C510

Sample C512

Sample C588

Sample C589

Sample C591

Sample C592

Sample C916

Sample C923

Sample Com049

Sample Com769

Profilometry Experimental

POLYETHYLENE COMPOSITIONS, METHODS OF MAKING THE SAME, AND ARTICLES PREPARED THEREFROM

REFERENCE TO RELATED APPLICATIONS

This application claims the benefit of U.S. Provisional Application No. 60/853,652, filed on Oct. 23, 2006, and U.S. Provisional Application No. 60/943,680, filed on Jun. 13, 2007; each application is fully incorporated herein by reference.

The present invention provides polyethylene resins, compositions comprising the same, and articles prepared from the same. The compositions of the invention are particularly suitable for use in pipes, pipe coatings drip irrigation tape and tubing, films, and geomembranes.

Polyethylene compositions with a multimodal molecular weight distribution (MWD), for example a bimodal MWD, can offer distinct advantages compared with unimodal polyethylenes or other polyolefins, in various applications, including film, pipe, and drip tape and tubing applications. Some multimodal polyethylenes compositions for use in pipes are described in the following International Publications: WO 03/020821; WO 03/102075; WO 97/29152; WO 00/01765; WO 00/18814; WO 01/02480; WO 01/25328; WO03/051937; WO03/033586; WO00/40620; U.S. Pat. No. 6,248,831; Japanese Publication Nos. 2004-217802 (Abstract); 2004-231844 (Abstract); 2003-253063 (Abstract); 2003-128848 (Abstract); 08-134285 (Abstract); and EP0492656B1.

Polyethylene pipes should have the following characteristics: (1) an impact resistance sufficient to endure impacts during installation and long-term use, (2) excellent long-term durability under gas or water pressure (specifically, environmental stress cracking resistance (ESCR), slow crack growth (SCG) resistance, rapid crack propagation (RCP) resistance, and internal pressure creep resistance), and (3) excellent properties at burst performance temperatures of 23° C. and 60° C., and excellent stabilization against thermal and oxidative degradation during extrusion, and end use applications, like for pipe, drip tape and tubing applications and domestic pipes, where resistance to degradation from oxygen and chlorinated water environments at elevated temperatures (up to 70° C. to 90° C.) is required. Further, in the manufacture of the pipes, the pipe resin must exhibit excellent sag resistance from gravity flow for successful extrusion of large diameter heavy wall pipe, with minimum wall thickness eccentricity. Likewise, film resins need to exhibit an improved balance of extrudability, bubble stability, dart drop, tensile and tear properties and FAR (Film Appearance Rating), while being able to be successfully extruded at all commercially required line speeds.

There is a need for a medium density polyethylene (MDPE) natural gas pipe resin for the industry, which offers an advantageously balanced combination of thermal, mechanical, and processing properties. There is also a need for pipes that have better durability or better resistance to slow crack growth (SCG), better resistance to rapid crack propagation (RCP), improved resins stabilization, and better long term burst performance at 60° C. and higher temperatures, with good long term burst performance at 23° C. Some of the pipe technology used today can achieve good performance in SCG, RCP, and 23° C. long term burst performance, but lacked the equivalent long term burst performance at 60° C. burst. Other pipe technology used today can achieve good long term burst performance at 23° C. and at 60° C. and SCG, but lack superior SCG and RCP performance. A main objective of this invention to provide compositions that can be used in the formation of pipes that satisfy the performance needs of improved SCG, RCP and long term burst performance at 60° C. and higher temperatures, while maintaining good long term performance at 23° C. The compositions of the references noted above do not fulfill the combination of compositional features and properties of the inventive compositions and articles described below.

SUMMARY OF THE INVENTION

The invention provides a composition, comprising a blend, wherein said blend comprises a high molecular weight ethylene-based interpolymer and a low molecular weight ethylene-based interpolymer, and wherein the high molecular weight polyethylene-based interpolymer is a heterogeneously branched linear or a homogeneously branched linear ethylene-based interpolymer, and has a density from 0.922 g/cc to 0.929 g/cc, and a high load melt index (I21) from 0.2 g/10 min to 1.0 g/10 min, and wherein the low molecular weight ethylene-based interpolymer is heterogeneously branched linear or a homogeneously branched linear ethylene-based interpolymer, and has a density from 0.940 g/cc to 0.955 g/cc, and a melt index (I2) from 6 g/10 min to 50 g/10 min; and wherein the blend has a single peak in an ATREF profile eluting above 30° C., and has a coefficient of viscosity average molecular weight (CMv) less than −0.0032 in the log (calculated Mv) versus elution temperature, said CMv calculated in the range of elution temperatures from 70° C. to 90° C., and wherein Mv is the viscosity average molecular weight.

In another aspect, the invention provides a method of preparing a composition, comprising a blend, wherein said blend comprises a high molecular weight ethylene-based interpolymer and a low molecular weight ethylene-based interpolymer, said method comprising:

a) polymerizing either the high molecular weight ethylene-based interpolymer, or the low molecular weight ethylene-based interpolymer, in a first reactor, in the presence of a Ziegler-Natta catalyst system, to form a first interpolymer product;

b) transferring the first interpolymer product to another reactor; and c) polymerizing, in the other reactor, the ethylene-based interpolymer that was not produced in the first reactor, in the presence of the Ziegler-Natta catalyst system; and wherein the high molecular weight ethylene-based interpolymer is a heterogeneously branched linear ethylene-based interpolymer, and has a density from 0.922 g/cc to 0.929 g/cc, and a high load melt index (I21) from 0.2 g/10 min to 1.0 g/10 min, and wherein the low molecular weight ethylene-based interpolymer is heterogeneously branched linear ethylene-based interpolymer, and has a density from 0.940 g/cc to 0.955 g/cc, and a melt index (I2) from 6 g/10 min to 50 g/10 min; and wherein the blend has a single peak in an ATREF profile eluting above 30° C., and has a coefficient of viscosity average molecular weight (CMv) less than −0.0032 in the log (calculated Mv) versus elution temperature, said CMv calculated in the range of elution temperatures from 70° C. to 90° C., and wherein Mv is the viscosity average molecular weight.

In yet another aspect, the invention provides for articles, each comprising at least one component formed from an inventive composition as described herein.

DETAILED DESCRIPTION OF THE INVENTION

Figure 1:
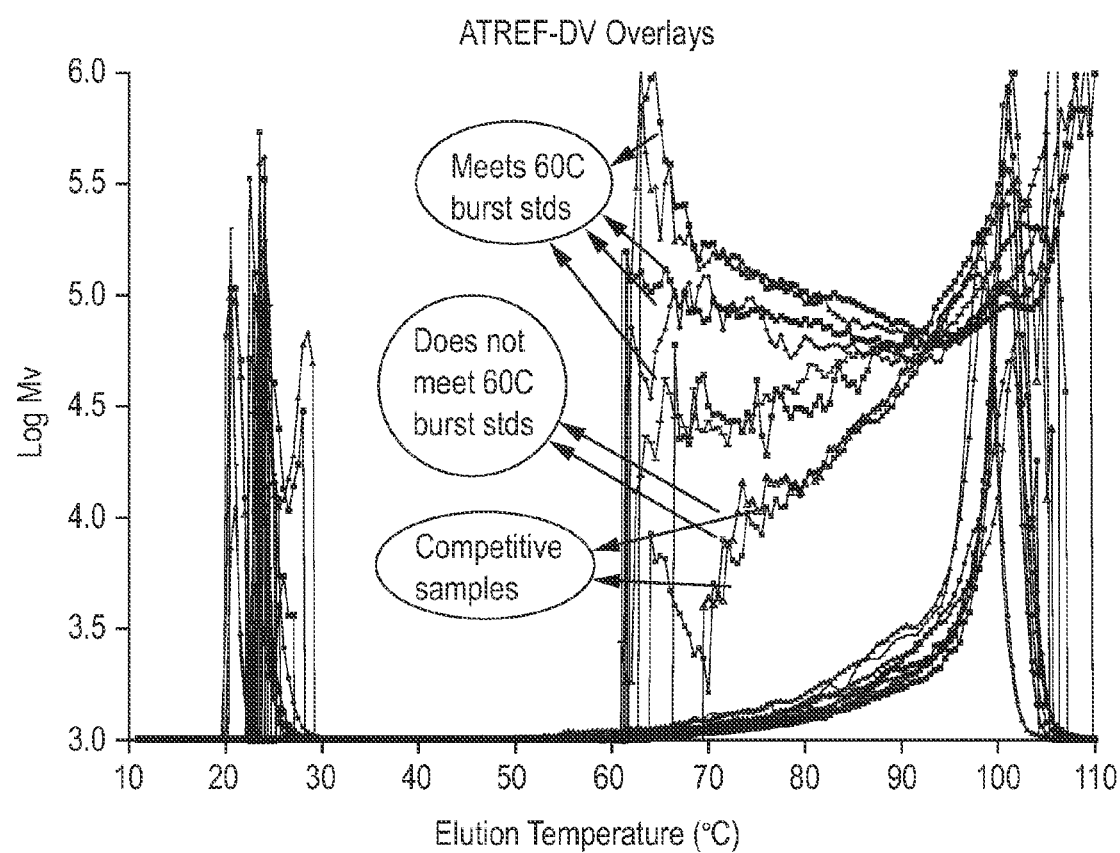
FIG. 1 depicts ATREF-DV profiles of several blends and competitive resins.
Figure 2:
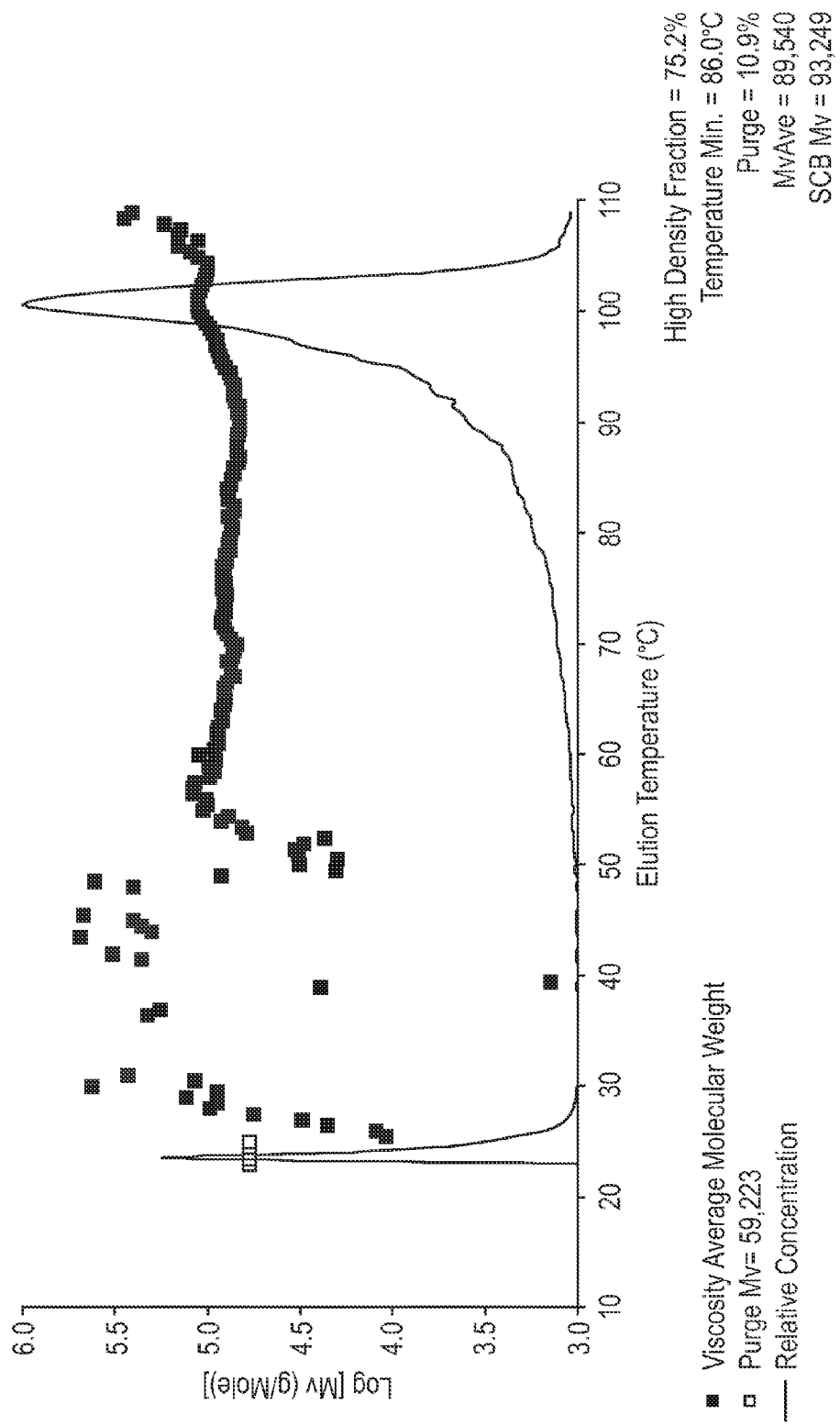
FIGS. 2-29, each depicts an ATREF-DV overlay profile for one blend or a competitive resin.
Figure 3:
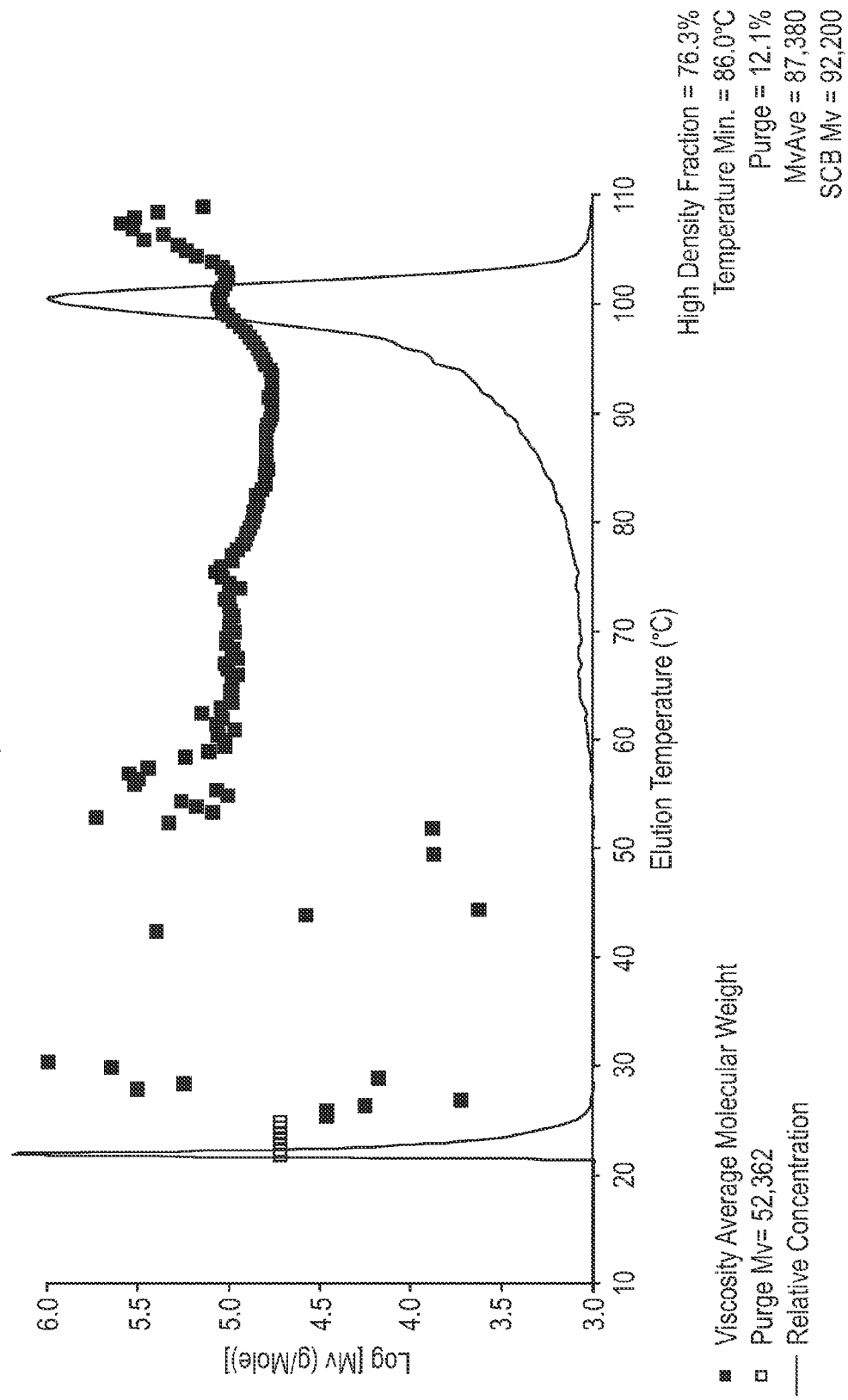
Figure 4:
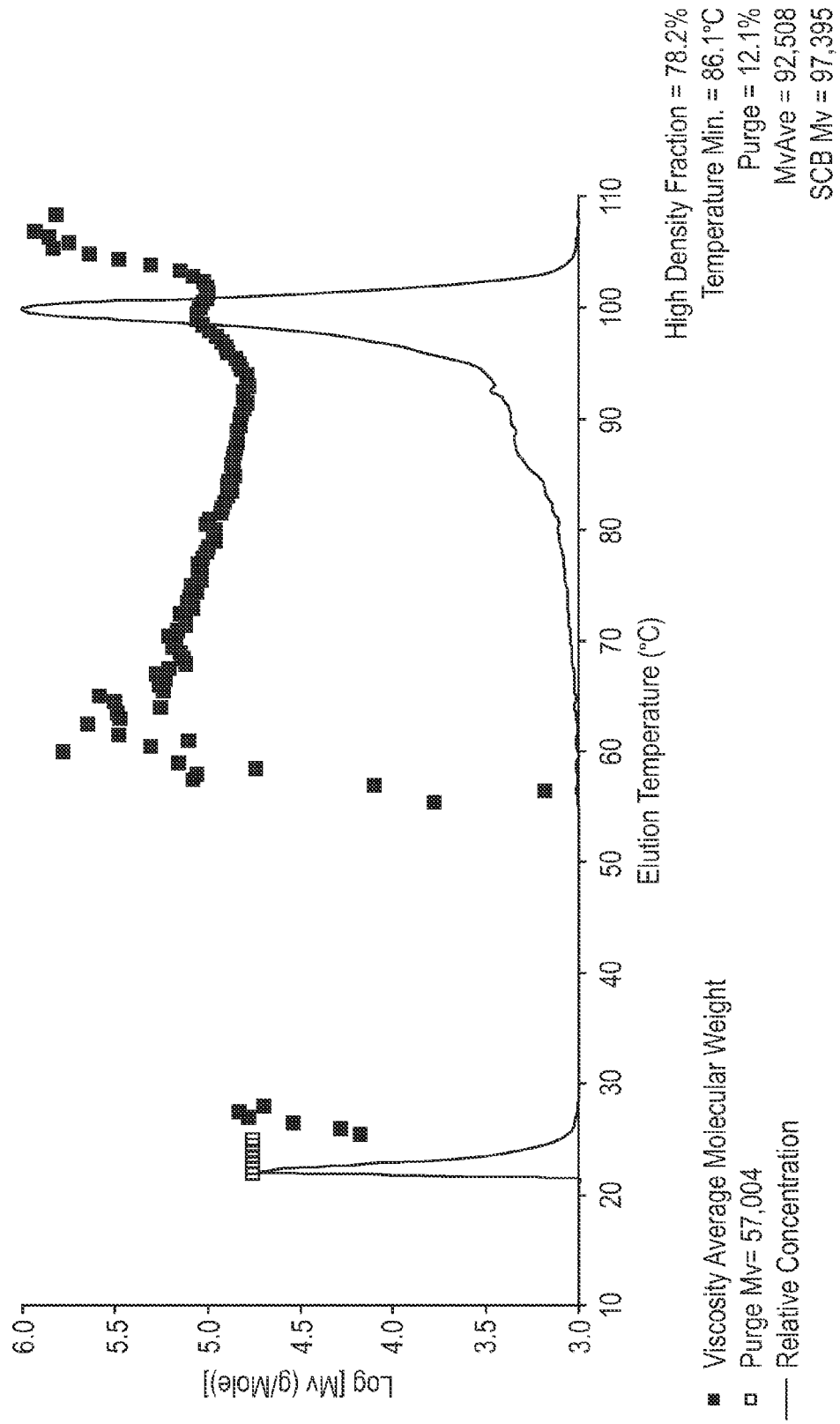
Figure 5:
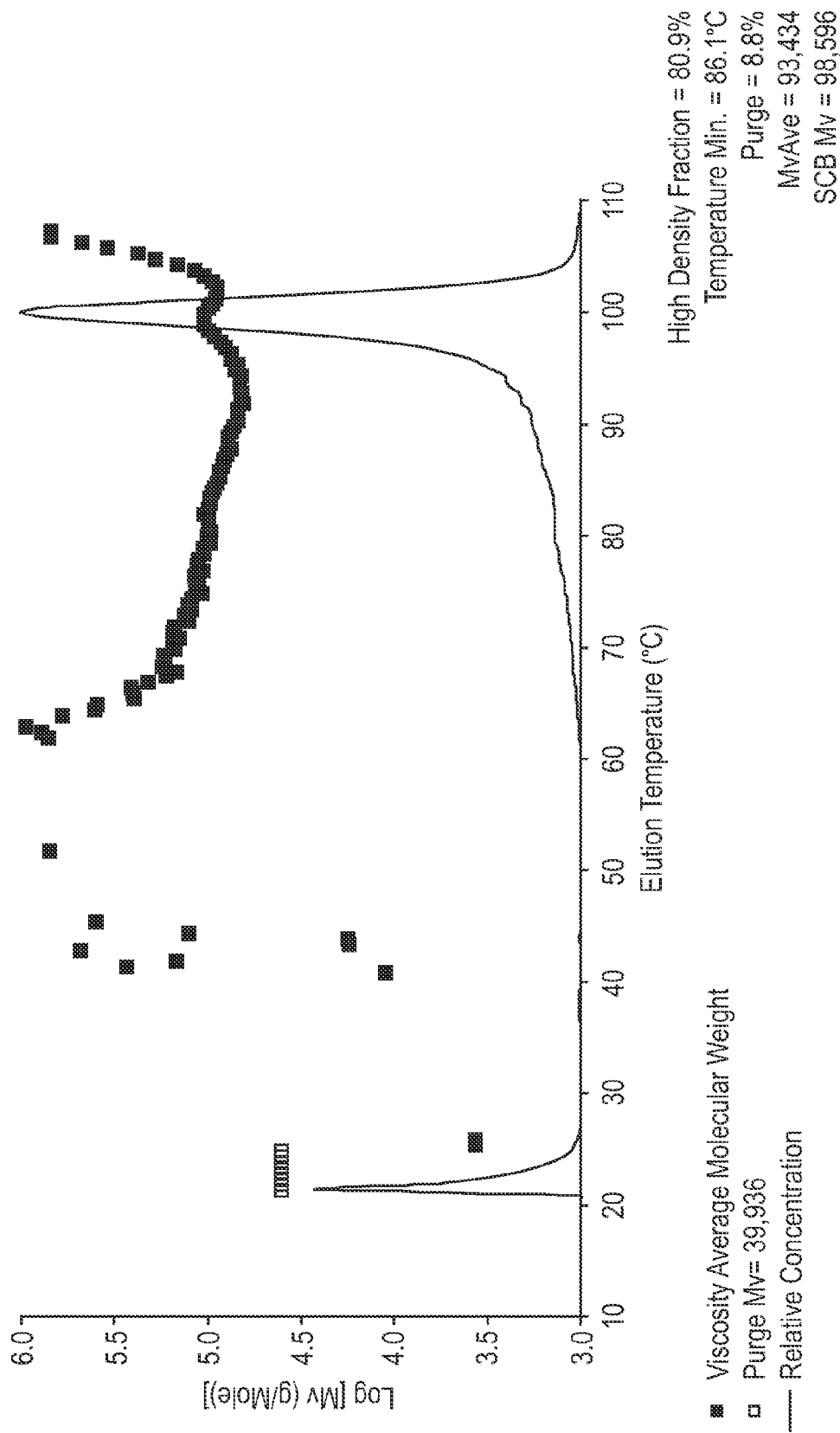
Figure 6:
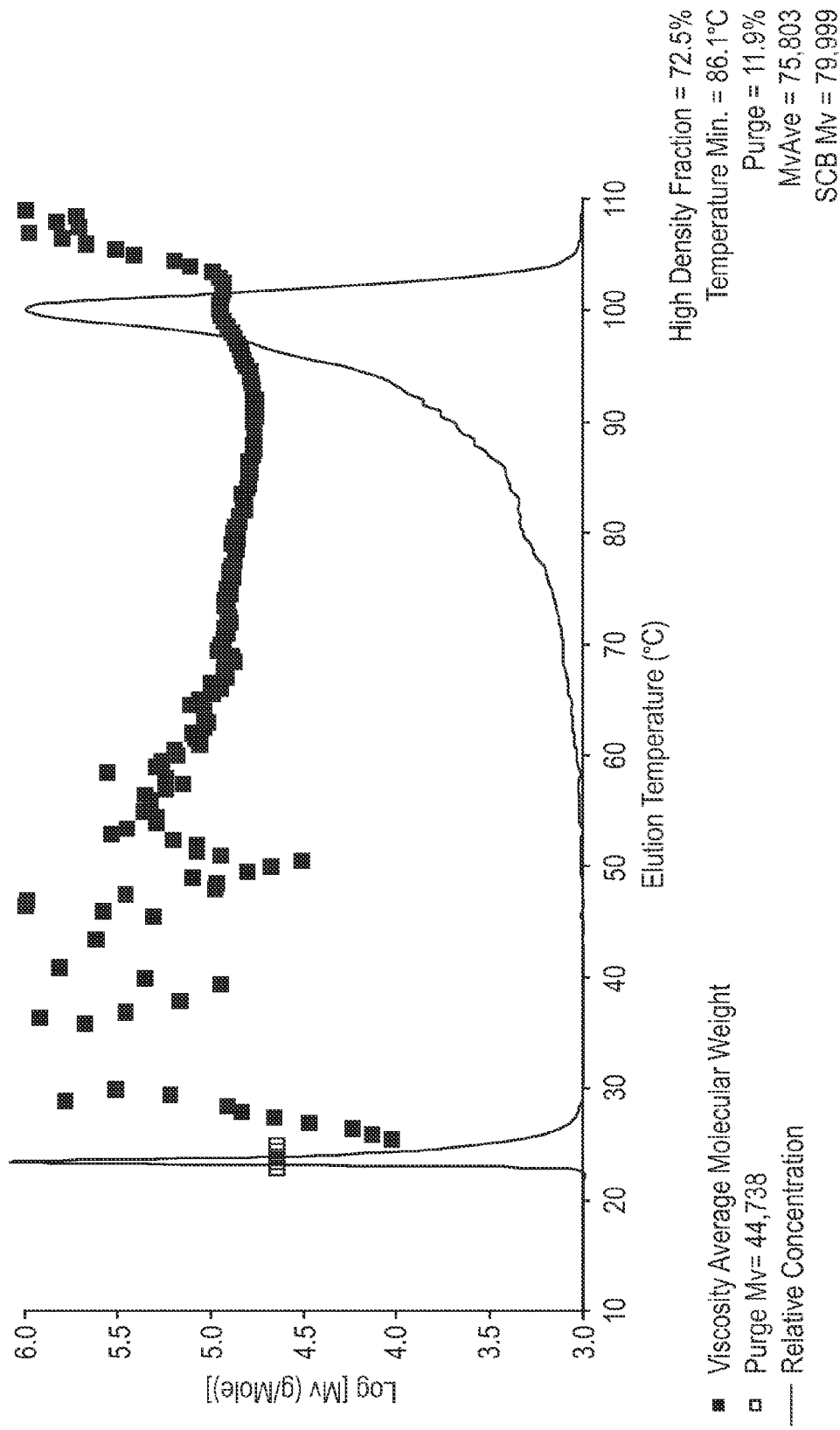
Figure 7:
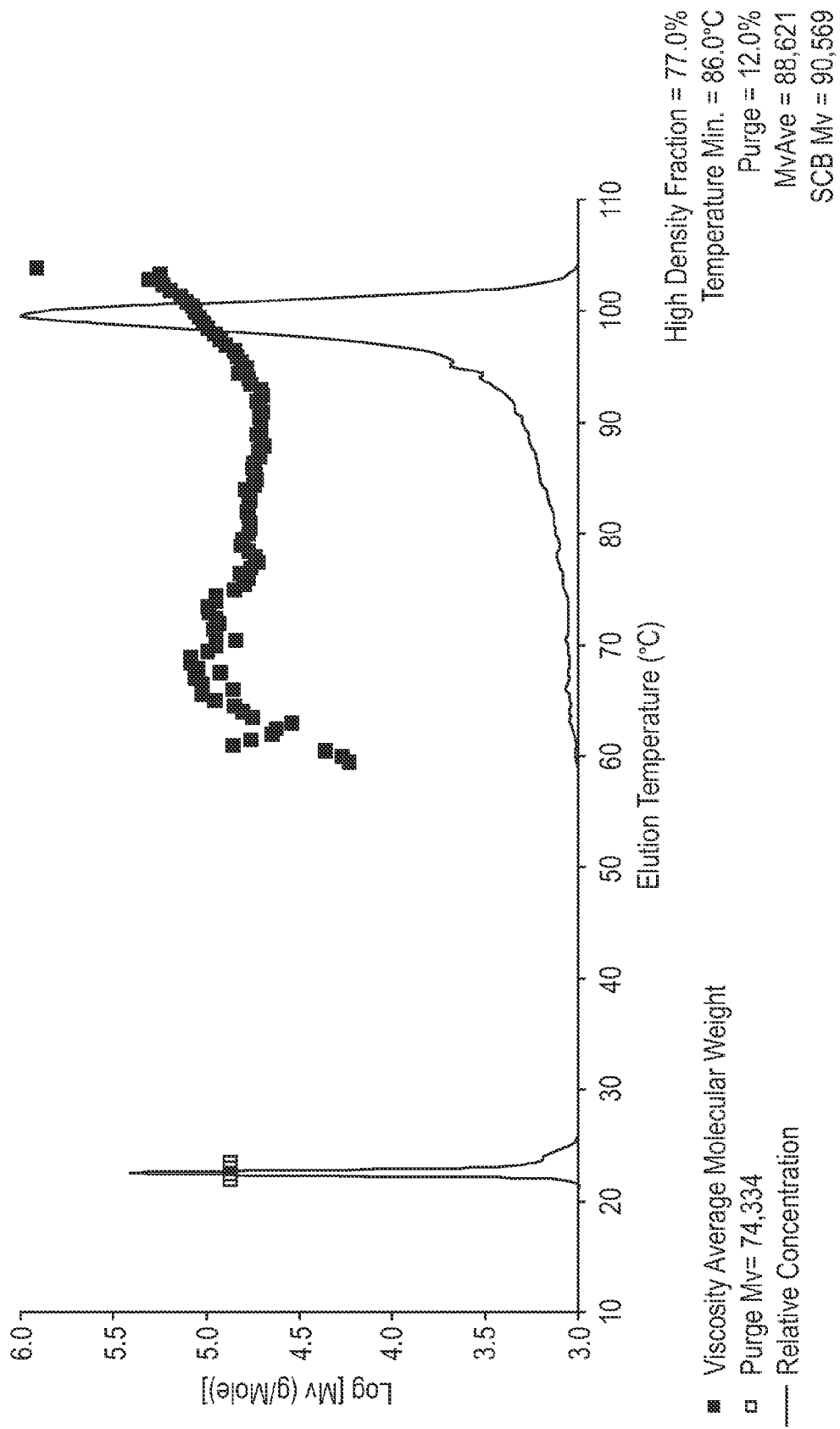
Figure 8:
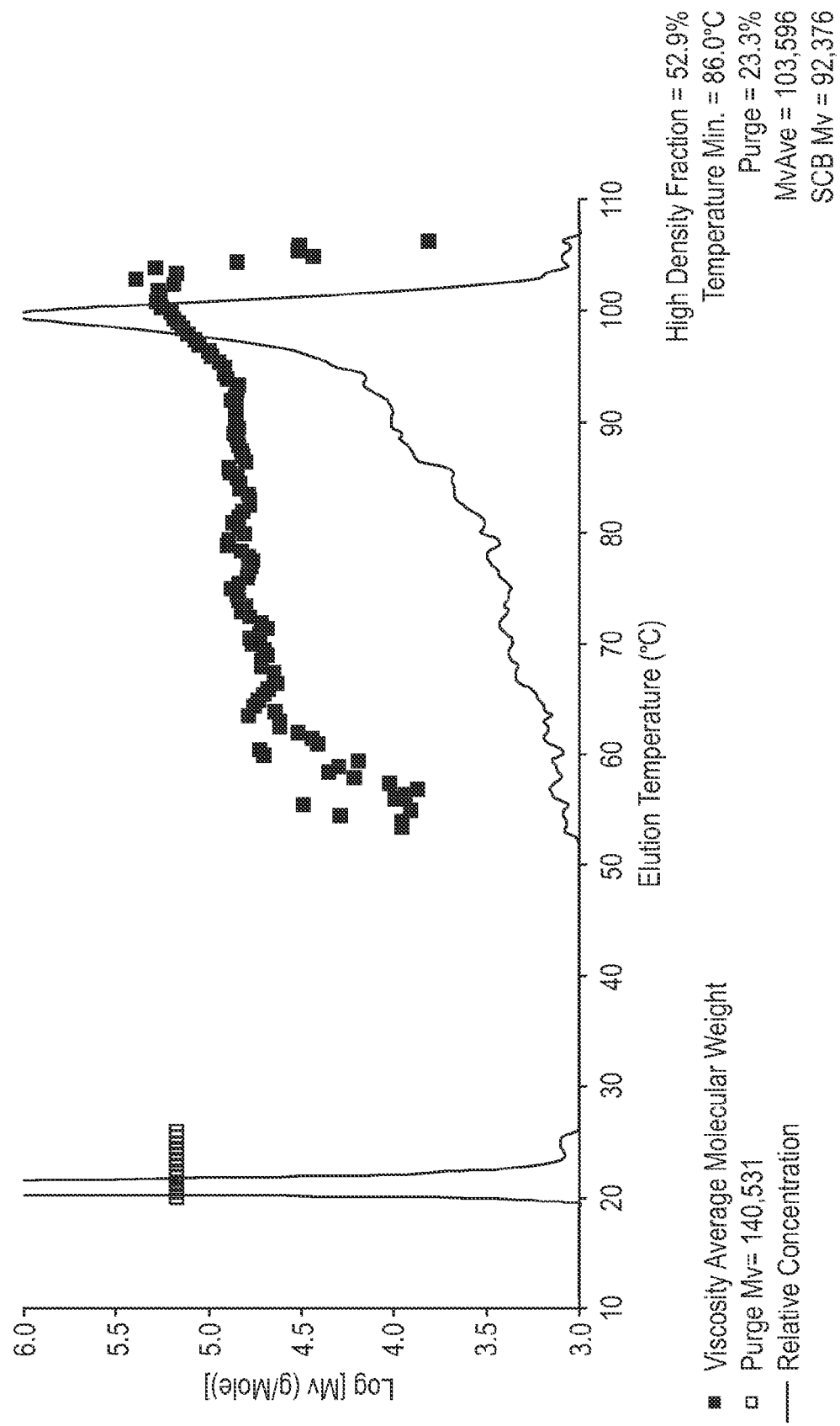
Figure 9:
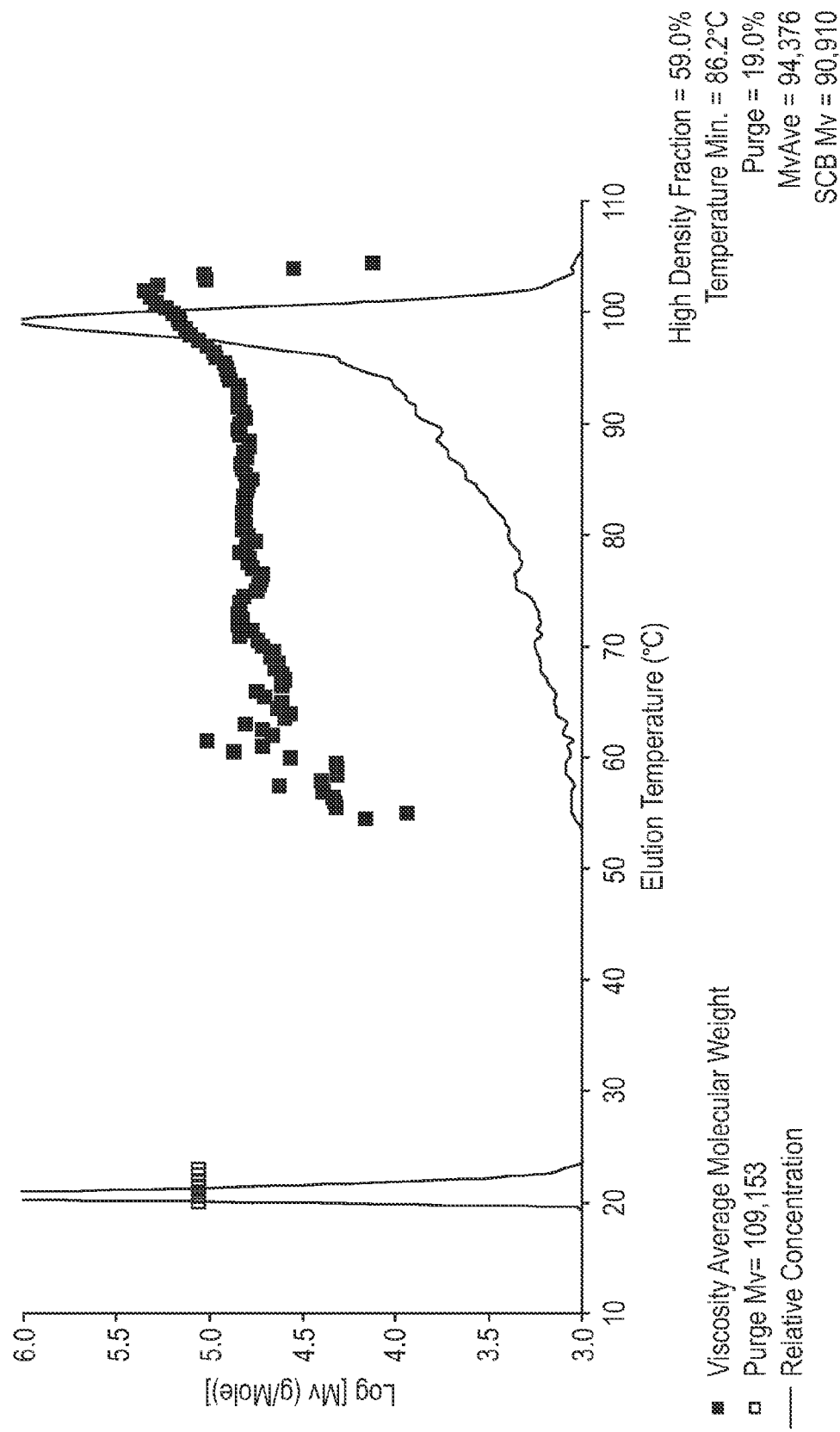
Figure 10:
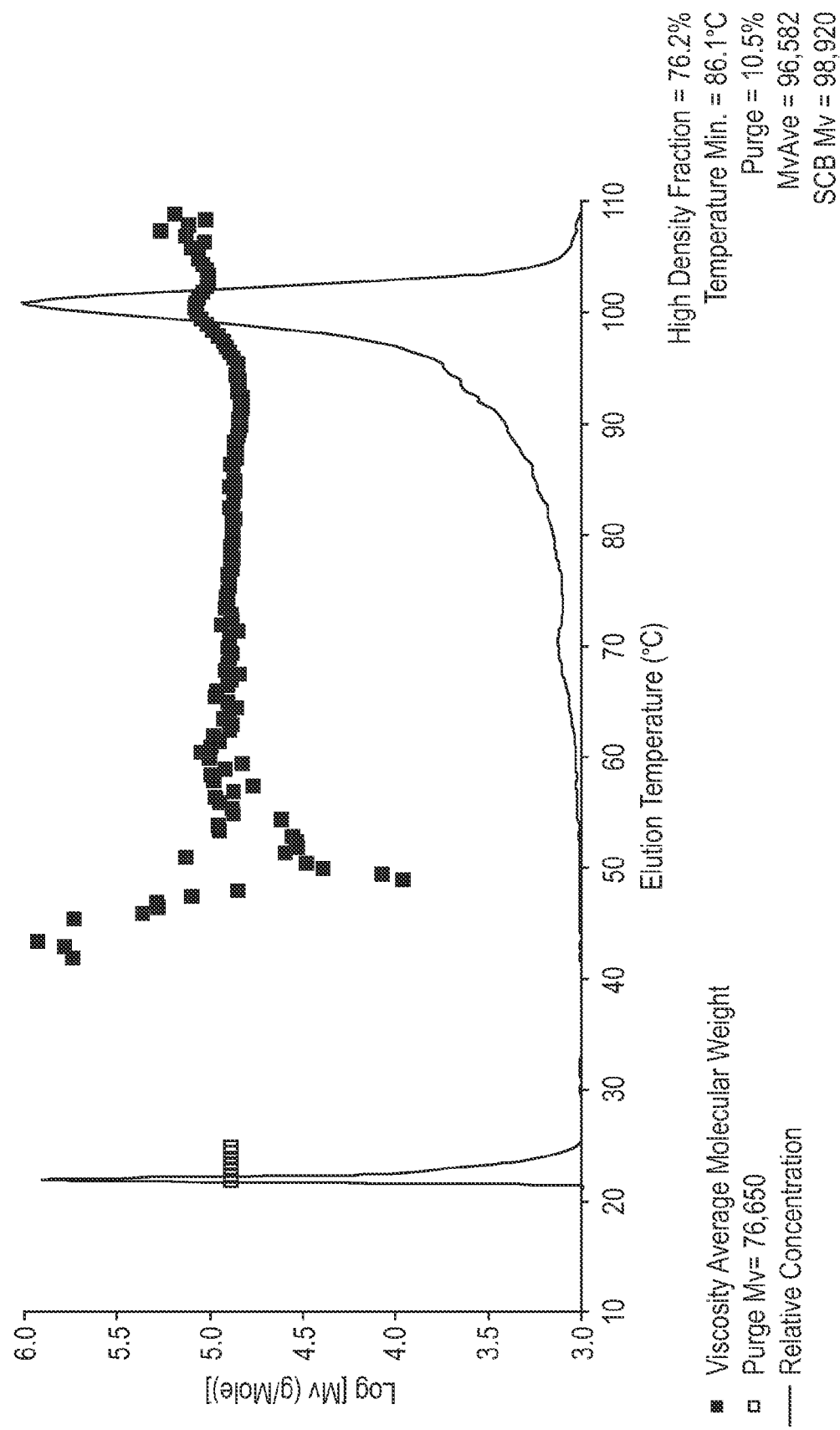
Figure 11:
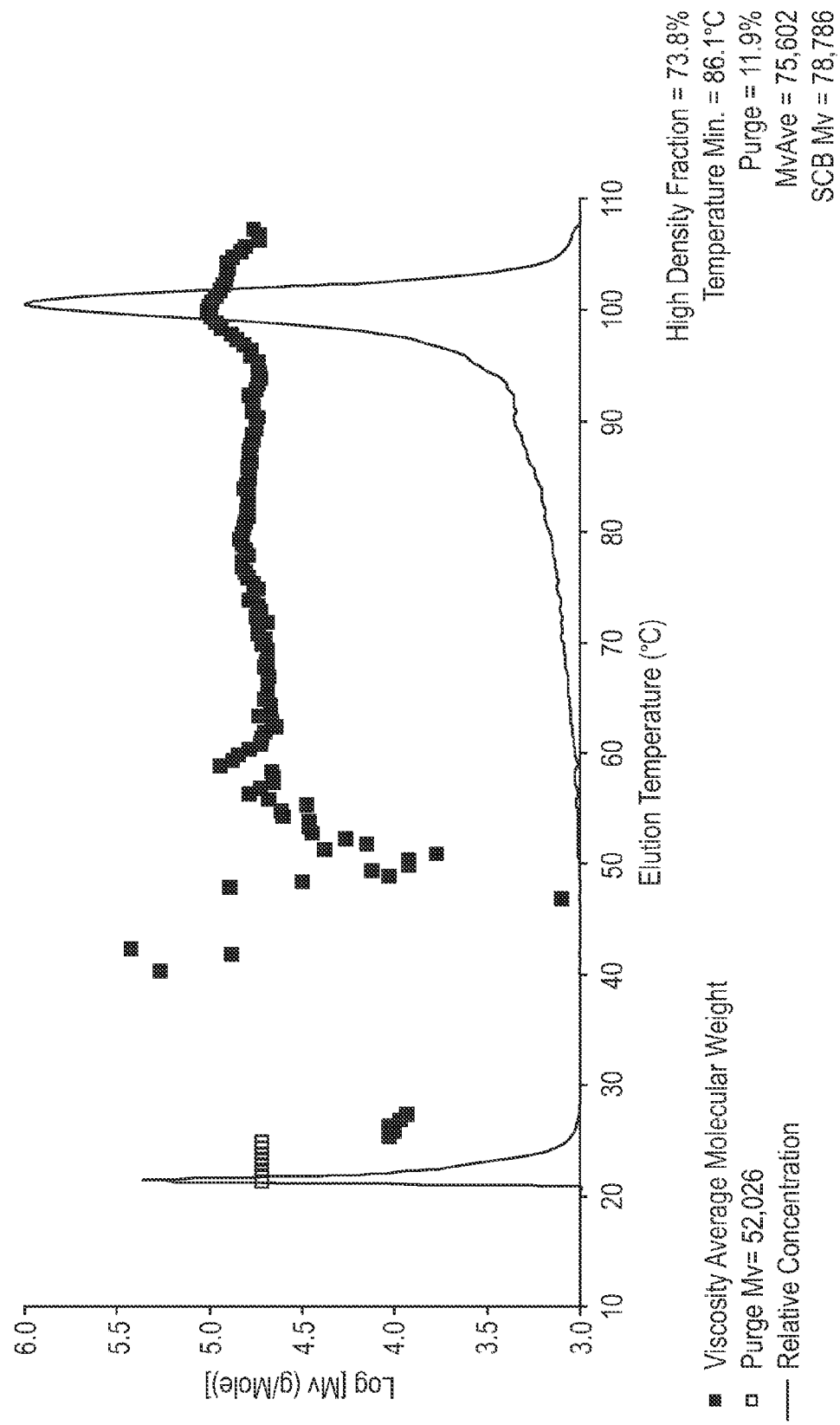
Figure 12:
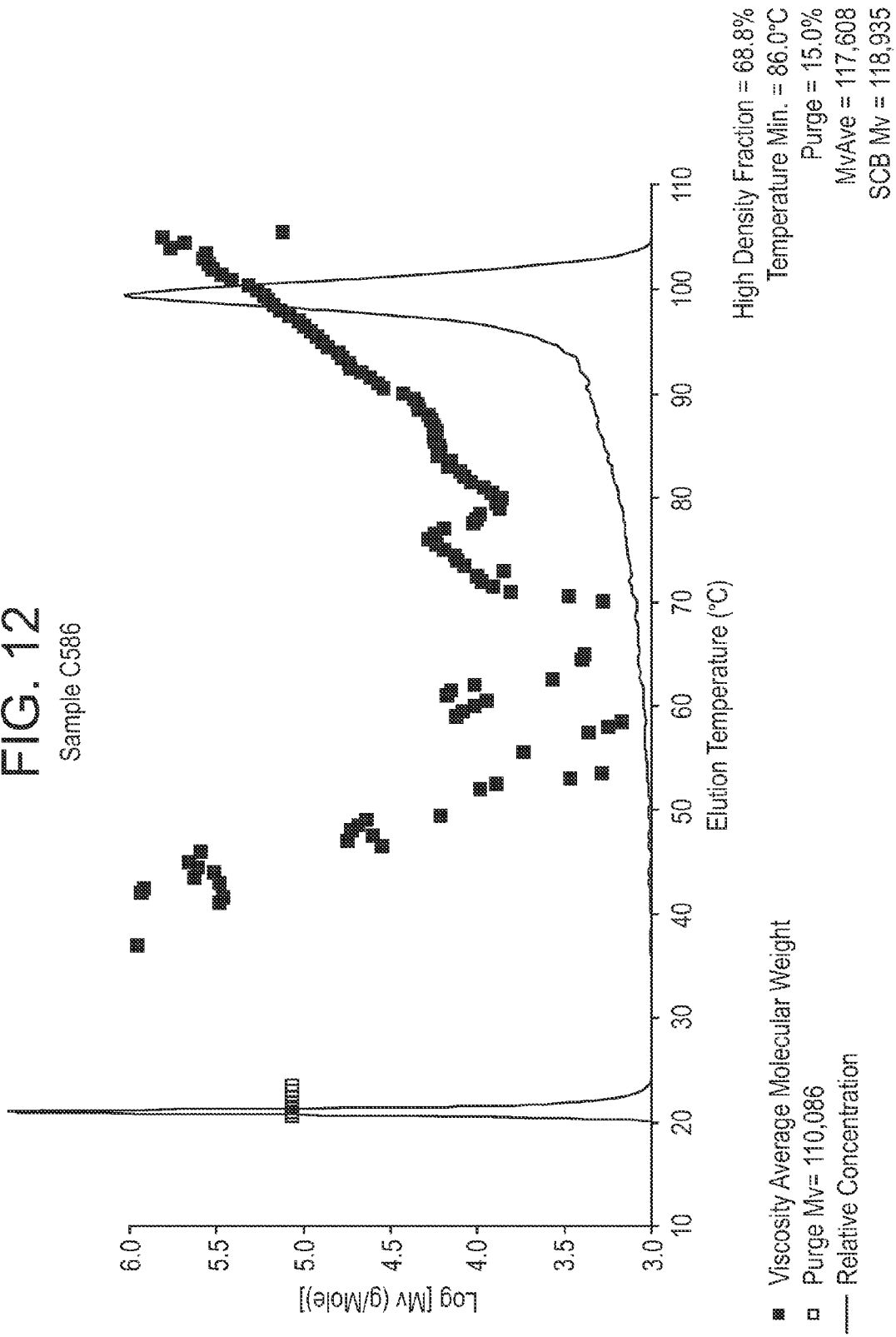
Figure 13:
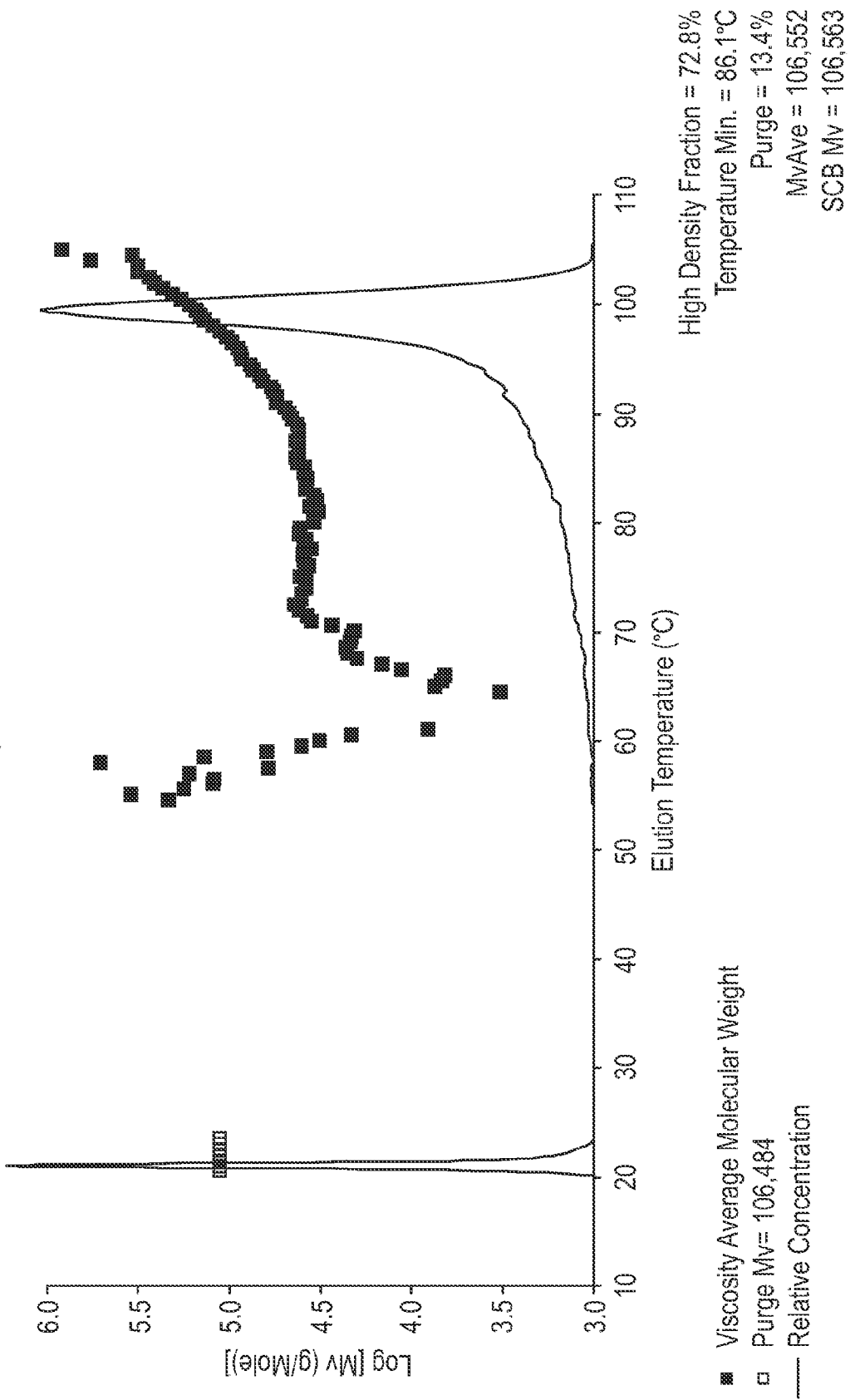
Figure 14:
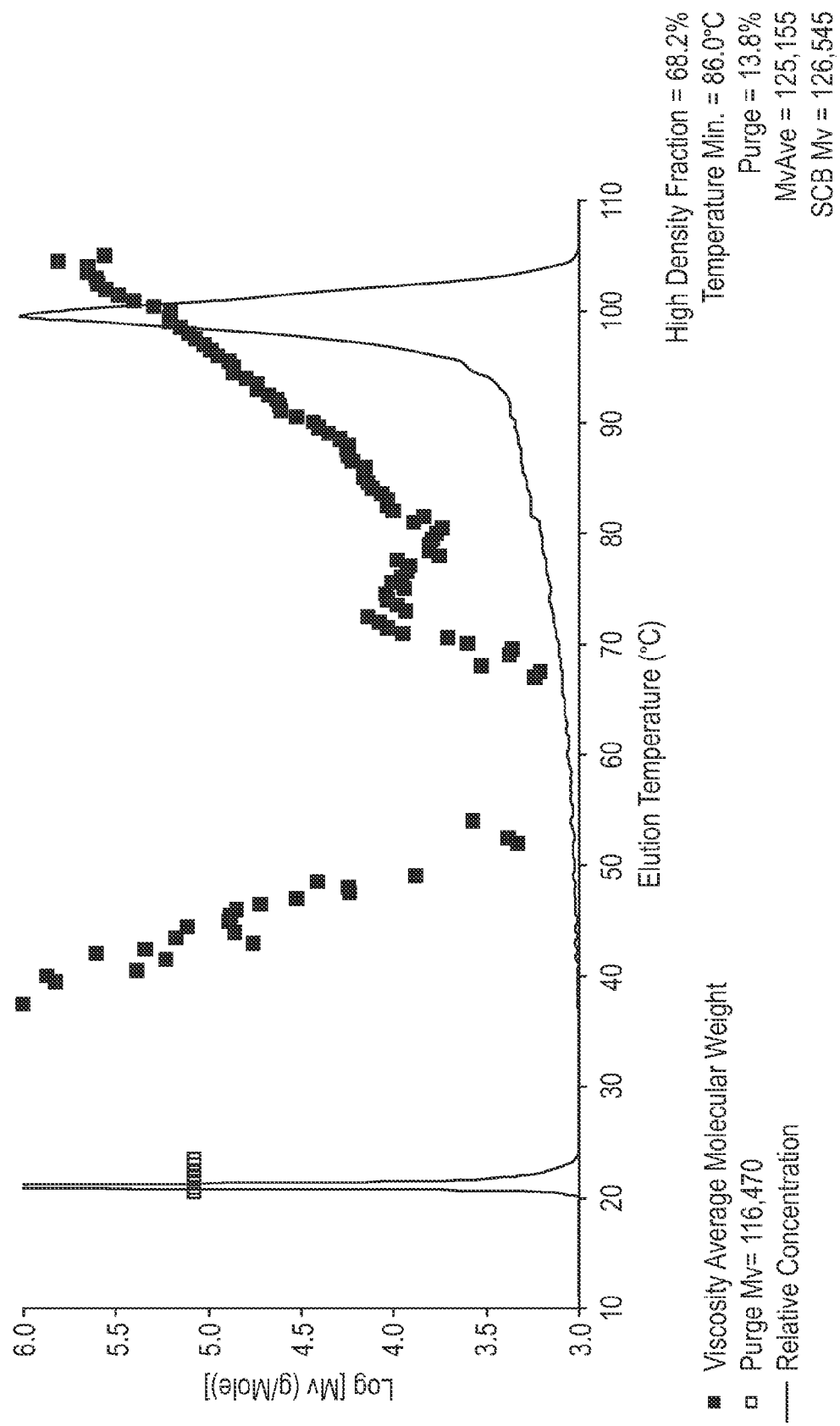
Figure 15:
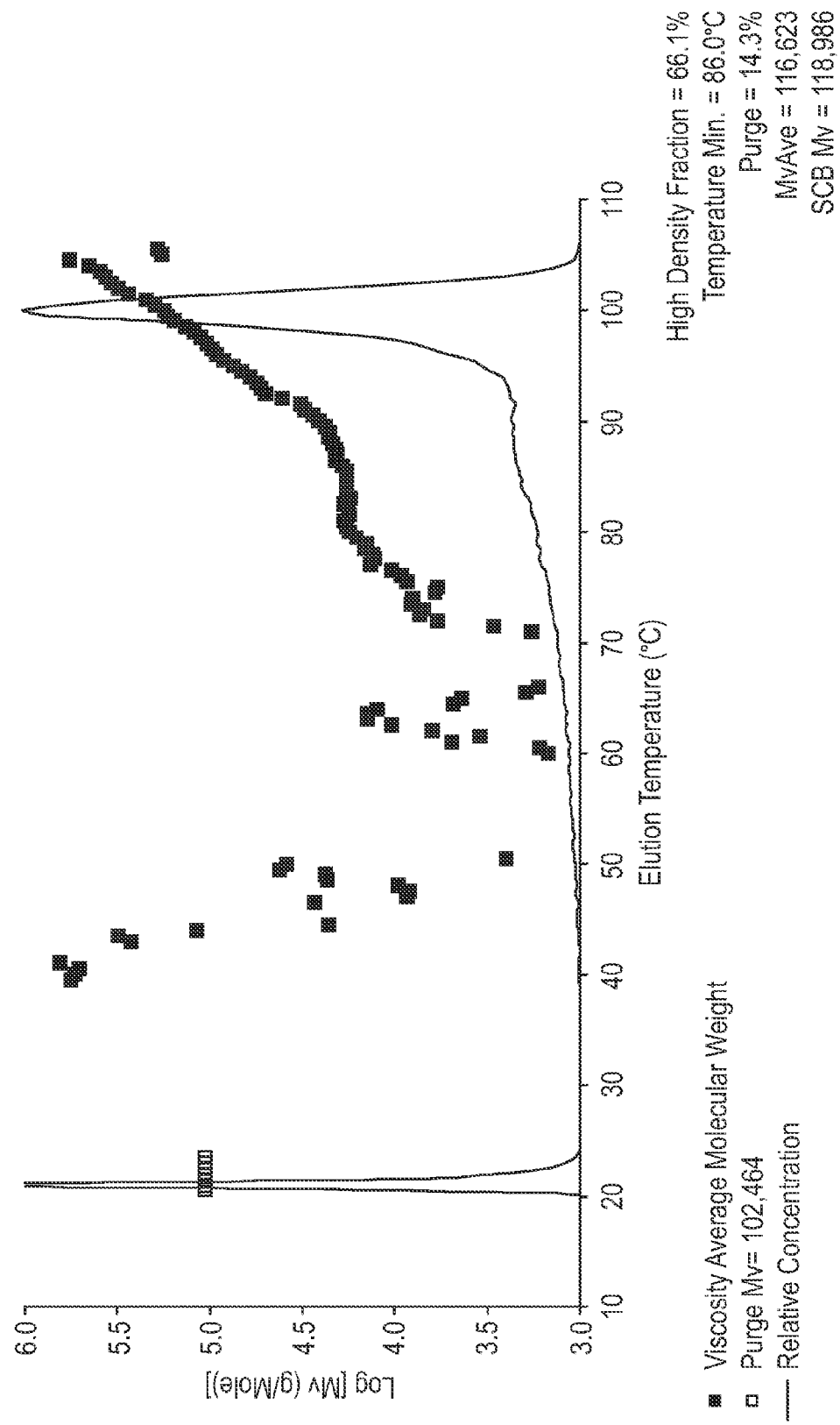
Figure 16:
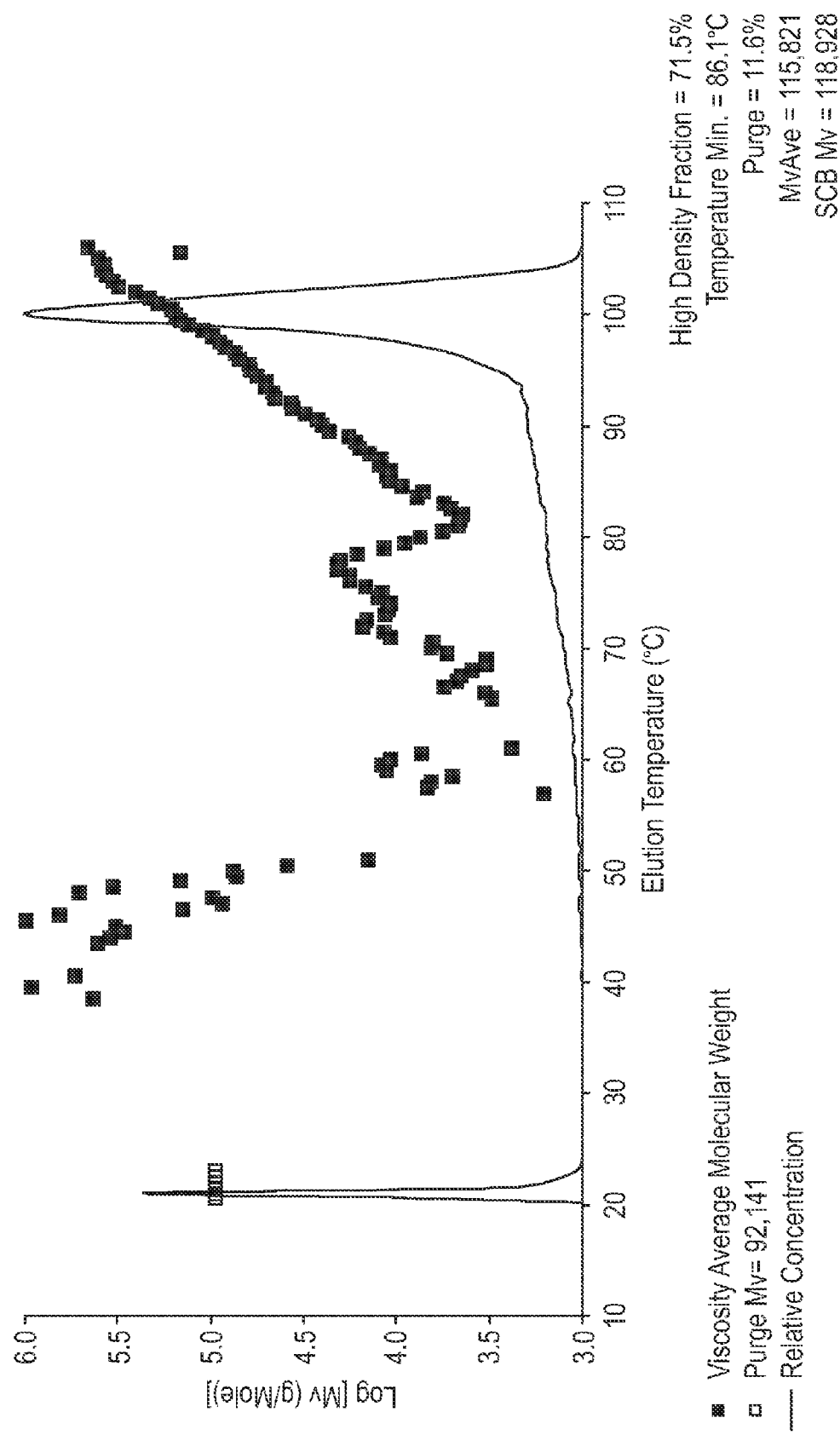
Figure 17:
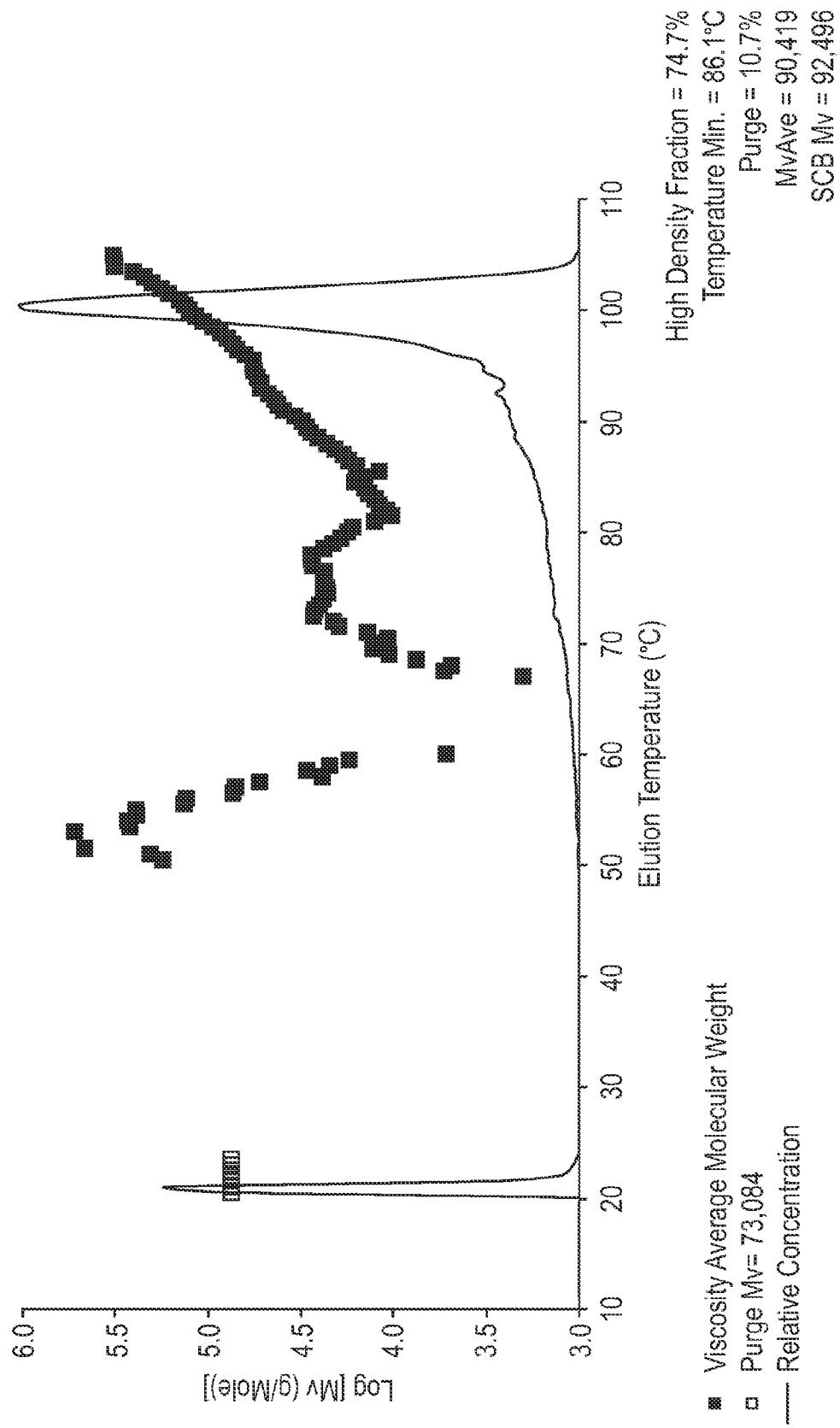
Figure 18:
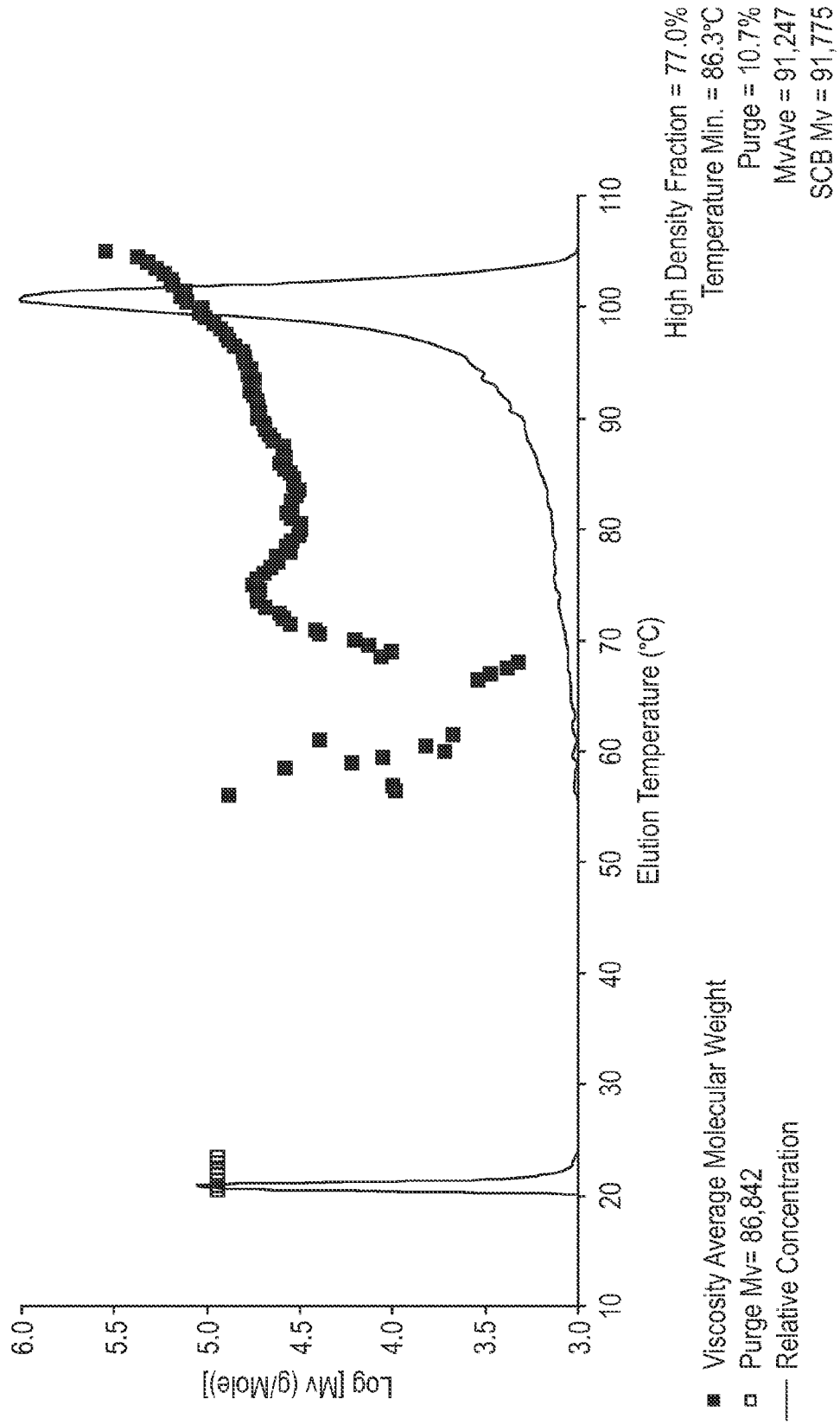
Figure 19:
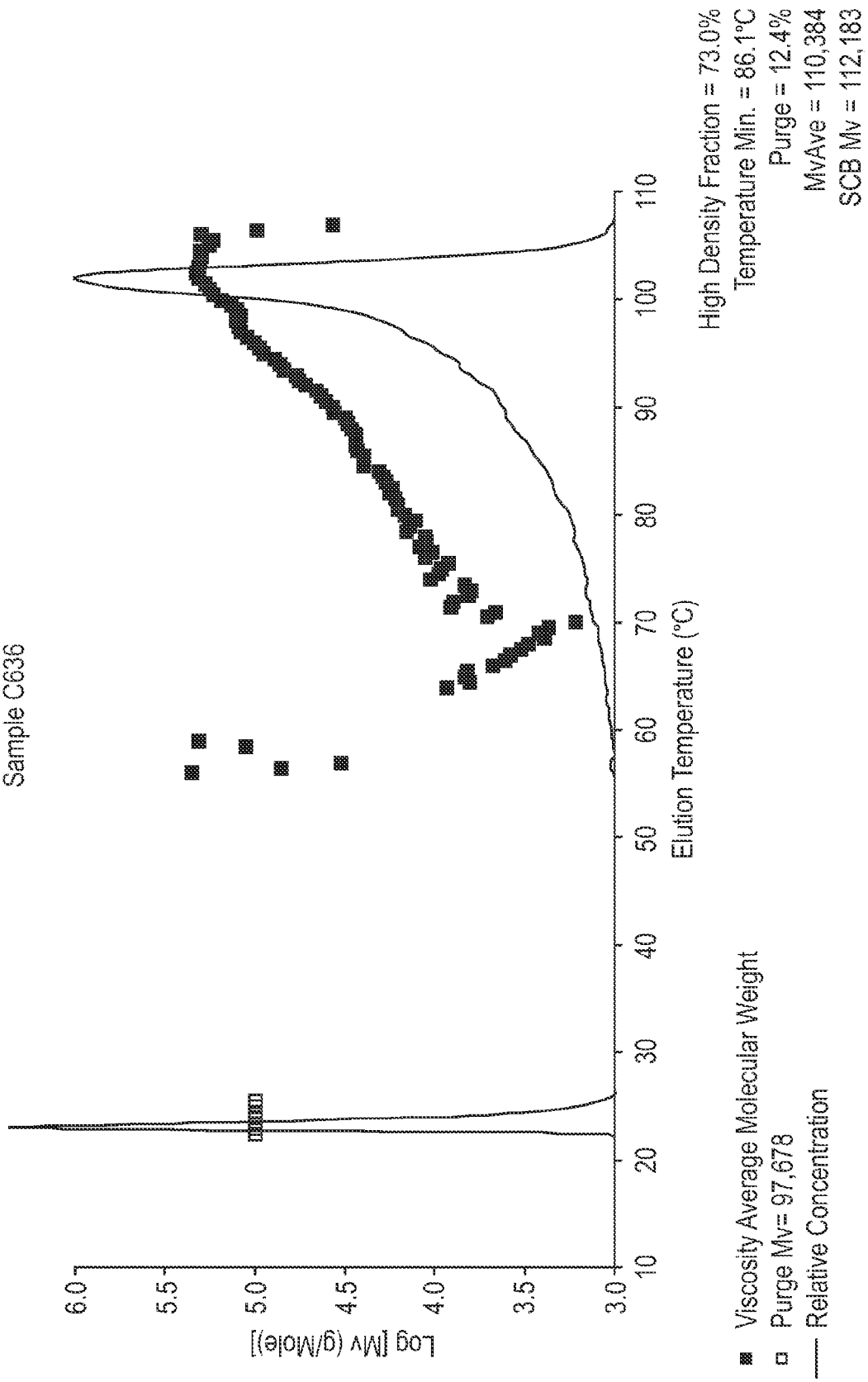
Figure 20:
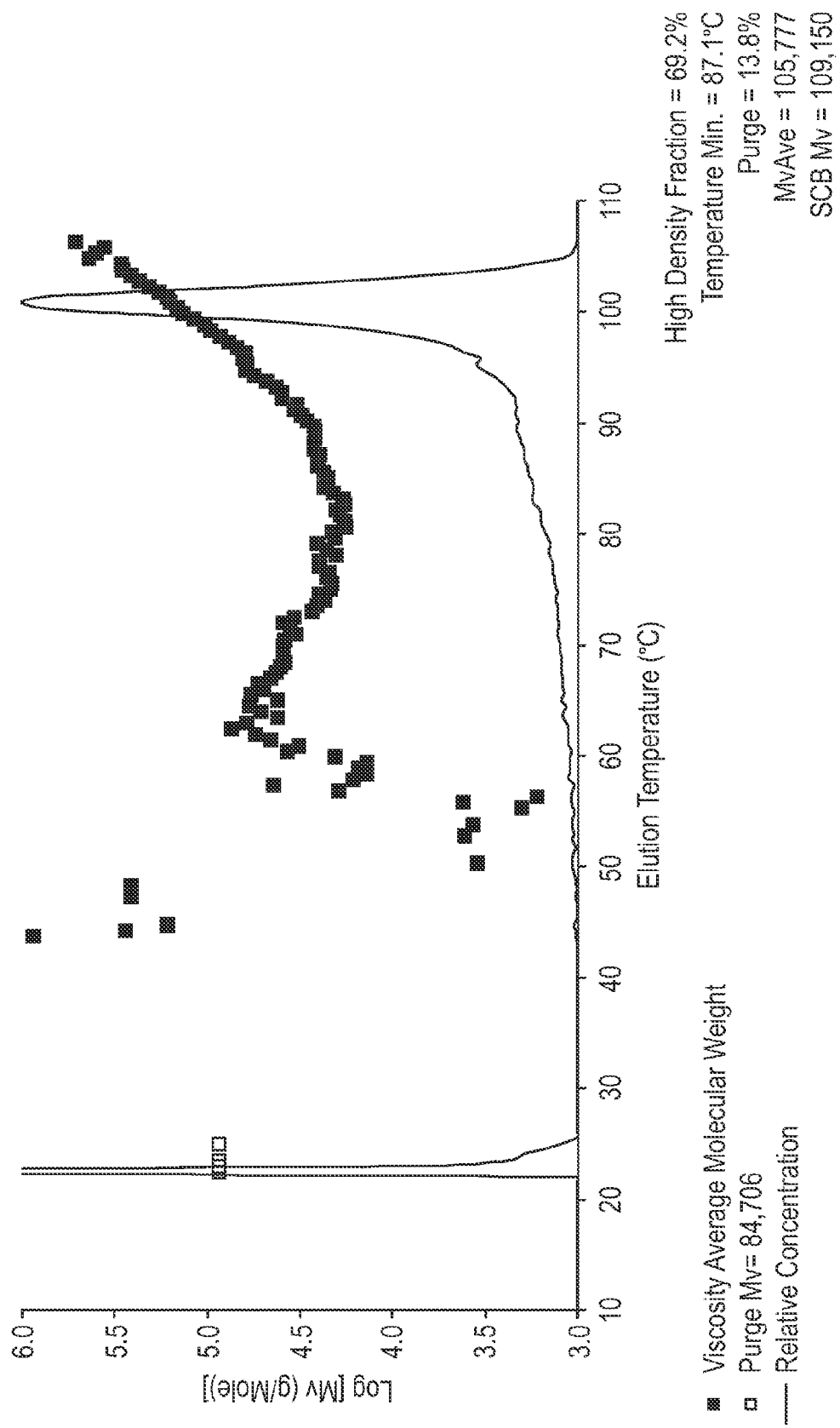
Figure 21:
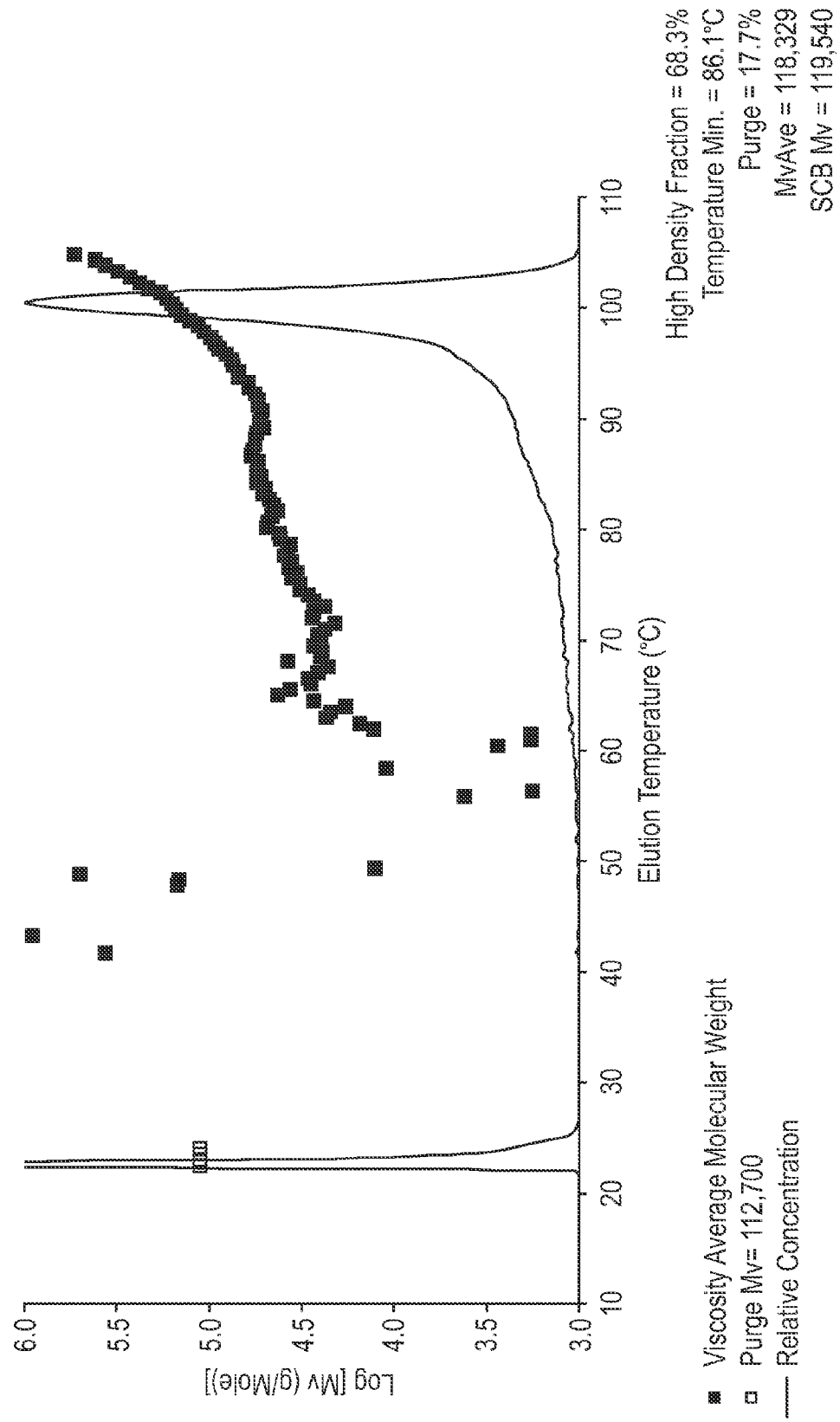
Figure 22:
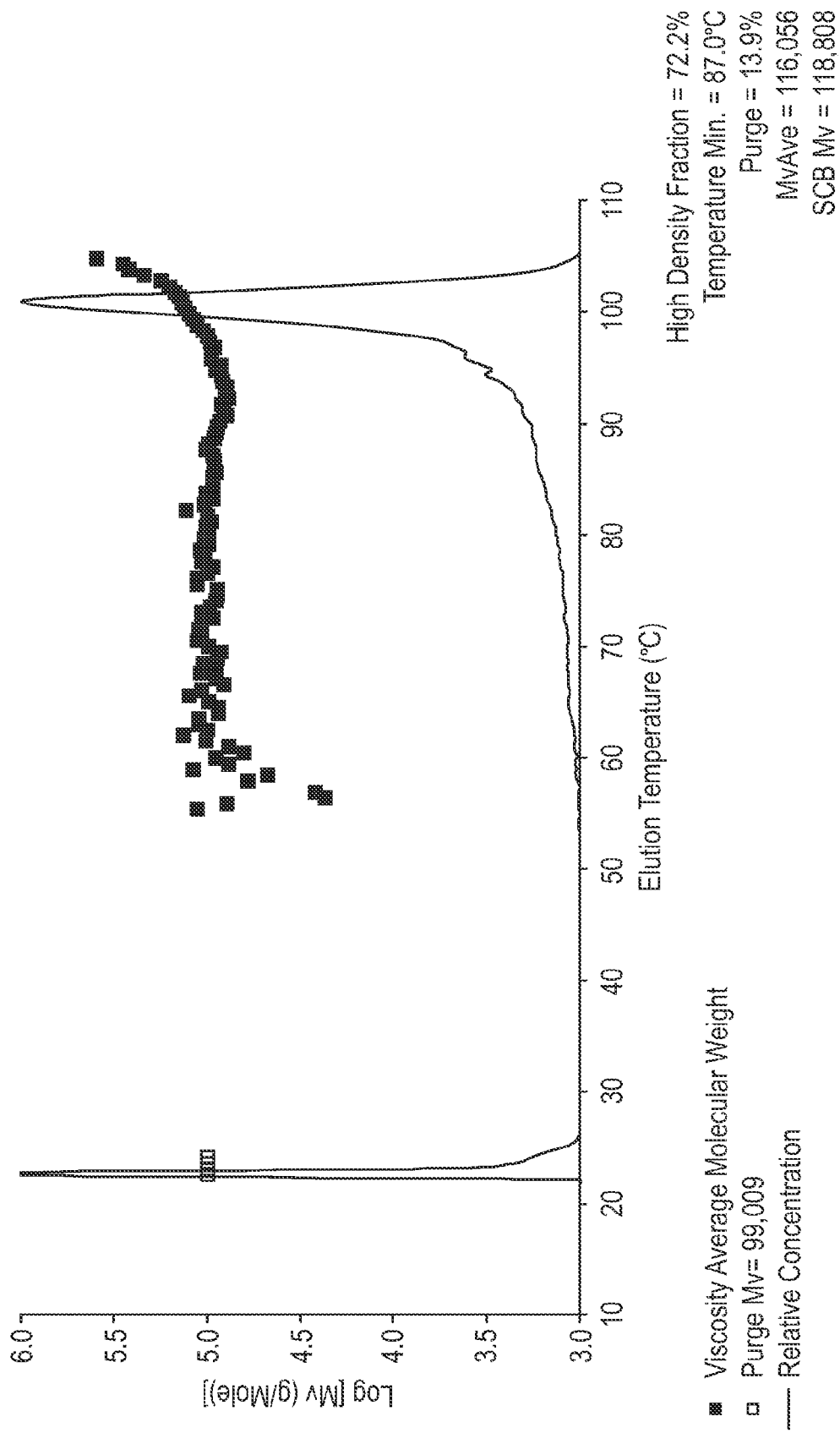
Figure 23:
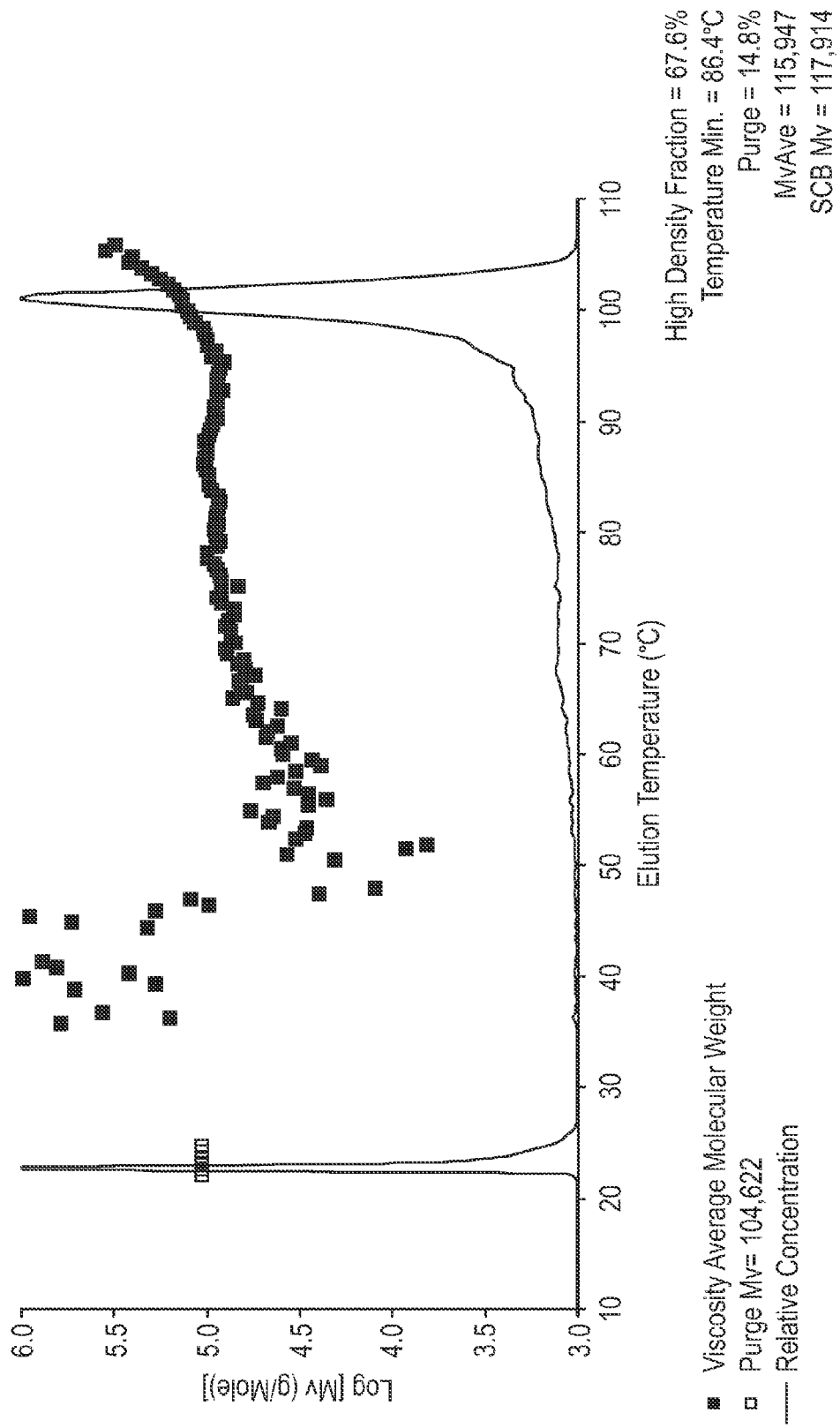
Figure 24:
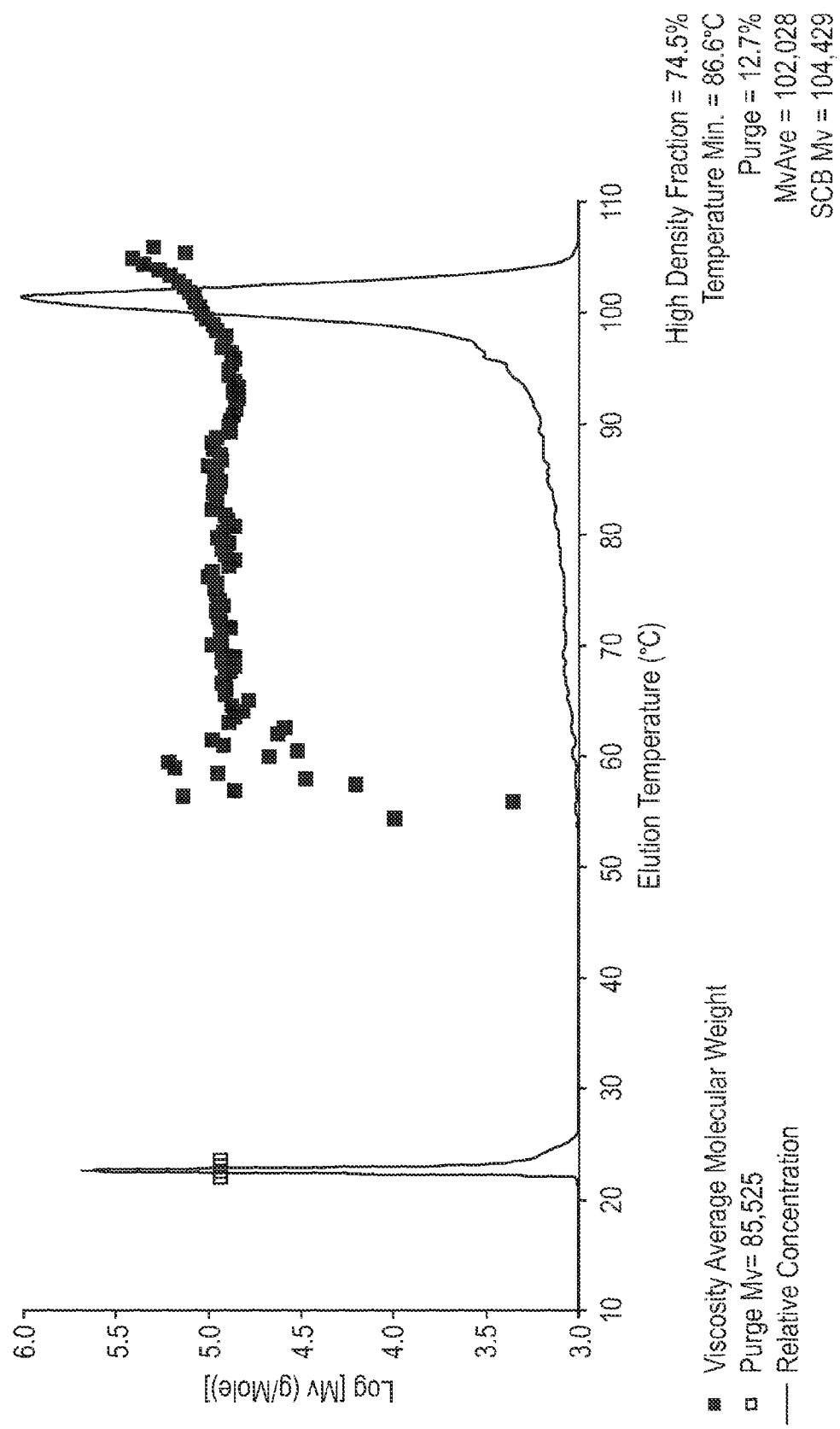
Figure 25:
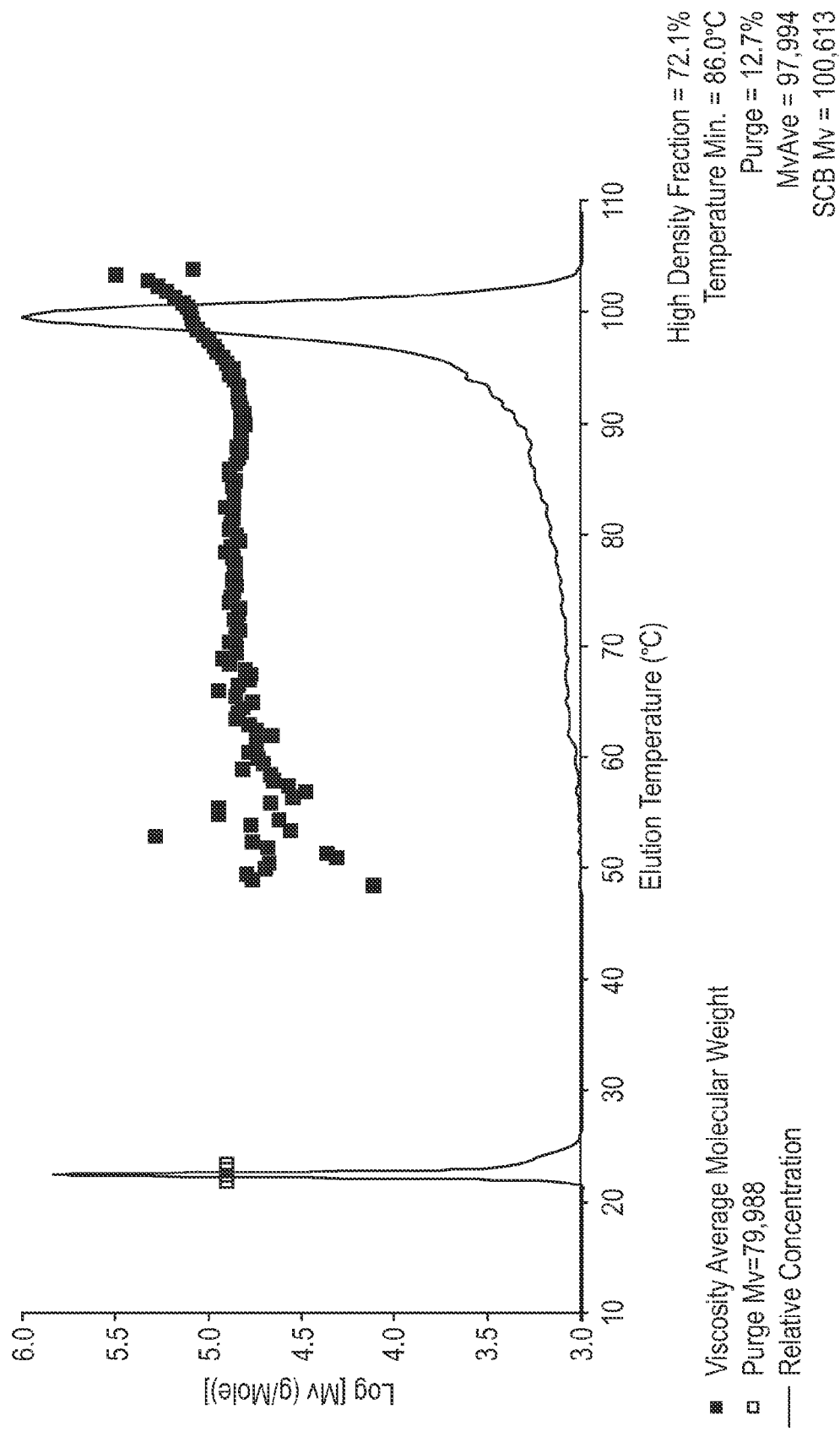
Figure 26:
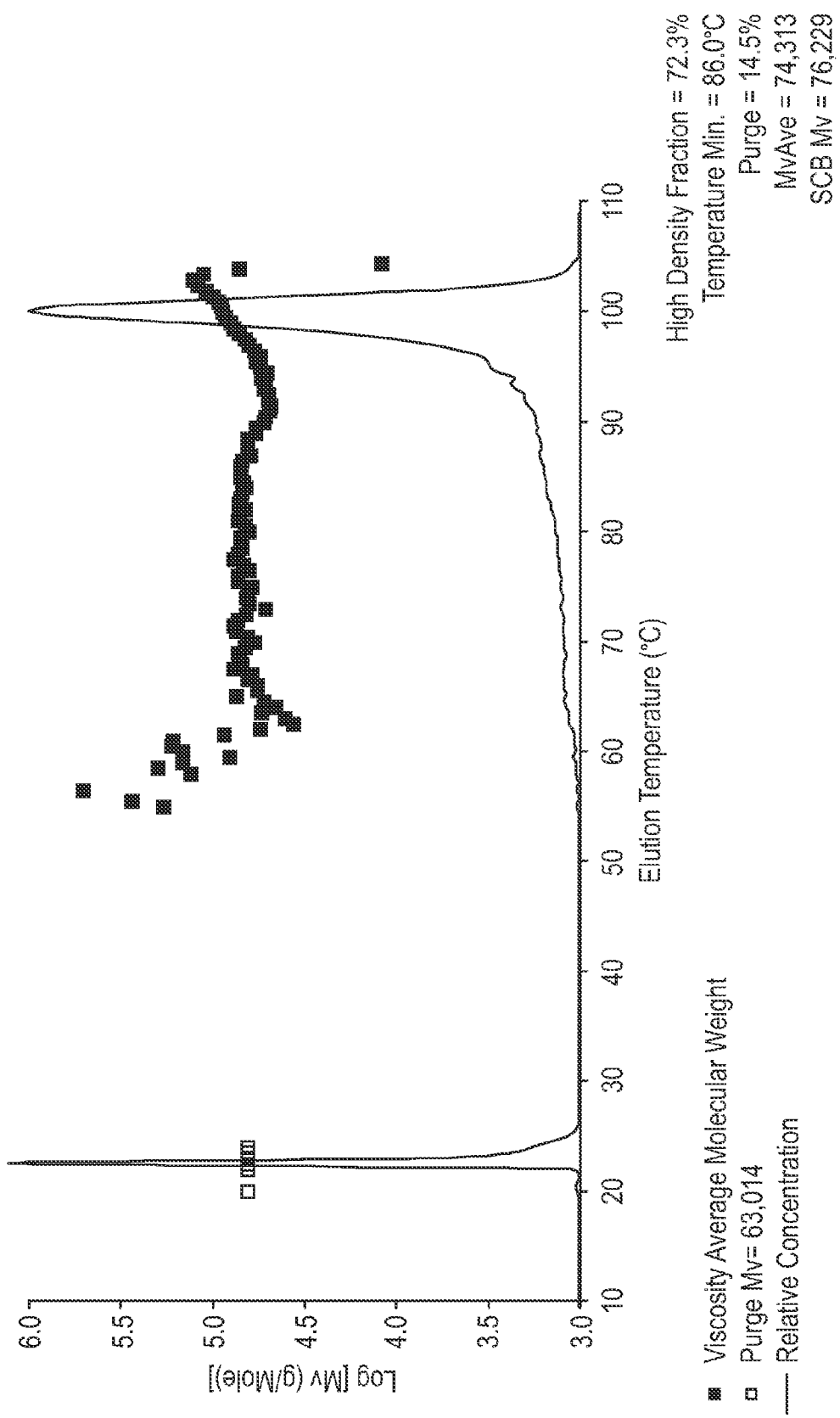
Figure 27:
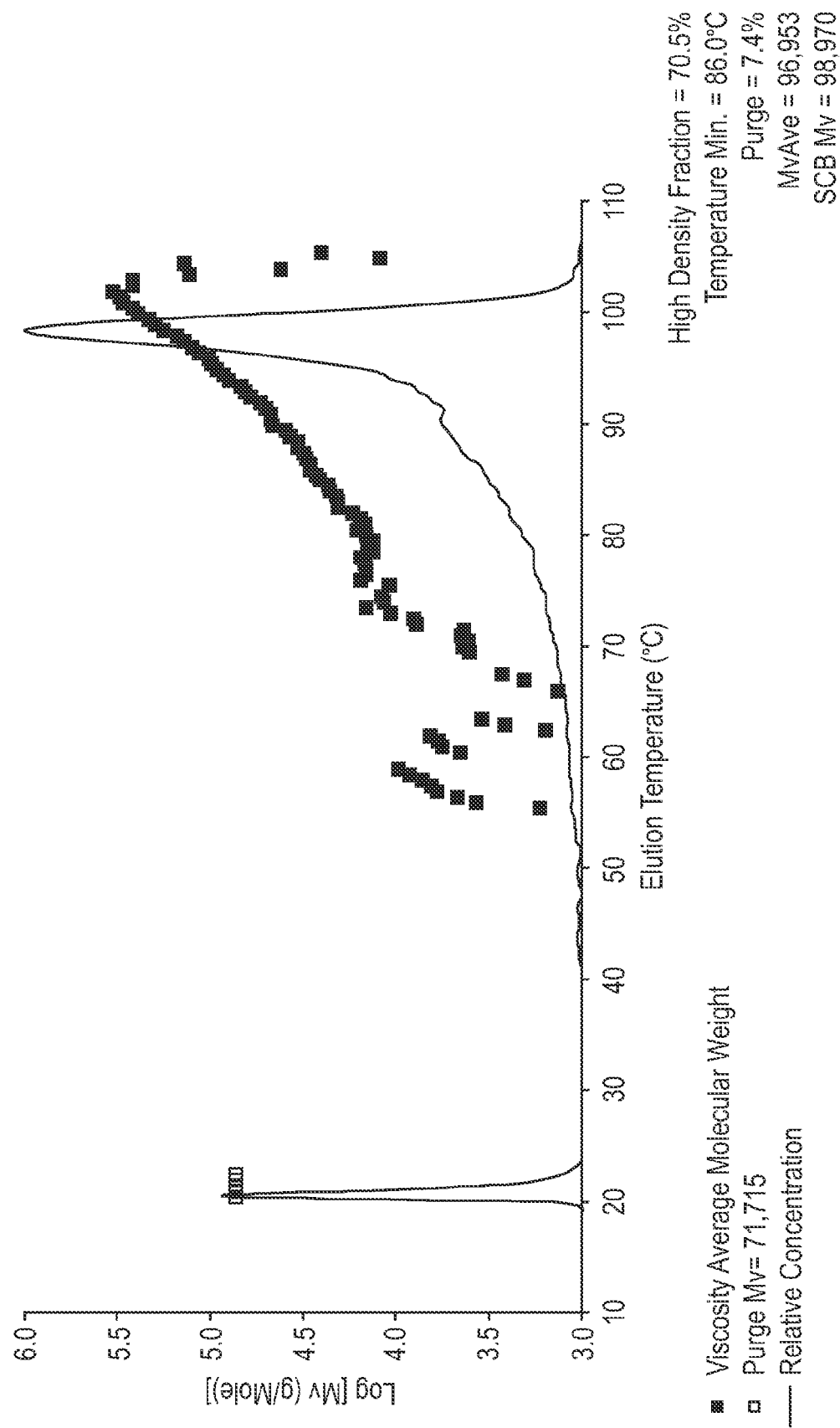
Figure 28:
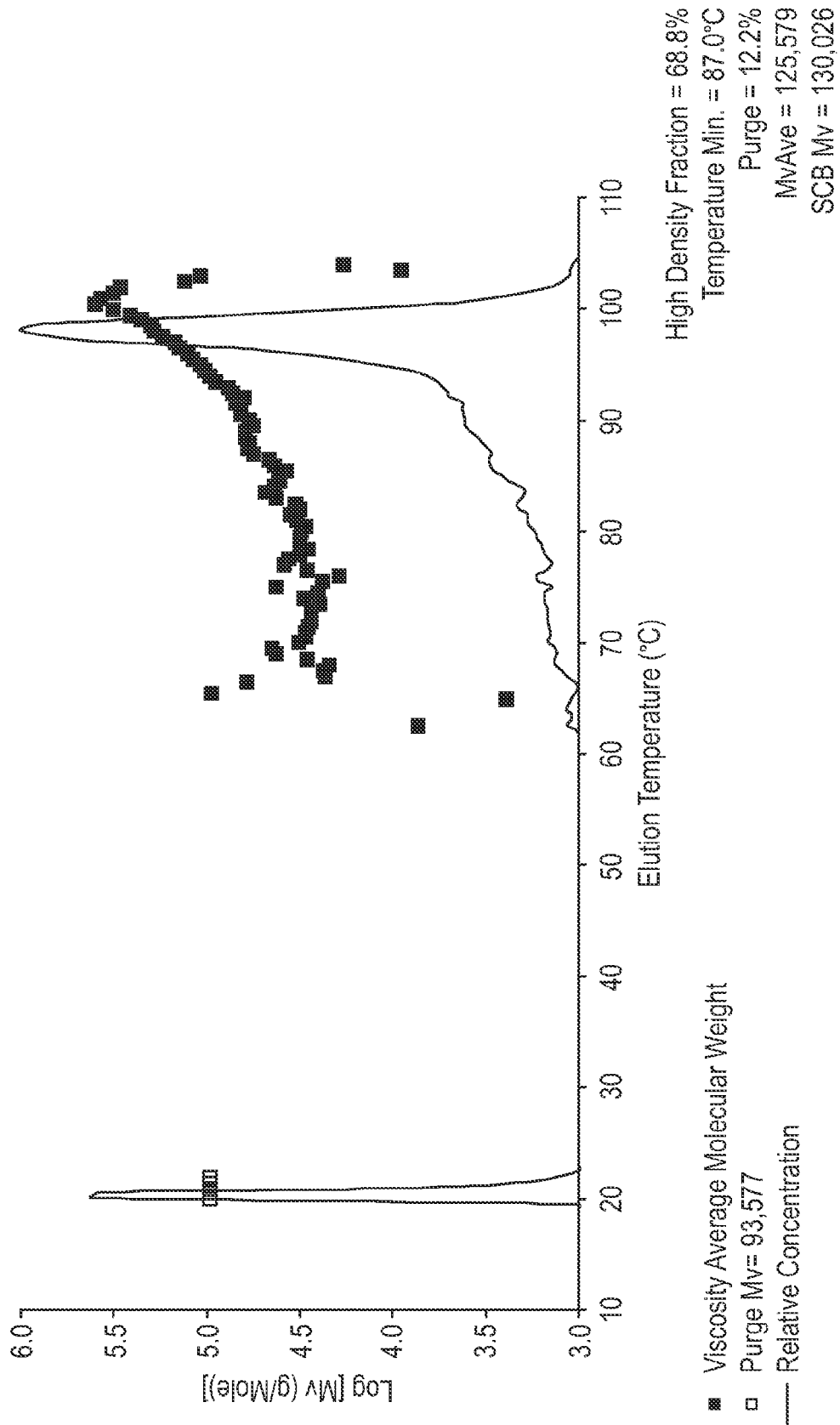

The invention provides a polyethylene composition that can be used in the fabrication of pipes with improved resistance to both slow crack growth (SCG) and rapid crack propagation (RCP), and with improved long term burst performance at 60° C. In addition, it has been found that some of these compositions have improved burst performance up to, and including, 90° C., as well. The inventive compositions achieve superior pipe properties, including, but not limited to, SCG, RCP, and long term burst performance at 60° C., as compared to existing Cr based resins in the market. Also provided is an inventive stabilization package to address thermal and oxidative degradation, and stabilization against UV degradation for long term burst performance in domestic plumbing applications (up to 70° C. to 90° C.).

The invention provides for polyethylene compositions comprising a blend of polyethylene-based interpolymers, in which the comonomer and molecular weight distribution are adjusted to provide a final blend, which shows a single peak in an ATREF profile eluting above 30° C., and which has a coefficient of viscosity average molecular weight (CMv) less than −0.0032, in the log(calculated Mv) versus elution temperature, said CMv calculated in the range of elution temperatures from 70° C. to 90° C. Here Mv is the viscosity average molecular weight.

The inventive compositions have several potential uses, including, but not limited to, pipes, as discussed above, and drip tape and tubing for agricultural use, films, coatings (for example, pipe coatings), and geomembranes. The combination of excellent ESCR, SCG and long term high temperature burst performance makes the inventive compositions a natural fit in the pipe and film markets. In addition, the inventive compositions can be azide modified to form articles of manufacture, such as pipes and geomembranes, with better sag and SCG resistance, over conventional Cr based resins.

The invention provides a new polyethylene composition for making pipes for the transport of water, oil, or gas, and other products, such as sheet, film, tapes, fibers, caps and closures, geomembranes, and molded articles by molding processes, including blow molding, compression molding, and injection molding (for example, the injection molding of pipe fittings).

As discussed above, the invention provides composition, comprising a blend, wherein said blend comprises a high molecular weight ethylene-based interpolymer and a low molecular weight ethylene-based interpolymer, and wherein the high molecular weight polyethylene-based interpolymer is a linear interpolymer, and preferably, a heterogeneously branched linear or a homogeneously branched linear ethylene-based interpolymer, and has a density from 0.922 g/cc to 0.929 g/cc, and a high load melt index (I21) from 0.2 g/10 min to 1.0 g/10 min, and wherein the low molecular weight ethylene-based interpolymer is a linear interpolymer, and preferably a heterogeneously branched linear or a homogeneously branched linear ethylene-based interpolymer, and has a density from 0.940 g/cc to 0.955 g/cc, and a melt index (I2) from 6 g/10 min to 50 g/10 min; and wherein the blend has a single peak in an ATREF profile eluting above 30° C., and has a coefficient of viscosity average molecular weight (CMv) less than −0.0032 in the log (calculated Mv) versus elution temperature, said CMv calculated in the range of elution temperatures from 70° C. to 90° C., and wherein Mv is the viscosity average molecular weight. In a further embodiment, the blend is an in-situ blend.

In another embodiment, the high molecular weight ethylene-based interpolymer has a density from 0.9229 g/cc to 0.9271 g/cc.

In another embodiment, the CMv is less than −0.0036. In another embodiment, the CMv is less than −0.0040. In another embodiment, the CMv is less than −0.0090.

In another embodiment, the composition has a density from 0.930 g/cc to 0.945 g/cc. In another embodiment, the composition has a density less than 0.945 g/cc. In another embodiment, the composition has a density less than, or equal to, 0.942 g/cc.

In another embodiment, the composition has a melt index, I2, from 0.15 to 0.8 g/10 min, and a density greater than 0.9375 g/cc. In another embodiment, the composition has a melt index, I2, from 0.4 to 0.8 g/10 min.

In another embodiment, the low molecular weight ethylene-based interpolymer has a density less than 0.955 g/cc. In another embodiment, the low molecular weight ethylene-based interpolymer has a density less than 0.954 g/cc. In another embodiment, the low molecular weight ethylene-based interpolymer has a density less than 0.953 g/cc. In another embodiment, the low molecular weight ethylene-based interpolymer has a density less than 0.950 g/cc. In certain embodiments, the density of the low molecular weight component may be up to 0.957 g/cc.

In another embodiment, the high molecular weight ethylene-based interpolymer is a heterogeneously branched linear interpolymer. In another embodiment, the low molecular weight ethylene-based interpolymer is a heterogeneously branched linear interpolymer.

In another embodiment, the low molecular weight ethylene-based interpolymer has a melt index (I2) from 10 g/10 min to 40 g/10 min. In another embodiment, the low molecular weight ethylene-based interpolymer has a melt index (I2) from 15 g/10 min to 35 g/10 min.

In another embodiment, the high molecular weight ethylene-based interpolymer is present in an amount from 45 to 55 weight percent (calculated split %), based on the sum weight of the high molecular weight ethylene-based interpolymer and the low molecular weight ethylene-based interpolymer.

In another embodiment, the composition has a melt index, I2, from 0.05 g/10 min to 0.5 g/10 min. In yet another embodiment, the composition has an I21/I2 ratio from 30 to 80. In a further embodiment, the composition has an I21/I2 ratio from 40 to 75 or from 45 to 75.

In another embodiment, the blend has less than 0.5 vinyls/ 1000 carbon, preferably less than 0.4 vinyls/1000 carbon, and more preferably less than 0.3 vinyls/1000 carbon.

In another embodiment, the high molecular weight ethylene-based interpolymer has a g' value of one or greater.

In yet another embodiment, the high molecular weight ethylene-based interpolymer is an ethylene/α-olefin interpolymer. In a further embodiment, the α-olefin is selected from the group consisting of C3 to C10 α-olefins. In yet a further embodiment, the α-olefin is preferably propylene, 1-butene, 1-pentene, 1-hexene, 1-heptene, 1-octene, 1-nonene and 1-decene, and more preferably propylene, 1-butene, 1-hexene and 1-octene, and even more preferably 1-hexene.

In another embodiment, the low molecular weight ethylene-based interpolymer is an ethylene/α-olefin interpolymer. In a further embodiment, the α-olefin is selected from the group consisting of C3 to C10 α-olefins. In yet a further embodiment, the α-olefin is selected from the group consisting propylene, 1-butene, 1-pentene, 1-hexene, 1-heptene, 1-octene, 1-nonene and 1-decene, and more preferably propylene, 1-butene, 1-hexene and 1-octene, and even more preferably 1-hexene.

An inventive composition may have a combination of two or more embodiments as described herein.

The invention also provides for an article comprising at least one component formed from an inventive composition.

In one embodiment, the article has a Charpy Impact, at 23° C., greater than, or equal to, 80 kJ/m$^2$, as determined by ISO 179 (version 2000).

In another embodiment, the article meets all the requirements of CSA Z245.1, and has a Charpy Impact, at 23° C., greater than, or equal to, 80 kJ/m$^2$, as determined by ISO 179 (version 2000).

In another embodiment, the article is a blow molded article. In another embodiment, the article is an injection molded article. In another embodiment, the article is a compression molded article.

In another embodiment, the article is a drip tape. In a further embodiment, the drip tape is an agricultural tape. In another embodiment, the article is a geomembrane.

In another embodiment, the article is selected from a pipe, a coating, a blow molded article, an injection molded article, or a compression molded article.

In another embodiment, an invention article has a PENT greater than 1000 hours, preferably greater than 3000 hours, and more preferably greater than 5000 hours, and even more preferably greater than 9000 hours.

In another embodiment, the article has a Charpy impact at 23° C. greater than, or equal to, 80 kJ/m$^2$, preferably greater than, or equal to, 100 kjJ/m$^2$, as determined by ISO 179 (version 2000). In another embodiment, the article has a Charpy impact at 0° C. greater than, or equal to, 70 kJ/m$^2$, preferably greater than, or equal to, 100 kJ/m$^2$, as determined by ISO 179 (version 2000). In another embodiment, the article has a Charpy impact at −20° C. greater than, or equal to, 50 kJ/m$^2$, preferably greater than, or equal to, 60 kJ/m$^2$, as determined by ISO 179 (version 2000). In another embodiment, the article has a Charpy impact at −40° C. greater than, or equal to, 20 kJ/m$^2$, preferably greater than, or equal to, 40 kJ/m$^2$, as determined by ISO 179 (version 2000).

In another embodiment, the invention provides a pipe comprising at least one component formed from an inventive composition. In a further embodiment, the pipe has a 60° C. Burst Performance that meets the 1000 psi hydrostatic design basis, in accordance with ASTM D-2837-04. In another embodiment, the pipe has a 60° C. Burst Performance that meets the 1000 psi hydrostatic design basis, in accordance with ASTM D-2837-04, and wherein the pipe passes the primary 60° C. burst validation test protocol as per PPI TR#3, section F.4.1.2 (2003 version), and has maintained burst performance at 90° C. and 690 psi hoop stress, for over 3800 hours, without failure. In another embodiment, the pipe is colored with one or more colors selected from the group consisting of white, yellow, orange, tan and black. In yet another embodiment, the pipe is colored with black with yellow markings or with one or more tan stripes.

In another embodiment, the pipe is an 8 inch SDR 11 pipe, sized according to ASTM D-2513-07, and has a rapid crack propagation critical temperature, Tc, less than 5° C., at a 6 bar internal pressure, in accordance with ISO method 13477.

In another embodiment, the pipe is an 8 inch SDR 11 pipe, sized according to ASTM D-2513-07, and has a rapid crack propagation critical temperature, Tc, less than 5° C., at a 6 bar internal pressure, in accordance with ISO method 13477.

In another embodiment, the pipe is an 8 inch SDR 11 pipe, sized according to ASTM D-2513-07, and has a rapid crack propagation critical temperature, Tc, less than 0° C., at a 6 bar internal pressure, in accordance with ISO method 13477, and wherein the pipe has a 60° C. Burst Performance that meets the 1000 psi hydrostatic design basis, in accordance with ASTM D-2837-04, and wherein the pipe passes the primary 60° C. burst validation test protocol as per PPI TR#3, section F.4.1.2 (2003 version), and has maintained burst performance at 90° C. and 690 psi hoop stress, for over 3800 hours, without failure.

In another embodiment, the pipe has an average perpendicular profilometry Ra value less than 10. In another embodiment, the pipe has an average parallel profilometry Ra value less than 10.

In another embodiment, the pipe is a "domestic-use" pipe. In a further embodiment, the pipe is a used for plumbing purposes.

In another embodiment, the pipe is a natural gas pipe. In a further embodiment, the pipe is colored with at least one color selected from the group consisting white, yellow, orange, tan or black with yellow, orange, tan stripes, and combinations thereof.

In another embodiment, the invention provides a coating formed from an inventive composition. In a further embodiment, the coating is a pipe coating. In a further embodiment, the coating is a steel pipe coating In a further embodiment, the coating is a top coating for steel pipe. Such coatings may be use to protect pipes and other articles from corrosion. In another embodiment, the composition has a Charpy impact at 23° C. greater than, or equal to, 80 kJ/m$^2$, preferably greater than, or equal to, 100 kjJ/m$^2$, as determined by ISO 179 (version 2000). In another embodiment, the composition has a Charpy impact at 0° C. greater than, or equal to, 70 kJ/m$^2$, preferably greater than, or equal to, 100 kJ/m$^2$, as determined by ISO 179 (version 2000). In another embodiment, the composition has a Charpy impact at −20° C. greater than, or equal to, 50 kJ/m$^2$, preferably greater than, or equal to, 60 kJ/m$^2$, as determined by ISO 179 (version 2000). In another embodiment, the composition has a Charpy impact at −40° C. greater than, or equal to, 20 kJ/m$^2$, preferably greater than, or equal to, 40 kJ/m$^2$, as determined by ISO 179 (version 2000).

The invention also provides a film comprising at least one component formed from an inventive composition.

An inventive article may have a combination of two or more embodiments as described herein.

The invention also provides a method of preparing a composition, comprising a blend, wherein said blend comprises a high molecular weight ethylene-based interpolymer and a low molecular weight ethylene-based interpolymer, said method comprising:

a) polymerizing either the high molecular weight ethylene-based interpolymer or the low molecular weight ethylene-based interpolymer, in a first reactor, in the presence of a Ziegler-Natta catalyst system, to form a first interpolymer product;

b) transferring the first interpolymer product to another reactor; and c) polymerizing, in the other reactor, the ethylene-based interpolymer that was not produced in the first reactor, in the presence of the Ziegler-Natta catalyst system; and wherein the high molecular weight ethylene-based interpolymer is a heterogeneously branched linear ethylene-based interpolymer, and has a density from 0.922 g/cc to 0.929 g/cc, and a high load melt index (I21) from 0.2 g/10 min to 1.0 g/10 min, and wherein the low molecular weight ethylene-based interpolymer is a heterogeneously branched linear ethylene-based interpolymer, and has a density from 0.940 g/cc to 0.955 g/cc, and a melt index (I2) from 6 g/10 min to 50 g/10 min; and wherein the blend has a single peak in an ATREF profile eluting above 30° C., and has a coefficient of viscosity average molecular weight (CMv) less than −0.0032 in the log (calculated Mv) versus elution temperature, said CMv calculated in the range of elution temperatures from 70° C. to 90° C., and wherein Mv is the viscosity average molecular weight.

In one embodiment, the polymerizations take place in at least two reactors. In another embodiment, the polymerizations take place in two reactors. In another embodiment, at least one reactor is a gas phase reactor.

In another embodiment, catalyst is fed only into a first reactor.

In another embodiment, the polymerization of the high molecular weight ethylene-based interpolymer and/or the low molecular weight ethylene-based interpolymer takes place in a gas phase polymerization.

In another embodiment, the polymerization of the high molecular weight ethylene-based interpolymer and/or the low molecular weight ethylene-based interpolymer takes place in a slurry polymerization.

In another embodiment, the polymerization of the high molecular weight ethylene-based interpolymer and the low molecular weight ethylene-based interpolymer each takes place in a gas phase reactor, and wherein the reactors are operated in series.

In a further embodiment, no catalyst is added to the second reactor.

In another embodiment, the polymerization of the high molecular weight ethylene-based interpolymer and/or the low molecular weight ethylene-based interpolymer takes place in a gas phase/slurry polymerization combination.

In another embodiment, the polymerization of the high molecular weight ethylene-based interpolymer and/or the low molecular weight ethylene-based interpolymer of takes place in the presence of a Ziegler/Natta catalyst.

In another embodiment, the polymerization of the high molecular weight ethylene-based interpolymer and/or the low molecular weight ethylene-based interpolymer takes place in the presence of a metallocene catalyst.

In another embodiment, the polymerization of the high molecular weight ethylene-based interpolymer and/or the low molecular weight ethylene-based interpolymer takes place in the presence of a metal compound selected from the group consisting of vanadium metal compound, zirconium metal compound, hafnium metal compound and titanium metal compound.

In another embodiment, the gas phase polymerization takes place in the presence of an induced condensing agent, and wherein the dew point of the cycle gas is less than the inlet temperature of the recycle gas. In a further embodiment, the induced condensing agent is isopentane or hexane.

The invention also provides a method of preparing an inventive composition, said method comprising polymerizing the high molecular weight ethylene-based interpolymer and the low molecular weight ethylene-based interpolymer in one reactor, and in the presence of two Ziegler-Natta catalyst systems.

The invention also provides a method of preparing an inventive composition, said method comprising:

a) polymerizing the high molecular weight ethylene-based interpolymer and the low molecular weight ethylene-based interpolymer in a first reactor, and in the presence of two Ziegler-Natta catalyst systems to form a first polymer product;

b) transferring the first polymer product to a second reactor; and c) polymerizing further the first polymer product in the second reactor.

The invention also provides a method of preparing an inventive composition, said method comprising:

a) polymerizing the high molecular weight ethylene-based interpolymer or the low molecular weight ethylene-based interpolymer in a first reactor and in the presence of a first Ziegler-Natta catalyst system, to form a first polymer product;

b) transferring the first interpolymer product to a second reactor; and c) polymerizing, in the second reactor, the ethylene-based interpolymer that was not produced in the first reactor, in the presence of a second Ziegler-Natta catalyst system.

An inventive method may have a combination of two or more embodiments as described herein.

The inventive compositions, blends, articles and methods, each may comprise a combination of two or more of the respective embodiments, as described herein. Further details of the embodiments of the invention are described below.

Polymer Composition

As discussed above, the inventive compositions comprise a blend containing a high molecular weight ethylene-based interpolymer and a low molecular weight polyethylene-based interpolymer. Additional features of these components are described below.

The High Molecular Weight (HMW) Component

The high molecular weight ethylene-based interpolymer has a density greater than, or equal to, 0.922 g/cc, preferably greater than, or equal to, 0.9225 g/cc, and more preferably greater than, or equal to, 0.923 g/cc. In another embodiment, the high molecular weight ethylene-based interpolymer has a density less than, or equal to, 0.929 g/cc, preferably less than, or equal to, 0.928 g/cc, and more preferably less than, or equal to, 0.927 g/cc. In another embodiment, the density of the high molecular weight ethylene-based interpolymer is in the range from 0.922 to 0.928 g/cc, and preferably in the range from 0.9229 to 0.9271 g/cc. When the density is greater than 0.929 and/or less than 0.922, the 60° C. burst performance suffers.

The high molecular weight ethylene-based interpolymer has a high load melt index, I21, (190° C., 21.6 kg weight, ASTM 1238-03) greater than, or equal to, 0.20, preferably greater than, or equal to, 0.25, and more preferably greater than, or equal to, 0.30 (units of grams per 10 minutes). In another embodiment, the high molecular weight ethylene-based interpolymer has a high load melt index, I21 less than, or equal to, 1.0, preferably less than, or equal to, 0.9, and more preferably less than, or equal to, 0.8. In yet another embodiment, the I21 ranges from 0.20 to 1.0 grams per 10 minutes, and preferably from 0.25 to about 1.0 grams per 10 minutes. When the I21 is greater than 1.0 or less than 0.20, the 60° C. long term burst performance suffers.

In another embodiment, the high molecular weight ethylene-based interpolymer is an ethylene/α-olefin interpolymer. In one embodiment, the α-olefin is a C3-C20 α-olefin, a C4-C20 α-olefin, and more preferably a C4-C12 α-olefin, and even more preferably a C4-C8 α-olefin, and most preferably C6-C8 α-olefin.

The term "interpolymer," as used herein, refers to a polymer having polymerized therein at least two monomers. It includes, for example, copolymers, terpolymers and tetrapolymers. As discussed above, it particularly includes a polymer prepared by polymerizing ethylene with at least one comonomer, typically an alpha olefin (α-olefin) of 3 to 20 carbon atoms (C3-C20), or 4 to 20 carbon atoms (C4-C20), or 4 to 12 carbon atoms (C4-C12) or 4 to 8 carbon atoms (C4-C8), or 6 to 8 carbon atoms (C6-C8). The α-olefins include, but are not limited to, propylene 1-butene, 1-pentene, 1-hexene, 4-methyl-1-pentene, 1-heptene, and 1-octene. Preferred α-olefins include propylene, 1-butene, 1-pentene, 1-hexene, 4-methyl-1-pentene, 1-heptene, and 1-octene. Especially preferred α-olefins include 1-hexene and 1-octene, and more preferably 1-hexene. The α-olefin is desirably a C3-C10 α-olefin, and more desirably a C3-C8 α-olefin, and most desirably C6-C8 α-olefin.

Interpolymers include ethylene/butene (EB) copolymers, ethylene/hexene-1 (EH), ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. Preferred copolymers include EB, EH and EO copolymers, and most preferably EH and EO copolymers.

In a preferred embodiment, the high molecular weight ethylene-based interpolymer is an ethylene/1-hexene interpolymer. In a further embodiment, the ethylene/1-hexene copolymer has a hexene/ethylene (C6/C2) ratio from 0.03:1 to 0.105:1. In yet a further embodiment, the ethylene/1-hexene copolymer has a hydrogen/ethylene (H2/C2) ratio from 0.01 to 0.09. In another embodiment, the high molecular weight ethylene-based interpolymer has a g' of 1 signifying a linear polymer.

The high molecular weight component may comprise a combination of two or more embodiments as described herein.

The Low Molecular Weight (LMW) Component

The low molecular weight ethylene-based interpolymer has a density greater than, or equal to, 0.940 g/cc, preferably greater than, or equal to, 0.942 g/cc, and more preferably greater than, or equal to, 0.945 g/cc. In another embodiment, the low molecular weight ethylene-based interpolymer has a density less than, or equal to, 0.957 g/cc, preferably less than, or equal to, 0.955 g/cc. In another embodiment, the low molecular weight ethylene-based interpolymer has a density less than, or equal to, 0.953 g/cc. In another embodiment, the density ranges from 0.940 to 0.955 g/cc, and preferably from 0.946 to 0.955 g/cc. Typically, when the density is greater than 0.955 g/cc, the 60° C. burst performance is not most optimum. When the density is less than 0.940 g/cc, the 60° C. burst performance will suffer The low molecular weight ethylene-based interpolymer has a melt index, I2, (190° C., 2.16 kg weight, ASTM 1238-03) greater than, or equal to, 6, preferably greater than, or equal to, 7, and more preferably greater than, or equal to, 8 (units of grams per 10 minutes). In another embodiment, the low molecular weight ethylene-based interpolymer has a melt index, I2, less than, or equal to, 50, preferably less than, or equal to, 47, and more preferably less than, or equal to, 45. In another embodiment, the melt index range from 6 to 50 grams per 10 minutes, preferably in the range from 8 to 47 grams per 10 minutes, more preferably in the range from 10 to 45 grams per 10 minutes, and even more preferably from 15 to 25 grams per 10 minutes. When the I2 is greater than 50 or less than 6, the 60° C. burst performance will suffer.

In another embodiment, the low molecular weight ethylene-based interpolymer is an ethylene/α-olefin interpolymer. In another embodiment, the α-olefin is a C3-C20 α-olefin, a preferably a C4-C20 α-olefin, and more preferably a C4-C12 α-olefin, and even more preferably a C4-C8 α-olefin and most preferably C6-C8 α-olefin. The α-olefins include, but are not limited to, propylene 1-butene, 1-pentene, 1-hexene, 4-methyl-1-pentene, 1-heptene, and 1-octene. Preferred α-olefins include propylene, 1-butene, 1-pentene, 1-hexene, 4-methyl-1-pentene, 1-heptene, and 1-octene. Especially preferred α-olefins include 1-hexene and 1-octene, and more preferably 1-hexene. The α-olefin is desirably a C3-C8 α-olefin, and more desirably a C4-C8 α-olefin and most desirably a C6-C8 α-olefin.

Interpolymers include ethylene/butene-1 (EB) copolymers, ethylene/hexene-1 (EH), ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. Preferred copolymers include EB, EH and EO copolymers, and most preferred copolymers are EH and EO.

In a preferred embodiment, the low molecular weight component is an ethylene/1-hexene copolymer. In a further embodiment, the ethylene/1-hexene copolymer has a hexene/ethylene (C6/C2) ratio from 0.01 to 0.065. In yet a further embodiment, the ethylene/1-hexene copolymer has a hydrogen/ethylene (H2/C2) ratio from 0.1 to 1.0. The LMW component is a linear polymer.

The low molecular weight component may comprise a combination of two or more embodiments as described herein.

In a preferred embodiment, the LMW component is determined by operating at a known set of reactor conditions to produce the desired component melt index and density. These conditions are determined by producing that product alone to determine the appropriate reactor temperature, H2/C2 and C6/C2 ratios, which are then used when operating the LMW component, as the second reactor, in series, to produced the desired Melt Index and Density.

One preferred process for producing the LMW component alone is as follows. Ethylene is copolymerized with 1-hexene in a fluidized bed reactor. The polymerization is continuously conducted after equilibrium is reached, under the respective conditions, as set forth in the tables (see Tables 1A and 1B) below. Polymerization is initiated by continuously feeding the catalyst and cocatalyst into a fluidized bed of polyethylene granules, together with ethylene, 1-hexene and hydrogen. Inert gases, nitrogen and isopentane, make up the remaining pressure in the reactors. A model of this data could then be developed, and used to control this second reactor component.

TABLE 1A

Reaction Conditions

| | Sample | | | | | | |
|---|---|---|---|---|---|---|---|
| | 1 | 2 | 3 | 4 | 5 | 6 | 7 |
| Temp. ° C. | 95.0 | 95.0 | 95.0 | 95.0 | 95.0 | 95.0 | 95.0 |
| Pressure, psig | 399 | 398 | 399 | 399 | 299 | 299 | 299 |
| C2 Part. Pressure, psi | 90.0 | 90.0 | 89.9 | 90.0 | 73.3 | 73.5 | 52.3 |
| H2/C2 Molar Ratio | 0.60 | 0.40 | 0.90 | 0.83 | 0.600 | 0.614 | 0.584 |
| C4/C2 Molar Ratio | 0.000 | 0.000 | 0.000 | 0.000 | 0.000 | 0.000 | 0.000 |
| C6/C2 Molar Ratio | 0.033 | 0.034 | 0.031 | 0.032 | 0.033 | 0.020 | 0.060 |
| IC5% | 0.867 | 0.820 | 0.860 | 0.842 | 0.283 | 0.329 | 0.383 |
| Cat Feed Rate ul/hr | 4.8 | 3.5 | 5.4 | 5.4 | 3 | 3 | 3 |
| Cocatalyst | 2.5% TEAL | 2.5% TEAL | 2.5% TEAL | 2.5% TEAL | 2.5% TEAL | 2.5% TEAL | 2.5% TEAL |
| Cocat. Feed Rate, cc/hr | 210 | 183 | 231 | 210 | 128 | 130 | 134 |
| Production Rate, lb/hr | 28.3 | 28.3 | 24.6 | 26.5 | 25.0 | 24.9 | 24.9 |
| Bed Weight, lbs | 83.7 | 83.7 | 83.3 | 83.1 | 66.4 | 66.8 | 66.6 |
| FBD(lb/ft^3) | 13.2 | 12.2 | 14.5 | 14.2 | 11.9 | 11.8 | 11.7 |
| Bed Volume, ft^3 | 6.3 | 6.9 | 5.7 | 5.9 | 5.6 | 5.7 | 5.7 |
| Residence Time, hr | 3.0 | 3.0 | 3.4 | 3.1 | 2.7 | 2.7 | 2.7 |
| STY, lb/hr/ft^3 | 4.5 | 4.1 | 4.3 | 4.5 | 4.5 | 4.4 | 4.4 |

TABLE 1B

Resin Properties

| | Sample | | | | | | |
|---|---|---|---|---|---|---|---|
| | 1 | 2 | 3 | 4 | 5 | 6 | 7 |
| Melt Index, dg/min I2 | 21.3 | 7.4 | 65.6 | 48.5 | 19.73 | 17.80 | 22.93 |
| Melt Index, dg/min I5 | 61.0 | 21.1 | 187.1 | 137.9 | 56.6 | 51.2 | 66.0 |
| Flow Index, dg/min I21 | 548 | 182 | 1688 | 1238 | 517 | 461 | 604 |
| Density, g/cc | 0.9508 | 0.9474 | 0.9535 | 0.9525 | 0.9497 | 0.9537 | 0.9418 |
| MFR (I21/I2) | 25.7 | 24.6 | 25.7 | 25.5 | 26.2 | 25.9 | 26.3 |
| MFR (I21/I5) | 9.0 | 8.6 | 9.0 | 9.0 | 9.1 | 9.0 | 9.2 |
| Residual Ti., ppm | 1.74 | 1.42 | 2.14 | 2.18 | 2.36 | 2.34 | 3.28 |
| Residual Al, ppm | 57.0 | 48.5 | 59.1 | 62.0 | 74.0 | 110.0 | 71.0 |
| Al/Ti molar | 58.6 | 61.0 | 49.6 | 50.1 | 56.0 | 83.0 | 38.8 |
| Bulk Density, lb/ft^3 | 22.2 | 19.1 | 24.2 | 23.6 | 22.2 | 22.5 | 21.7 |
| APS, inches | 0.023 | 0.028 | 0.021 | 0.021 | 0.023 | 0.026 | 0.019 |
| Fines, Wt % LT 120 Mesh | 2.40 | 1.06 | 2.20 | 2.93 | 2.04 | 1.80 | 4.52 |

Linear Ethylene-Based Interpolymers

As discussed above the high molecular weight ethylene-based interpolymer and the low molecular weight ethylene-based interpolymer are each a linear ethylene-based interpolymer, and preferably a heterogeneously branched linear or a homogeneously branched linear ethylene-based interpolymer. The term "linear ethylene-based interpolymer," as used herein, refers to an interpolymer that lacks long-chain branching, or lacks measurable amounts of long chain branching, as determined by techniques known in the art, such as NMR spectroscopy (for example 1C NMR as described by Randall, Rev. Macromal. Chem. Phys., C29 (2&3), pp. 285-293, incorporated herein by reference). Long-chain branched interpolymers are described in U.S. Pat. Nos. 5,272,236 and 5,278,272. As known in the art, the heterogeneously branched linear and homogeneously branched linear interpolymers have short chain branching due to the incorporation of comonomer into the growing polymer chain.

The terms "homogeneous" and "homogeneously-branched" are used in reference to an ethylene/α-olefin polymer (or interpolymer), in which the α-olefin comonomer is randomly distributed within a given polymer molecule, and substantially all of the polymer molecules have the same ethylene-to-comonomer ratio. These interpolymers are typically prepared using a metallocene catalyst system.

The homogeneously branched linear ethylene interpolymers are ethylene interpolymers, which lack long chain branching (or measurable amounts of long chain branching), but do have short chain branches, derived from the comonomer polymerized into the interpolymer, and in which the comonomer is homogeneously distributed, both within the same polymer chain, and between different polymer chains. Homogeneously branched linear ethylene interpolymers lack long chain branching, just as is the case for the linear low density polyethylene polymers or linear high density polyethylene polymers, made using uniform branching distribution polymerization processes as described, for example, by Elston in U.S. Pat. No. 3,645,992.

Commercial examples of homogeneously branched linear ethylene/α-olefin interpolymers include TAFMER™ polymers supplied by the Mitsui Chemical Company and EXACT™ and EXCEED™ polymers supplied by ExxonMobil Chemical Company.

In a preferred embodiment, the ethylene-based interpolymer is a heterogeneously branched linear ethylene interpolymer. Heterogeneously branched linear ethylene interpolymers include, but are not limited to, interpolymers of ethylene and one or more $C_3$ to $C_8$ α-olefins. Heterogeneously branched ethylene interpolymers can be prepared using Ziegler-Natta catalyst systems. Both the molecular weight distribution, and the short chain branching distribution, each arising from α-olefin (or comonomer) copolymerization, are relatively broad compared to homogeneously branched linear and homogeneously branched linear substantially linear ethylene interpolymers. Heterogeneously branched linear ethylene interpolymers can be made in a solution, slurry, or gas phase process using a Ziegler-Natta catalyst. For example, see U.S. Pat. No. 4,339,507, which is fully incorporated herein by reference.

Heterogeneously branched linear ethylene-based interpolymers differ from the homogeneously branched ethylene-based interpolymers, primarily in their comonomer branching distribution. For example, heterogeneously branched interpolymers have a branching distribution, in which the polymer molecules do not have the same ethylene-to-comonomer ratio. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene).

As discussed above, heterogeneously branched ethylene-based interpolymers are typically prepared with a Ziegler/Natta catalyst system. These linear interpolymers lack long chain branching, or measurable amounts of long chain branching, as discussed above.

Heterogeneously branched ethylene-based interpolymers include, but are not limited to, linear medium density polyethylene (LMDPE), linear low density polyethylene (LLDPE), very low density polyethylene (VLDPE), and ultra low density polyethylene (ULDPE). Commercial polymers include DOWLEX™ polymers, ATTANE™ polymer, TUFLIN™ polymers, and FLEXOME™ polymers (all from The DOW Chemical Company), and ESCORENE™ LLDPE polymers (from Exxon Mobil).

In preferred embodiment, the high molecular weight ethylene-based interpolymer is prepared using a Ziegler/Natta catalyst system, and the low molecular weight ethylene-based interpolymer is prepared using a Ziegler/Natta catalyst system.

In another embodiment, the high molecular weight ethylene-based interpolymer is a heterogeneously branched linear ethylene-based interpolymer, and the low molecular weight ethylene-based interpolymer is a heterogeneously branched linear ethylene-based interpolymer.

Polyethylene Blend

As discussed above, the polyethylene blend of the invention comprises a high molecular weight ethylene-based interpolymer and a low molecular weight ethylene-based interpolymer. In a preferred embodiment, the blend is an in-situ blend. An in-situ blend is formed in a polymerization reactor (or reactor blend), as opposed to a post-reactor blend formed by mixing polymer components after the separate polymerization of each component.

The inventive blend has a single peak in an ATREF profile eluting above 30° C., and has a coefficient of viscosity average molecular weight (CMv) less than −0.0032, and preferably less than −0.0036, and more preferably less than −0.0040, in the log(calculated Mv) versus elution temperature, said CMv calculated in the range of elution temperatures from 70° C. to 90° C. Here, Mv is the viscosity average molecular weight.

ATREF

General Overview

The inventive blend is characterized by ATREF (Analytical Temperature Rising Elution Fractionation), as described, for example, in Wild et al., *Journal of Polymer Science*, Poly. Phys. Ed., Vol. 20, p. 441 (1982); in U.S. Pat. No. 4,798,081 (Hazlitt et al.); or in U.S. Pat. No. 5,089,321 (Chum et al.), the disclosures of all of which are fully incorporated herein by reference. See also L. G. Hazlitt, J. Appl. Polym. Sci. Appl. Poly. Symp., 45, 25-37 (1990), which is fully incorporated herein by reference.

In the technique of Analytical Temperature Rising Elution Fractionation (as described in U.S. Pat. No. 4,798,081), the polymer composition to be analyzed is dissolved in a suitable hot solvent (for example, 1,2,4-trichlorobenzene), and allowed to crystallized in a column containing an inert support (for example, stainless steel shot), by slowly reducing the temperature of the column. The column is equipped with both an (1) infra-red detector (for example, an IR-4 from Polymer ChAR, Valencia, Spain), or a refractive index, and (2) a differential viscometer (DV) detector. An ATREF-DV chromatogram curve is then generated by eluting the crystallized polymer sample from the column, by slowly increasing the temperature of the column.

The ATREF curve is also frequently called the short chain branching distribution (SCBD), since it indicates how the comonomer (for example, hexene) is distributed throughout the sample, in that as elution temperature decreases, comonomer content increases. The IR detector provides concentration of polymer as a function of temperature, which can be used to generate the short chain branching distribution. The differential viscometer detector provides an estimate of the viscosity average molecular weight at each elution temperature (see U.S. Pat. No. 4,798,081). The generated curves that show data obtained from both the IR detector and the differential viscometer detector are known as, collectively, an ATREF-DV overlay profile.

The inventive blends show a characteristic decrease in the measured viscosity average molecular weight (Mv) as the column temperature increases. This decrease in the Mv is observed especially in the region from 70° C. to 90° C. In this region (70° C.-90° C.), a regression slope can be calculated from the log(Mv) versus elution temperature, using a linear regression technique, such as available in the EXCEL program LINEST (MicroSoft Corp., Redmond, Wash.). The regression slope is also denoted as the coefficient of the viscosity average molecular weight (CMv).

A more detailed description of the Analytical Temperature Rising Elution Fractionation-Differential Viscometry (ATREF-DV) analysis is described below.

Determination of the Coefficient of Viscosity Average Molecular Weight (CMv) using ATREF-DV Fractionation by Analytical Temperature Rising Elution Fractionation-Differential Viscometry, ATREF-DV, was performed on the polymer samples, using the methods and apparatus described by Wild[1] and Hazlitt[2,3]. The column was constructed from ⅛"×18" thin-wall stainless-steel tubing, and packed with 0.023"×0.023" stainless-steel shot from Pellets Inc. (Tonawanda, N.Y.). The column had a 1.5 ml interstitial volume.

[1] L. Wild, T. R. Ryle, D. C. Knobeloch, and I. R. Peat, *Journal of Polymer Science: Polymer Physics Edition*, Vol. 20, 441-455 (1982).
[2] L. Hazlitt and D. Moldovan, U.S. Pat. No. 4,798,081, 1989.
[3] L. Hazlitt, *Journal of Applied Polymer Science: Applied Polymer Symposia*, 45, 25-37 (1990).

A controlled GC (Gas Chromatography) oven was used to affect the temperature profiles. Two additional ovens provided high temperature thermal control, respectively, for the sample loading chamber, and a value section, which contained various valves for directing solvent flow. These later two ovens were maintained at 130° C.

As discussed above, the polymer sample was dissolved in a suitable solvent, such as 1,2,4-trichlorobenzene (containing 180 ppm BHT as an antioxidant) to form a polymer solution. The initial polymer concentration was between 50 mg and 200 mg in 50 ml (at room temperature) of the 1,2,4-trichlorobenzene (TCB), and this concentration was adjusted to accommodate the sharpness of the eluting peaks, so that it would not exceed the maximum response for the concentration and viscosity detection in the data collection hardware. Such adjustments can be made by one skilled in the art.

The polymer solution was deposited on the stainless steal column, at a column temperature of 130° C. Once deposited on the column, the temperature of the column was decreased at a maintained rate of –0.1° C./min, to a final column temperature of about 20° C. Next, the elution temperature was increased at a rate of 1.0° C./min, from 20° C. to 122° C. The solvent elution also began at this time, and the solvent (1,2,4-trichlorobenzene containing 180 ppm BHT as an antioxidant) flow rate was 1.0 ml/min. The elution was directed, via heated transfer lines, to, first, an IR-4[4] infrared detector, second, a PD2040 low angle laser light scattering (LALLS) detector[5], and finally, a Model H502C differential viscometer[6]. Each detector was maintained at a temperature of 140° C. A reservoir for solvent waste was provided after the sequence of detectors.

Temperature control, valve sequencing and data collection were achieved using LabView[7] software[8] on a personal computer.

[4] Sold by PolymerChar of Valencia, Spain.
[5] Sold by Precision Detectors of Bellingham Mass.
[6] Sold by Viscotek of Houton, Tex.
[7] Trademark of National Instruments of Austin, Tex.
[8] Written under contract with Quantum Automation of Houston, Tex.
[9] A. Degroot et al, *Waters International GPC Conference* (1998).

The data collected for each copolymer, during each elution of the ATREF-DV apparatus, consisted of the column elution temperature [RTD, $T_i$(° C.)], the mass or concentration response [infrared detector, $IR_i$(mv)], the differential viscosity response [differential viscometer, $DP_i$(mv)], the Inlet Pressure [differential viscometer, $IP_i$(mv)], and the light scattering response [LALLS detector, $LS_i$(mv)]. These are collected at five second intervals. The detector offsets or lag times are corrected in the data processing step. The various detectors are calibrated by using polymers of known weight average molecular weight and intrinsic viscosity[9]. The baseline subtracted data is used in the following equations, where the subscripted i represents an arbitrary data point.

Equation 1 shows the relationship between the intrinsic viscosity, $[\eta]_0$, and the viscosity average molecular weight, $M_v$, for the whole polymer. The values of K and a are $6.3*10^{-4}$ and 0.7, respectively.

$$M_v = \left\{\frac{1}{K} \cdot [\eta]_0\right\}^{1/a} \quad \text{(Equation 1)}$$

Equation 2 describes how the differential viscosity, $\eta_i$, and the inlet pressure, Inlet, $P_i$, is used to estimate $[\eta]_{0,i}$ for an arbitrary data point using the concentration, $c_i$.

$$[\eta]_{0,i} = \frac{4 \cdot \eta_i}{\text{Inlet\_}P_i - 2 \cdot \eta_i / c_i} \quad \text{(Equation 2)}$$

Equation 3 describes how to calculate the viscosity average molecular weight, $M_{v,i}$.

$$M_{v,i} = \left[\frac{1}{K} \cdot \frac{\frac{4 \cdot \eta_i}{IP_i - 2 \cdot \eta_i}}{c_i}\right]^{1/a} \quad \text{(Equation 3)}$$

Equations 4 and 5 describe how to use the signals from the viscometer, $DP_i$ and $IP_i$ to estimate the differential viscosity, $\eta_i$, and the inlet pressure, Inlet\_$P_i$.

$$\eta_i = k_{DP} \cdot DP_i \quad \text{(Equation 4)}$$

$$\text{Inlet\_}P_i = k_{IP} \cdot IP_i \quad \text{(Equation 5)}$$

Equation 6 describes how to calculate the concentration, $c_i$, for an arbitrary point from the IR response, $IR_i$.

$$c_i = k_{IR} \cdot IR_i \quad \text{(Equation 6)}$$

Equation 7 shows the normalization step needed to calculate the overall moments, $M_v$ and $M_w$.

$$C_{total} = \sum_i c_i \cdot w_i \quad \text{(Equation 7)}$$

Equation 8 shows how to calculate the weight average molecular weight for an arbitrary point.

$$M_{w,i} = \frac{k_{LS} \cdot LS_i}{c_i} \quad \text{(Equation 8)}$$

Equations 9 and 10 are used to estimate the values of the various detector constants, $k_{DP}$, $k_{IP}$, $k_{IR}$, and $k_{LS}$, using at least two different polymers, for which the intrinsic viscosity and the weight average molecular weight are known, and adjusting the detector constants, until the proper moments are obtained.

$$M_v = \left[\frac{\sum_i c_i \cdot M_{v,i}^a}{C_{total}}\right]^{1/a} \quad \text{(Equation 9)}$$

$$M_w = \frac{\sum_i c_i \cdot M_{w,i}}{C_{total}} \quad \text{(Equation 10)}$$

Alternatively, the viscometer can be calibrated using methods described by the manufacturer, and the remaining coefficients, $k_{IR}$, and $k_{LS}$, can be obtained as described above. For the purposes of the current invention, only the viscosity average molecular weight, $M_{v,i}$, is required.

As discussed above, the viscosity average molecular weights, $M_{v,i}$, and the elution temperatures, $T_i$, are used to calculate the coefficient of viscosity average molecular weight, CMv, using simple linear regression. This coefficient is the slope for the regression line (log(Mv) vs. elution temperature) using the points between 70° C. and 90° C. in the ATREF-DV data. The values of the logarithm of the viscosity average molecular weights, Log $M_{v,i}$, are treated as the y values, and the elution temperatures, $T_i$, are treated as the x values. As discussed above, the regression slope can be obtained using commercially available routines, such as the function LINEST in EXCEL[10].

[10] Sold by Microsoft Corp.

Polyethylene Composition

In one embodiment, the composition has a density greater than, or equal to, 0.930 g/cc, preferably greater than, or equal to, 0.932 g/cc, and more preferably greater than, or equal to, 0.935 g/cc and most preferably greater than or equal to 0.9375 g/cc. In another embodiment, composition has a density less than, or equal to, 0.945 g/cc, preferably less than, or equal to, 0.942 g/cc. In another embodiment, the composition has a density from 0.930 to 0.945 g/cc, and preferably from 0.932 to 0.943 g/cc, and more preferably from 0.935 to 0.942 g/cc, and most preferably from 0.9375-0.942 g/cc.

In a preferred embodiment, composition has a high load melt index, I21, (190° C., 21.6 kg weight, ASTM 1238-03) greater than, or equal to, 5, preferably greater than, or equal to, 6, and more preferably greater than, or equal to, 7 (units of grams per 10 minutes). In another embodiment, composition has a high load melt index, I21 less than, or equal to, 18, preferably less than, or equal to, 16, and more preferably greater than, or equal to, 14. In yet another embodiment, the I21 ranges from 5 to 18 grams per 10 minutes, and preferably in the range from 7 to 15 grams per 10 minutes, and more preferably in the range from 7.5 to 12 grams per 10 minutes. A composition with a high load melt index less than 5 will be more difficult to extrude. A composition with a high load melt index greater than 18 will have reduced performance properties of SCG, RCP, long term burst, and the like.

In another embodiment, the high molecular weight ethylene-based interpolymer is present in an amount less than, or equal to 60 weight percent, preferably less than, or equal to 58 weight percent, and more preferably less than, or equal to 55 weight percent, based on the sum weight of the high molecular weight ethylene-based interpolymer and the low molecular weight ethylene-based interpolymer. In another embodiment, the low molecular weight ethylene-based interpolymer is present in an amount greater than, or equal to 40 weight percent, preferably greater than, or equal to 42 weight percent, and more preferably greater than, or equal to 45 weight percent, based on the sum weight of the high molecular weight ethylene-based interpolymer and the low molecular weight ethylene-based interpolymer. In another embodiment, the weight ratio of the high molecular weight component to the low molecular weight component (HMW/LMW) is from 60/40 to 45/55, and more preferably from 55/45 to 45/55.

The composition may comprise a combination of two or more embodiments as described herein.

Catalysts

Typical transition metal catalyst systems, which can be used to prepare the inventive blend, are Ziegler-Natta catalyst systems, such as magnesium/titanium based catalyst systems, which can be exemplified by the catalyst system described in U.S. Pat. No. 4,302,565, incorporated herein by reference. See also WO 2006/023057, and WO 2005/012371, each incorporated herein by reference.

In some embodiments, preferred catalysts, used in the process to make the blends of the present invention, are of the magnesium/titanium type. In particular, for gas phase polymerizations, the catalyst is made from a precursor comprising magnesium and titanium chlorides in an electron donor solvent. This solution is often either deposited on a porous catalyst support, or a filler is added, which, on subsequent spray drying, provides additional mechanical strength to the particles. The solid particles from either support methods are often slurried in a diluent, producing a high viscosity mixture, which is then used as catalyst precursor. Exemplary catalyst types are described in U.S. Pat. No. 6,187,866 and U.S. Pat. No. 5,290,745, the entire contents of both are herein incorporated by reference. Precipitated/crystallized catalyst systems, such as those described in U.S. Pat. No. 6,511,935 and U.S. Pat. No. 6,248,831, the entire contents of both are herein incorporated by reference, may also be used.

In one embodiment, the catalyst precursor has the formula $Mg_d Ti(OR)_e X_f (ED)_g$, wherein R is an aliphatic or aromatic hydrocarbon radical having 1 to 14 carbon atoms or COR', wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >2 and up to 1.5*d+3. Such a precursor is prepared from a titanium compound, a magnesium compound, and an electron donor.

The electron donor is an organic Lewis base, liquid at temperatures in the range of about 0° C. to about 200° C., and in which the magnesium and titanium compounds are soluble. The electron donor compounds are sometimes also referred to as Lewis bases. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, and each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While a large excess of electron donor may be used initially to provide the reaction product of titanium compound and electron donor, the final catalyst precursor contains about 1 to about 20 moles of electron donor per mole of titanium compound, and preferably about 1 to about 10 moles of electron donor per mole of titanium compound.

Since the catalyst will act as a template for the growth of the polymer, it is essential that the catalyst precursor be converted into a solid. It is also essential that the resultant solid has the appropriate particle size and shape to produce polymer particles with relatively narrow size distribution, low amounts of fines and good fluidization characteristics. Although this solution of Lewis Base, magnesium and titanium compounds may be impregnated into a porous support, and dried to form a solid catalyst, it is preferred that the solution be converted into a solid catalyst via spray drying. Each of these methods thus forms a "supported catalyst precursor." The spray dried catalyst product is then, preferentially placed into mineral oil slurry. The viscosity of the hydrocarbon slurry diluent is sufficiently low, so that the slurry can be conveniently pumped through the pre-activation apparatus, and eventually into the polymerization reactor. The catalyst is fed using a slurry catalyst feeder. A progressive cavity pump, such as a Moyno pump, is typically used in commercial reaction systems, while a dual piston syringe pump is typically used in pilot scale reaction systems, where the catalyst flows are less than, or equal to, 10 cm³/hour (2.78×10-9 m³/s) of slurry.

A cocatalyst, or activator, is also fed to the reactor to effect the polymerization. Complete activation by additional cocatalyst is required to achieve full activity. The complete activation normally occurs in the polymerization reactor, although the techniques taught in EP 1,200,483, incorporated herein by reference, may also be used.

The cocatalysts, which are reducing agents, are typically comprised of aluminum compounds, but compounds of lithium, sodium and potassium, alkaline earth metals, as well as compounds of other earth metals, other than aluminum are possible. The compounds are usually hydrides, organometal or halide compounds. Butyl lithium and dibutyl magnesium are examples of useful compounds.

An activator compound, which is generally used with any of the titanium based catalyst precursors, can have the formula $AlR_aX_bH_c$, wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides, wherein each alkyl radical has 1 to 6 carbon atoms, and the trialkylaluminums. Examples are diethylaluminum chloride and tri-n-hexylaluminum. About 0.10 moles to about 10 moles, and preferably about 0.15 moles to about 2.5 moles, of activator are used per mole of electron donor. The molar ratio of activator to titanium is in the range of about 1:1 to about 10:1, and is preferably in the range of about 2:1 to about 5:1.

The hydrocarbyl aluminum cocatalyst can be represented by the formula $R_3Al$ or $R_2AlX$, wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

Activators can be added to the precursor either before and/or during polymerization. In one procedure, the precursor is fully activated before polymerization. In another procedure, the precursor is partially activated before polymerization, and activation is completed in the reactor. Where a modifier is used, instead of an activator, the modifiers are usually dissolved in an organic solvent, such as isopentane. Where a support is used, the modifier is typically impregnated into the support, following impregnation of the titanium compound or complex, after which the supported catalyst precursor is dried. Otherwise, the modifier solution is added by itself directly to the reactor. Modifiers are similar in chemical structure and function to the activators, as are cocatalysts. For variations, see for example, U.S. Pat. No. 5,106,926, incorporated herein by reference in its entirety. The cocatalyst is preferably added separately neat, or as a solution in an inert solvent, such as isopentane, to the polymerization reactor at the same time as the flow of ethylene is initiated.

In those embodiments that use a support, the precursor is supported on an inorganic oxide support, such as silica, aluminum phosphate, alumina, silica/alumina mixtures, silica that has been modified with an organoaluminum compound, such as triethyl aluminum, and silica modified with diethyl zinc. In some embodiments silica is a preferred support. A typical support is a solid, particulate, porous material essentially inert to the polymerization. It is used as a dry powder having an average particle size of about 10 µm to about 250µ, and preferably about 30 µm to about 100 µm; a surface area of at least 200 m2/g and preferably at least about 250 m$^2$/g; and a pore size of at least about 100×10-10 m and preferably at least about 200×10-10 m. Generally, the amount of support used, is that which will provide about 0.1 millimole to about 1.0 millimole of titanium per gram of support, and preferably about 0.4 millimole to about 0.9 millimole of titanium per gram of support. Impregnation of the above mentioned catalyst precursor into a silica support can be accomplished by mixing the precursor and silica gel in the electron donor solvent, or other solvent, followed by solvent removal under reduced pressure. When a support is not desired, the catalyst precursor can be used in liquid form.

Polymerization

The novel composition can be made by a variety of methods. For example, it may be made by blending or mixing the high molecular weight interpolymer and the low molecular weight interpolymer, or by melt-blending the individually melted components. Alternatively, it may be made in situ, in one or more polymerization reactors, including, but not limited to, a dual reactor configuration.

In a preferred dual reactor configuration, the catalyst precursor and the cocatalyst are introduced in the first reactor, and the polymerizing mixture is transferred to the second reactor for further polymerization. Insofar as the catalyst system is concerned, only cocatalyst, if desired, is added to the second reactor from an outside source. Optionally the catalyst precursor may be partially activated prior to the addition to the reactor (preferably the first reactor), followed by further "in reactor activation" by the cocatalyst.

In the preferred dual reactor configuration, a relatively high molecular weight (low melt flow index) copolymer is prepared in the first reactor. Alternatively, the low molecular weight copolymer can be prepared in the first reactor, and the high molecular weight copolymer can be prepared in the second reactor. For purposes of the present disclosure, the reactor, in which the conditions are conducive to making a high molecular weight polymer, is known as the "high molecular weight reactor". Alternatively, the reactor, in which the conditions are conducive to making a low molecular weight polymer, is known as the "low molecular weight reactor." Irrespective of which component is made first, the mixture of polymer and an active catalyst is preferably transferred from the first reactor to the second reactor, via an interconnecting device, using nitrogen, or second reactor recycle gas, as a transfer medium.

The polymerization in each reactor is preferably conducted in the gas phase using a continuous fluidized bed process. In a typical fluidized bed reactor, the bed is usually made up of the same granular resin that is to be produced in the reactor. Thus, during the course of the polymerization, the bed comprises formed polymer particles, growing polymer particles, catalyst particles fluidized by polymerization, and modifying gaseous components, introduced at a flow rate or velocity sufficient to cause the particles to separate and act as a fluid. The fluidizing gas is made up of the initial feed, make-up feed, and cycle (recycle) gas, that is, comonomers, and, if desired, modifiers and/or an inert carrier gas.

A typical fluid bed system includes a reaction vessel, a bed, a gas distribution plate, inlet and outlet piping, a compressor, cycle gas cooler, and a product discharge system. In the vessel, above the bed, there is a velocity reduction zone, and, in the bed, a reaction zone. Both are above the gas distribution plate. A typical fluidized bed reactor is further described in U.S. Pat. No. 4,482,687, the entire contents of which are herein incorporated by reference.

The gaseous feed streams of ethylene, other gaseous alpha-olefins, and hydrogen, when used, are preferably fed to the reactor recycle line, as well as liquid or gaseous alpha-olefins and the cocatalyst solution. Optionally, the liquid cocatalyst can be fed directly to the fluidized bed. The partially activated catalyst precursor is preferably injected into the fluidized bed as a mineral oil slurry. Activation is generally completed in the reactors by the cocatalyst. The product composition can be varied by changing the molar ratios of the monomers introduced into the fluidized bed. The product is continuously discharged in granular or particulate form from the reactor, as the bed level builds up with polymerization. The production rate is controlled by adjusting the catalyst feed rate and/or the ethylene partial pressures in both reactors.

A preferred mode is to take batch quantities of product from the first reactor, and transfer these to the second reactor using the differential pressure generated by the recycle gas compression system. A system similar to that described in U.S. Pat. No. 4,621,952, the entire contents of which are herein incorporated by reference, is particularly useful.

The pressure is about the same in both the first and second reactors. Depending on the specific method used to transfer the mixture of polymer and contained catalyst from the first reactor to the second reactor, the second reactor pressure may be either higher than, or somewhat lower than, that of the first. If the second reactor pressure is lower, this pressure differential can be used to facilitate transfer of the polymer catalyst mixture from Reactor 1 to Reactor 2. If the second reactor pressure is higher, the differential pressure across the cycle gas compressor may be used as the motive force to move polymer. The pressure, that is, the total pressure in either reactor, can be in the range of about 200 to about 500 psig (pounds per square inch gauge), and is preferably in the range of about 270 to about 450 psig (1.38, 3.45, 1.86 and 3.10 MPa, respectively). The ethylene partial pressure in the first reactor can be in the range of about 10 to about 150 psig, and is preferably in the range of about 20 to about 80 psig, and more preferably is in the range of about 25 to about 60 psig, (68.9, 1034, 138, 552, 172 and 414 MPa, respectively). The ethylene partial pressure in the second reactor is set according to the amount of copolymer to be produced in this reactor, to achieve the appropriate split. It is noted that increasing the ethylene partial pressure in the first reactor leads to an increase in ethylene partial pressure in the second reactor. The balance of the total pressure is provided by alpha-olefin other than ethylene and an inert gas such as nitrogen. Other inert hydrocarbons, such as an induced condensing agent, for example, isopentane or hexane, also contribute to the overall pressure in the reactor, according to their vapor pressure, under the temperature and pressure experienced in the reactor.

The hydrogen:ethylene mole ratio can be adjusted to control average molecular weights. The alpha-olefins (other than ethylene) can be present in a total amount of up to 15 percent by weight of the copolymer, and, if used, are preferably included in the copolymer in a total amount from about 0.5 to about 10 percent by weight, or more preferably from about 0.8 to about 4 percent by weight, based on the weight of the copolymer.

The residence time of the mixture of reactants including gaseous and liquid reactants, catalyst, and resin, in each fluidized bed can be in the range from about 1 to about 12 hours, and is preferably in the range from about 1.5 to about 5 hours. The reactors can be run in the condensing mode, if desired. The condensing mode is described in U.S. Pat. No. 4,543,399, U.S. Pat. No. 4,588,790 and U.S. Pat. No. 5,352,749, the entire content of each is herein incorporated by reference.

While the polyethylene blends of subject invention are preferably produced in the gas phase by various low pressure processes, the blend can also be produced in the liquid phase in solutions or slurries by conventional techniques, again at low pressures. Low pressure processes are typically run at pressures below 1000 psi, whereas high pressure processes are typically run at pressures above 15,000 psi (6.89 and 103 MPa, respectively).

As discussed above, in a dual reactor system, the high molecular weight component or the low molecular weight component can be prepared in the first reactor or second reactor. Dual reactor systems include, but are not limited to, two gas phase fluidized bed reactors in series, two stirred tank reactors in series, two loop reactors in series, two solution spheres or loops in series, or a suitable combination of two reactors. For the reaction of interest, appropriate comonomer amounts, ethylene partial pressures, and temperatures will be adjusted to produce the desired composition. Such adjustments can be made by those skilled in the art.

High Molecular Weight Reactor Operation Conditions

In an embodiment suitable for pipes, operating temperature can range from about 70° C. to about 110° C. The mole ratio of alpha-olefin to ethylene in this reactor can be in the range of from about 0.03:1 to about 0.105:1, and is preferably in the range of from about 0.04:1 to about 0.1:1 and most preferably from about 0.050:1 to about 0.095:1. The mole ratio of hydrogen (if used) to ethylene in this reactor can be in the range of from about 0.01:1 to about 0.09:1, preferably of from about 0.02 to about 0.05:1.

In an embodiment suitable for blown films, the high molecular weight reactor operating temperature is generally in the range from about 70° C. to about 110° C. The operating temperature is preferably varied with the desired density to avoid product stickiness in the reactor. The mole ratio of alpha-olefin to ethylene can be in the range from about 0.03 to about 0.105:1, preferably in the range from about 0.04:1 to about 0.1:1. The mole ratio of hydrogen to ethylene can be in the range from about 0.01:1 to about 0.09:1, and is preferably in the range from about 0.02:1 to about 0.05:1.

In an embodiment suitable for blow molding, the high molecular weight reactor operating temperature is generally in the range from about 70° C. to about 110° C. The operating temperature is preferably varied with the desired density to avoid product stickiness in the reactor. The mole ratio of alpha-olefin to ethylene can be in the range 0 from about 0.03:1 to about 0.105:1, preferably in the range from about 0.04:1 to about 0.1:1. The mole ratio of hydrogen to ethylene can be in the range from about 0.01:1 to about 1:1, and is preferably in the range from about 0.02:1 to about 0.05:1.

Low Molecular Weight Reactor Operation Conditions

In an embodiment suitable for pipes, blown films and blow molding, the operating temperature is generally in the range from about 70° C. to about 110° C. The mole ratio of alpha-olefin to ethylene can be in the range from about 0.01 to about 0.065:1, preferably in the range from about 0.015:1 to about 0.055:1. The mole ratio of hydrogen to ethylene can be in the range from about 0.1:1 to about 1:1, and is preferably in the range from about 0.2:1 to about 0.95:1.

Additives

The inventive compositions may contain one or more additional components or additives. Suitable additional components include, for example, other polymers, fillers or additives, with the proviso that these additional components do not adversely interfere with the desired advantageous properties of the compositions of the invention. Rather, the additional components are selected such as to support the advantageous properties of an inventive composition and/or to support, or enhance, the composition's particular suitability for a desired application. "Other polymers," comprised in the composition of the invention, means polymers which do not qualify as a HMW interpolymer or a LMW interpolymer, as defined herein. Advantageously, such polymers are compatible with the inventive composition.

Preferred additional components are non polymeric. Additives include processing aids, acid neutralizers, UV stabilizers, antioxidants, process stabilizers, metal de-activators, additives to improve oxidative or chlorine resistance, pigments or colorants.

Effective additive packages are needed to protect the excellent mechanical properties during the life time of the fabricated parts, where the parts are exposed to UV or chlorine environment. A mixture of hindered amines, such as Cyasorb™ UV 3529, Chemisorb™ 944, 2020, 622, Hostavin™ N30, and the like, and UV absorbers, such as Cyasorb™ 531, Tinuvin™ 327, 328, 329, Cyasorb™ THT, and the like, can be used to stabilizer the polymer against the degradation by UV light. The preferred UV additive composition is the mixture of Cyasorb™ UV 531 and Cyasorb™ UV-3529. For domestic pipe applications, where chlorine resistance is needed, a synergetic antioxidant system comprising two or more hindered phenols is used. The first class of hindered phenols comprises the hindered phenols that exhibit excellent antioxidant reactivity (oxidation by oxygen or chlorine), such as IRGANOX™ I-1010, IRGANOX™ I-1076, or/and Hostanox™ O3. The second class of hindered phenol comprises the hindered phenols that have a good water extraction resistance, such as IROGANOX I-1330. In addition metal deactivators, like IROGANOX I-1024 or Naugard XL1, are employed in pipe installations where metal fittings maybe used.

In a preferred embodiment, the total range for UV stabilizers is from 100 to 8000 ppm, with a preferred range from 1000 ppm to 4000 ppm. In another embodiment, the total range of antioxidant/chlorine resistance additives is from 100 to 9000 ppm, with a preferred range from 1000 ppm to 6000 ppm. The preferred range for metal deactivators is from 300 to 2000 ppm.

Stabilizers to protect against degradation or consumption of additives during conversion from granular form to pellets, and in the extrusion of the pipe resin include phosphites. These act to prevent degradation of the phenolic type stabilizers so they are not consumed prior to the pipe being put into long term usage. Stabilizers include TNPP, Irgafos 168, Doverphos 9228, PEPQ, and others. A preferred phosphite is Irgafos 168 or Doverphos 9228. Preferred ranges are from 250 to 2000 ppm levels, more preferred levels are from 750 to 1800 ppm.

In one embodiment, an inventive composition contains one or more additives are selected from hindered amines, hindered phenols, metal deactivators, UV absorbers, phosphites, acid neutralizers, processing aids, and combinations thereof. In another embodiment, the one or more additives are selected from Cyasorb 3529, Irganox 1010, Irganox 1076, Irganox 1330, Irganox MD1024, Irgafos 168, calcium stearate, Dynamar FX 5911, and combinations thereof. In yet another embodiment, the one or more additives are selected from Cyasorb 3529, Irganox 1010, Irganox 1076, Irganox 1330, Irganox MD1024, Doverphos 9228, calcium stearate, Dynamar FX 5911, and combination thereof. In yet another embodiment, the one or more additives are selected from the group consisting of UV N30, Irganox 1330, Doverphos 9228, Irganox MD1024, H03, calcium stearate, Dynamar FX 5911, and combinations thereof.

Fabricated Articles

The compositions of the present invention can be used to manufacture a shaped article, or one or more components of a shaped article. Such articles may be single-layer or a multilayer articles, which are typically obtained by suitable known conversion techniques, applying heat, pressure, or a combination thereof, to obtain the desired article. Suitable conversion techniques include, for example, blow-molding, co-extrusion blow-molding, injection molding, injection stretch blow molding, compression molding, extrusion, pultrusion, calendering and thermoforming. Shaped articles provided by the invention include, for example, pipes, pipe coatings (for example, steel pipe coatings), blow molded articles, injection molded articles, compression molded articles, drip tapes and tubings, geomembranes, films, sheets, fibers, profiles and moldings.

The compositions according to the present invention are particularly suitable for durable applications, especially pipes, without the need for cross-linking. Pipes include monolayer pipes, as well as multilayer pipes, including multilayer composite pipes. Typically, the pipes of the invention are formed from inventive compositions, which also contain a suitable combination of additives, such as, an additive package designed for pipe applications, and/or one or more fillers.

Monolayer pipes, according to the present invention, consist of one layer made from a composition according to the present invention, and suitable additives typically used, or suitable for, pipe applications. As discussed above, such additives, typically include colorants and materials suitable to protect the bulk polymer from specific adverse environmental effects, for example, oxidation during extrusion, or degradation under service conditions. Suitable additives include process stabilizers, antioxidants, pigments, metal de-activators, additives to improve chlorine resistance, and UV protectors.

Preferred multilayer composite pipes include metal/plastic composite pipes and pipes comprising one or more (e.g., one or two) layers, and where at least one layer comprises a composition according to the present invention. In another embodiment, the multilayered pipe will further comprise a barrier layer and/or an adhesive layer. Such pipes include, for example, three-layer composite pipes, with the general structure PE/"Adhesive or Barrier"/PE, or five-layer pipes, with the general structure PE/Adhesive/Barrier/Adhesive/PE or Polyolefin/Adhesive/Barrier/Adhesive/PE. In these structures PE stands for polyethylene layer, which can be made from the same or different polyethylene compositions, and preferably a PE-RT comprising composition, including at least one multimodal polyethylene composition, according to the present invention. Suitable polyolefins include, for example, high density polyethylene, polypropylene and polybutylene, homopolymers and interpolymers. Preferred is a multilayer composite pipe wherein at least the inner layer comprises a multimodal polyethylene resin according to the present invention in a non crosslinked form. More preferred is a multilayer composite pipe, wherein two PE layers comprise a multimodal polyethylene resin according to the present invention. In multilayer pipes, for example, in the three-layer and five-layer structures exemplified above, the barrier layer may be an organic polymer capable of providing the desired barrier properties, such as an ethylene-vinyl alcohol copolymer (EVOH), or a metal, for example, aluminum or stainless steel. The resins and compositions provided by the present invention are particularly suitable for use in domestic and technical pipe applications required to be operable at higher temperatures, for example, above 40° C., and in particular in the range from above 40° C. to about 90° C.

Such pipe applications include, for example, hot water pipes, for example, for drinking and/or sanitary purposes and underfloor heating pipes. Such pipes may be monolayer or multilayer pipes. Preferred pipes according to the invention meet the performance requirements, as defined in the norms for hot water pipes, for example, in ISO 10508 (2006). The multimodal polyethylene resin according to the present invention enables pipes combining an excellent high temperature performance, as reflected, for example, in an excellent Long Term Hydrostatic Strength at higher temperatures (well above 20° C.) with good flexibility. Good flexibility facilitates pipe installation. The pipes can be produced without crosslinking, which allows improved processing economics and subsequent welding. For plastic pipe applications, circumferential (hoop) stress performance, as set forth in ISO 9080 (2003) and ISO 1167 (1996) is an important requirement. The long term behavior or lifetime of plastic pipes can be predicted based on creep rupture data and curves, which establish the allowable hoop stress (circumferential stress), which a pipe can withstand, without failure.

In another embodiment, the rheology modified compositions of the invention, such as the azide-coupled compositions, are particularly useful in fabricating transmission or distribution pipes for water, gases and other liquids or slurries, for PE 2708 (pipe performance, as per ASTM D-3350-05), and especially pipes that equal or exceed a PE 80 performance rating. The rheology modified compositions can be used to increase the service life of the pipe. Such pipes may be formed by extruding the compositions described herein by any convenient method. U.S. Pat. No. 6,204,349; U.S. Pat. No. 6,191,227; U.S. Pat. No. 5,908,679; U.S. Pat. No. 5,683,767; U.S. Pat. No. 5,417,561 and U.S. Pat. No. 5,290,498; disclose various pipes and methods of making the pipes which can be used in embodiments of the invention. As such, the disclosures of all of the preceding patents are fully incorporated herein by reference.

Other useful fabricated articles can be made from the compositions or the rheology modified compositions disclosed herein. For example, molding operations can be used to form useful fabricated articles or parts from the compositions disclosed herein, including various injection molding processes (e.g., that described in Modern Plastics Encyclopedia/89, Mid October 1988 Issue, Volume 65, Number 11, pp. 264-268, "Introduction to Injection Molding" by H. Randall Parker and on pp. 270-271, "Injection Molding Thermoplastics" by Michael W. Green, the disclosures of which are incorporated herein by reference) and blow molding processes (e.g., that described in Modern Plastics Encyclopedia/89, Mid October 1988 Issue, Volume 65, Number 11, pp. 217-218, "Extrusion-Blow Molding" by Christopher Irwin, the disclosure of which is incorporated herein by reference), profile extrusion (i.e., for pipes), calandering, pultrusion, and the like. Fibers (e.g., staple fibers, melt blown fibers or spunbonded fibers (using, e.g., systems as disclosed in U.S. Pat. No. 4,340,563; U.S. Pat. No. 4,663,220; U.S. Pat. No. 4,668,566; or U.S. Pat. No. 4,322,027, all of which are incorporated herein by reference), and gel spun fibers (e.g., the system disclosed in U.S. Pat. No. 4,413,110, incorporated herein by reference), both woven and nonwoven fabrics (e.g., spunlaced fabrics disclosed in U.S. Pat. No. 3,485,706, incorporated herein by reference) or structures made from such fibers (including, e.g., blends of these fibers with other fibers, e.g., polyethylene terephthalate, PET, or cotton) can also be made from the novel compositions disclosed herein.

A blow molded article of the present invention may be manufactured by blow molding the abovementioned coupled polymer composition through the use of a conventional blow molding machine, preferably an extrusion blow molding machine, employing conventional conditions. For example, in the case of extrusion blow molding, the resin temperature is typically between about 180° C. and 250° C. The above mentioned coupled polymer composition having a proper temperature is extruded through a die in the form of a molten tube-shaped parison. Next the parison is held within a shaping mold. Subsequently a gas, preferably air, nitrogen or carbon dioxide, of fluorine for improved barrier performance properties, is blown into the mold, so as to shape the parison according to the profile of the mold, yielding a hollow molded article. Examples of blow molded articles include bottles, drums, and automotive articles such as a fuel tank, a seat back, a head rest, a knee bolster, a glove box door, an instrument panel, a bumper facia, a bumper beam, a center console, an intake manifold, a spoiler, a side molding, a pillar, a door trim, an airbag cover, a HVAC duct, a spare tire cover, a fluid reservoir, a rear window shelf, a resonator, a trunk board or an arm rest.

Adequate parison sag resistance and polymer melt strength is necessary for producing acceptable blow molded articles, especially large blow molded articles such as drums and automotive articles. If the polymer's melt strength is too low, the weight of the parison can cause elongation of the parison, causing problems, such as variable wall thickness and weight in the blow molded article, part blow-out, neck down, and the like. Too high of a melt strength can result in rough parisons, insufficient blowing, excessive cycle times and the like.

Alternatively, a coupling reaction can be carried out in an extruder which also forms the pipe, film, sheet, blow molded article, and the like. In a blow molding machine this is preferably an extrusion blow molding machine. The polymer, a coupling amount of a sulfonyl azide and optionally additional components are introduced into the pipe, film, sheet, or blow molding extruder to form a polymer admixture. The admixture is exposed to a melt process temperature, sufficient to result in the coupling of the polymer forming a molten, coupled polymer composition. The molten, coupled polymer composition is extruded into a molten cylinder, for pipe or film or sheet, or a tube-shaped parison, for the formation of a blow molded article in similar manner as described hereinabove.

Rheology modified polymers are especially useful as blown film for better bubble stability, as measured by low shear viscosity. Polymers rheology modified typically are superior to the corresponding unmodified polymer starting materials for these applications, due to the elevation of viscosity, of preferably at least about 5 percent at low shear rates (<0.1 rad/s), sufficiently high melt strengths to avoid deformation during thermal processing or to achieve bubble strength during blow molding, and sufficiently low viscosities (measured at a shear of 10 rad/s by DMS) to facilitate molding and extrusion. Advantageous toughness and tensile strength of the starting material is maintained or improved.

The compositions of the invention are well suited for the formation of geomembranes, which are essentially impermeable synthetic sheets used for the containment of liquids, gases and/or solids. Geomembranes are used to convey water, hold water, cover water, and protect water by containing hazardous materials. Geomembranes are also used an hydraulic barrier in purification processes, and as a gas barrier. In particular, geomembranes are used to contain water for agricultural use, and/or to keep pollutants out of a clean water supply. A geomembrane may be prepared by sealing, via heat or other means, films or sheets formed from polyolefin compositions, along one or more overlapping seams, to create a long, wide sheet with fused overlaps. A geomembrane may also be formed from sheets of polymer that are welded together on the site of end use, such as on a piece a farm land. Films and sheets may contain multiple layers of coextruded polymer compositions. Polyolefins may be coextruded with polar polymers, such as polyamides, ethylene vinyl alcohol and polyesters.

The inventive compositions may also be used as coatings, for example, pipe coatings, and preferably for steel pipe coatings. An inventive composition can be used to coat steel pipes in oil and gas applications, and thus minimize the potential for corrosion of the underground steel pipes. An inventive composition may be tubular extruded around a steel pipe, or extruded as a flat sheet, and then the sheet is helically wrapped around the steel pipe.

Definitions

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to density, melt index, weight percent of component and other properties.

The term "polymer" is used herein to indicate, for example, a homopolymer, a copolymer, or a terpolymer. The term "polymer" as used herein also includes interpolymers, such as those made by the copolymerization of ethylene with C3-C10 alpha olefins or polypropylene with C4-C10 alpha olefins.

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term "ethylene-based interpolymer," as used herein, refers to an interpolymer that contains at least a majority mole percent polymerized ethylene (based on total amount (moles) of polymerizable monomers), and one or more additional comonomers.

The term "ethylene/α-olefin interpolymer," as used herein, refers to an ethylene-based interpolymer that contains at least a majority mole percent polymerized ethylene (based on total amount (moles) of polymerizable monomers), an α-olefin, and optionally, one or more additional comonomers.

The term "single peak," in reference to an ATREF profile, refers to a peak which does not exhibit two or more distinct maxima. Such a peak may have a leading tail.

The term "unimodal," as used herein, in reference to the overall MWD of comparative examples or in reference to the MWD of a component polymer of the inventive composition, means the MWD in a Gel Permeation Chromatography (GPC) curve does not substantially exhibit multiple component polymers, that is, no humps, shoulders or tails exist or are substantially discernible in the GPC curve. In other words, the DOS (Degree of Separation) is zero, or substantially close to zero.

The term "bimodal," as used herein, means that the MWD in a GPC curve exhibits two component polymers, wherein one component polymer may even exist as a hump, shoulder or tail, relative to the MWD of the other component polymer.

The term "multimodal" as used herein means that the MWD in a GPC curve exhibits more than two component polymers, wherein one component polymer may even exist as a hump, shoulder or tail relative to the MWD of the another component polymer.

The term "distinct," as used in reference to the MWD of the LMW component and the HMW component, means there is no substantial overlapping of the two corresponding molecular weight distributions in the resulting GPC curve. That is, each molecular weight distribution is sufficiently narrow, and their average molecular weights are sufficiently different that the MWD of both components substantially exhibits a baseline on its HMW side as well as on its LMW side. In other words, the DOS is at least 1, preferably at least 2, 4, 5, 7, 9, or 10.

The term "catalyst precursor" as used herein means a mixture comprising titanium and magnesium compounds and a Lewis Base electron donor.

The term "inertly substituted" refers to substitution with atoms or groups which do not undesirably interfere with the desired reaction(s) or desired properties of the resulting coupled polymers.

The term LTD used herein refers to the distribution of the lamella thickness, Lc, of a polymer.

The term "substantially singular peak" is used herein, with reference to LTD curves, to mean that a peak does not substantially exhibit two or more peaks. But a "substantially single peak" may not follow a Gaussian distribution, may be broader than a Gaussian distribution would indicate, or have a flatter peak than a Gaussian distribution. Some substantially singular peaks may have a tail on either side of the peak. In some embodiments, it may be possible to mathematically resolve a "substantially single peak" in an LTD curve into two or more components by various methods. In some embodiments, a "substantially single peak" in an LTD curve follows the equation:

$$\frac{P_H - P_L}{P_i} \times 100\% \leq 10\% \quad (1)$$

where $P_i$ is a point in the LTD curve having a value for the percent weight fraction between that of the highest weight fraction value, $P_H$, of the LTD trace and the lowest point, $P_L$, having an Lc value between the Lc value of $P_i$ and the Lc value of $P_H$. In some instances, this percent difference is less than about 8%, or less than about 7%. In some embodiments a substantially single peak has a difference of about 5% or less, or about 2.5% or less. Of course in some embodiments, there is no point $P_L$ between $P_i$ and $P_H$ so the percent difference is zero.

As used herein, the term "rheology modification" means change in melt viscosity of a polymer as determined by creep measurements and Dynamic Mechanical spectroscopy (DMS).

The term "melt processing" is used to mean any process in which the polymer is softened or melted, such as extrusion, pelletizing, film blowing and casting, thermoforming, compounding in polymer melt form, and the like.

The term "extruder" is used for its broadest meaning to include such devices, as a device which extrudes pellets or pelletizer.

The terms "blend" or "polymer blend," as used herein, mean a mixture of two or more polymers. Such a blend may or may not be miscible. Such a blend may or may not be phase separated. Such a blend may or may not contain one or more domain configurations, as determined from transmission electron microscopy, light scattering, x-ray scattering, and other methods known in the art.

Test Methods

Density

Resin density was measured by the Archimedes displacement method, ASTM D 792-03, Method B, in isopropanol. Specimens were measured within 1 hour of molding, after conditioning in the isopropanol bath at 23° C. for 8 minutes to achieve thermal equilibrium prior to measurement. The specimens were compression molded according to ASTM D-4703-00, Annex A, with a 5 min initial heating period at about 190° C. (±2° C.) and a 15° C./min cooling rate per Procedure C. The specimen was cooled to 45° C. in the press, with continued cooling until "cool to the touch."

Flexural and Secant Modulus Properties

The resin stiffness was characterized by measuring the Flexural Modulus at 5% strain and Secant Modulii at 1% and 2% strain, and a test speed of 0.5 inch/min (13 mm/min) per ASTM D 790-03 Method B. The specimens were compression molded according to ASTM D-4703-00 Annex 1, with a 5 min initial heating period at about 190° C. (±2° C.) and a 15° C./min cooling rate per Procedure C. The specimen was cooled to 45° C. in the press with continued cooling until "cool to the touch."

Tensile Properties

Tensile strength at yield, elongation at yield, tensile strength at break, and elongation at break were measured according to ASTM D-638-03 with a test speed of two inches per minute. All measurements were performed at 23° C. on rigid type IV specimens, which were compression molded per ASTM D 4703-00, Annex A-1, with a 5 minute initial heating period at about 190° C. (±2° C.), and a 15° C./min cooling rate per Procedure C. The specimen was cooled to 45° C. in the press, with continued cooling until "cool to the touch."

Bench Top Impact Test for Rapid Crack Propagation (RCP) Resistance

Rapid crack propagation was measured in accordance with ASTM F-2231-02a, using a compression molded specimen per ASTM F-1473-01, except that the thickness was 2 mm and the notch depth was 1.5 mm. The temperature at the testing machine was 23° C.

Rapid Crack Propagation: Eight inch SDR 11 pipe, sized in accordance with ASTM D-2513-07, was tested in accordance with ISO 13477-1997 for Tc, critical temperature.

PENT (Pennsylvania Notch Test) for Slow Crack Growth Resistance

The Pennsylvania Notch Test (PENT), a slow crack growth test, was performed, following the procedure described by in ASTM F-1473-01, at 80° C. and 2.4 MPa, unless otherwise specified. In the PENT method, a single edge notched test specimen is exposed to a constant load in an oven under a well-controlled temperature. The time to failure can be measured with a timer, and the rate of failure can be measured with a microscope or a dial gauge. The notch depth is generally about 35% of the sample thickness. The width of the notch may vary from about 15 to about 25 mm, and the side grooves can vary from about 0.5 to about 1.0 mm, depending on the width of the specimen.

In the PENT test, a notch is made in the sample by pressing a fresh razor blade into the specimen at a speed of less than 0.25 mm/min. Speeds of less than 0.25 mm/min avoid notch tip damage and still provide a reasonably short notching time. At notching speeds of greater than about 525 μm/min, the failure time is significantly increased. Notching speeds for the side grooves is not particularly important. The apparatus should ensure that the notch and side grooves are coplanar.

During testing, care should be taken to ensure that the specimen grips are appropriately arranged. To that end, the grips should be aligned and centered with respect to the longitudinal axis of the specimen. During gripping the notch should not be activated by bending or twisting the specimen. An alignment jig may be used to aid in properly gripping the specimen, to align the grips, and to avoid bending or twisting the specimen. In addition, the grips should have serrated faces to prevent slippage, and the ends of the grips should be at least 10 mm from the notch.

The testing apparatus may be a direct loading device or a lever loading device. A 5:1 a lever on ratio has been found to be very convenient. The grips may be attached to the loading machine by tabs, which have a universal action such that the applied to load is pure tension. The applied stress is based on the un-notched cross-sectional area. The value of the applied stress depends on the testing temperature. The recommended value is that which produces brittle fracture as fast as possible. Higher stresses produced ductile failure and lower stresses prolong the testing time. Failures exhibiting purely ductile failure mode are not appropriate. For polyethylene samples, the maximum stress for brittle failure, the applied stress should have the values of 5.6, 4.6, 4.2, and 2.4 MPa at temperatures of 23, 42, 50, 80° C., respectively. In general, the stress for brittle failure by slow crack growth should be less than one half the yield point in that particular testing temperature. The temperature should be controlled within ±0.5° C. It is not recommended that polyethylene be tested above 80° C. because of significant morphological changes can occur during the test. Generally, depending on the test temperature, a 1° C. change in the test temperature will change the time to failure by about 10 to 15%.

Environmental Stress Crack Resistance (ESCR)

The resin environmental stress crack resistance (ESCR) was measured per ASTM-D 1693-01, Method B, with either 10 or 100% Igepal Co-630, or Method C with 100% Igepal. Specimens were molded according to ASTM D 4703-00, Annex A, with a 5 min initial heating period at about 190° C. and a 15° C./min cooling rate per Procedure C. The specimen was cooled to 45° C. in the press, with continued cooling until "cool to the touch."

In this test, the susceptibility of a resin to mechanical failure by cracking is measured under constant strain conditions, and in the presence of a crack accelerating agent such as, soaps, wetting agents, and the like. Measurements were carried out on notched specimens, in a 10% or 100% by volume Igepal CO-630 (vendor Rhone-Poulec, N.J.) aqueous solution, maintained at 50° C., or 100% by volume Igepal Co-630 at 100° C. Ten specimens were evaluated per measurement. The ESCR value of the resin is reported as F50, the calculated 50% failure time from the probability graph. Where no failures occurred, a F0 value greater than a certain number of hours was recorded.

Impact Strength

The Izod impact strength (ft.lb/in) is determined for notched compression molded plaques at 23° C. and −40° C.

according to ASTM D 256-03, Method A, using a Tinius Olsen Izod Manual Impact device, with a 200 inch-pound capacity pendulum. The Tensile impact (ft lb/in2) measurement is carried out per ASTM D 1822-99, with type SA compression molded plaques, short with holes and ⅜ inch (9.5 mm) wide tabs, using a Testing Machines Inc. Tensile Impact Model 43-02, with 2 foot pound (0.276 m kg) capacity pendulum.

Both Izod and Tensile compression molded plaques are prepared per ASTM D 4703-00, Annex A, with a 5 min initial heating period at about 190° C. (±2° C.), and a 15° C./min cooling rate per Procedure C. The specimen is cooled to about 45° C. in the press with continued cooling until "cool to the touch."

Dart impact testing is done according to ASTM D 1709-04, Method A, by the staircase technique with the dart dropped around the circumference of the film sample using film specimens with 0.5 mil (13 µm) and 1.0 mil (25 µm) in thickness. The specimens are taken from a blown film line, after at least 3 min of blowing the film with a clean die lip to avoid scratches. To avoid aging effects, dart impact is measured within one hour after the samples were taken.

Vicat softening point (° C.) was measured in accordance with current ASTM D-1525-98.

OIT (Oxidation Induction Time) measurements for steel pipe coating were measured in accordance with current ASTM D-3895-07.

Hardness was measured in accordance with current ASTM D-2240-05.

Charpy Impact was measured in accordance with ISO 179 (2000 version).

Pipe Extrusion Conditions for Pipe Burst Testing Samples

Pipe was extruded on a Davis Standard 2.5 inch (63.5 mm) 24/1 L/D extrusion line, equipped with a pipe die for the manufacture of nominally one inch (25.4 mm) IPS (iron pipe size) SDR 9-15 pipe. The resin was either pre-compounded yellow in a compounding step or premixed with a yellow masterbatch as a "salt and pepper" mixture, consisting of the same base polymer as in this invention and $TiO_2$ pigment and lead chromate yellow pigment in a McQuire feeder/blender system, and was air conveyed into a gravimetric feeder.

The yellow masterbatch formulation contains 12.5 weight percent of a yellow pigment (for example, Krolor® KY-787D (Dominion Color Corp.)), 12.5 weight percent of titanium dioxide (for example, TI-PURE® R960-07 (DuPont) or Millenium TIONA® RCL-6 (Millennium Inorganic Chemicals, Inc.)), 0.15 weight percent Irganox 168, and a carrier resin. In certain instances, like for gas pipe, the carrier resin used is the same inventive resin as described herein.

Pipe could also be extruded in natural form or with a carbon black masterbatch. Suitable carbon black master batches include, but are not limited to, carbon black dispersed in one or more high density polyethylene polymers or linear low density polymers, and carbon black dispersed in one or more components of the inventive compositions.

The pipe extruder temperature profile and process conditions are given in the example below. A vacuum sizing method was employed to dimensionally size the pipe. An additional cooling water tank was employed to completely solidify the pipe. Cooling water temperature was approximately 10° C. A variable speed puller, which was run under constant speed conditions for the pipe size tested, was used. The exiting pipe was cut into 18 inch (457.2 mm) lengths for hydrostatic burst testing.

Typical pipe extrusion conditions are as follows:

| | |
|---|---|
| Barrel Temperature: | 370-400° F. |
| Die Temperature: | 410° F. |
| Melt Temperature: | 405° F. |
| Screw Speed: | 70 rpm |
| Amp Load: | 55% |
| Head Pressure: | 2000-2100 psi |
| Rate: | 125-140 lbs/hr |

Pipe Burst Testing

Pipe burst performance was measured according to ASTM D 1598-02, ASTM D-1599-99, ASTM D 2837-04, ISO 1167 (1996) and/or ISO 9080 (2003), as noted in the experimental tables. The temperatures and times are specified in the tables of the experimental section.

Melt Flow Rate by Extrusion Plastomer

Melt flow rate measurements were performed according to ASTM D-1238-04, Condition 190° C./2.16 kg and Condition 190° C./21.6 kg, which are known as I2 and I21, respectively. Melt flow rate is inversely proportional to the molecular weight of the polymer. Thus, the higher the molecular weight, the lower the melt flow rate, although the relationship is not linear. Melt Flow Ratio (MFR) is the ratio of melt flow rate (I21) to melt flow rate (I2), unless otherwise specified.

When polymers are tested with fluoroelastomer processing aide, the melt indexer should be thoroughly cleaned after each use.

Polymer Fines

The amount of polymer fines in a given sample was determined using the following method: 500 grams of polymer were added to a standard sieve set consisting of the following US mesh sizes: 10, 18, 35, 60, 120, 200 (2000 µm, 1000 µm, 500 µm, 250 µm, 125 µm, 75 µm) and pan. A Rotap or Gradex 2000 shaker was used to separate the particles. The materials which pass through the 120 mesh screen and remain on the pan are classified as fines. The geometric mean is used to calculate the particle average particle size (APS).

Bulk Density

Bulk density of the polymer was determined using ASTM D1895-96 (re-approved 2003).

Film Appearance Rating (FAR)

A FAR value is obtained by comparing the extruded film to a set of reference film standards, both at 1.5 mil (38 µm) thickness for the pipe and blow molding resins. The film resin is fabricated to 1 mil thickness (25 µm) and compared to the 1.5 mil (38 µm) film standards. The standards are available from The Dow Chemical Company (Test Method PEG #510 FAR). For all resins except film resins, the following method is used. The resin extruded is pelleted resin which includes the stabilizer(s). A Model CE-150-20, 38 mm (1.5 in) 20:1 L/D, MPM Custom Equipment electrically heated air-cooled extruder with 7 heating zones (3 barrel, 1 gate, 3 die) was used to make the film specimens.

A more detailed extruder description is as follows:
Extruder Manufacturer: MPM Polymer Systems, Inc.
    Type: Low Boy [610 mm (24 in) Center Line]
    Heating: Electrical 425° C. controllers
    Cooling: Only on hopper (water)
    Speed: Variable
Screw Manufacturer: MPM Polymer Systems, Inc.
    Type: 20:1 standard low density polyethylene screw bored to midway of transition section.
    Diameter: 38 mm (1.5 in)
    L to D: 20/1

Die Manufacturer: MPM Polymer Systems, Inc.
　　Diameter: 100 mm (4 in)
　　Gap: 30 mil (0.762 mm)
　　Type: Deep Side Fed
BlowerManufacturer: Buffalo Forge
　　Air flow control damper on suction
　　Air flow control valving on discharge
　　Motor: 1.5 hp (1120 W), 2 speeds
　　Air equalizing chamber between blower and air
Air Ring Manufacturer: MPM Polymer Systems, Inc.
　　Layout 708
　　Diameter: 172 mm (6.75 in) I.D.
　　Type: Adjustable lip
Tower Height: 914 mm (36 in)
Collapsing Frame Length: 343 mm (13.5 in)
The extrusion conditions for the FAR test were as follows:
Screw Neutral
Hopper Water Full Flow
Temperatures (° C.)

| | |
|---|---|
| Zone 1 | 210 |
| Zone 2 | 210 |
| Zone 3 | 210 |
| Gate | 225 |
| Adapter | 225 |
| Die Zone 1 | 225 |
| Die Zone 2 | 225 |

Screen Pack, stainless steel, mesh 40/40
Output:

| | |
|---|---|
| Screw Speed | 65 rpm |
| Blow up Ratio | 2/1 |
| Lay flat width | 12 in (304.8 mm) |
| Frost Line Height | 103 in (254 mm) |
| Tower Height | 36 in (914.4 mm) |

Film Rating Test:

| | |
|---|---|
| Nip Roll Speed | 254 ft/min (1.29 m/s) |
| Film Gauge | 1.5 mil (0.038 mm) |
| Range for Film Gauge | 1.3-1.7 mil (33-43.2 μm) |

The screw speed can be adjusted to give proper throughput rates. Frost line is measured from the lower level of the air ring. The nip roll speed is varied until a film thickness of 1.5 mil (38 μm) was obtained. Film thickness is measured using a Federal dial indicator gauge according to ASTM D 374.

After the extruder has reached thermal equilibrium, and uniform film is being produced, a film sample of 3 m length was taken. Ratings are based upon the worst section viewed in each sample. This rating is based on the level of gels observed in the film, a general term for a discrete imperfection in polyethylene film. Gels may be formed from high molecular weight material, either clear or discolored, lint or other foreign contamination, or resin cross contamination. Gels are the most common defect encountered in films, and account for a large portion of the film rating. Other defects are noted, but normally are not included in the film appearance value. If needed, reference is made to a set of high density film standards during this evaluation. The values given are in increments of 10 units ranging from +50 (best) to −50 (worst).

Lamellar Thickness Distribution (LTD)

An LTD curve refers to a plot of the weight percent as a function of the lamellar thickness (Lc). Additional information can be found in U.S. Pat. No. 4,981,760 and U.S. Publication 2004/0034169 A1, which are incorporated by reference herein in their entireties.

The LTD data are obtained and analyzed in the following manner. Samples are cut directly from the fabricated polyethylene products. DSC samples are taken from the pipe wall, film, or plaques used for PENT measurements. Samples can also be taken from the pellets to gain an insight into the effect of pelletizing conditions on LTD. If the fabrication process does not yield a uniform cooling/solidification profile, samples are taken from different parts of the product to reflect these differences. This may be important in extruded pipes, if the pipe was cooled from the outside to the inside by cold water such that the cooling rate therefore decreased from the outside to the inside of the pipe wall. To reflect these differences, at least three samples are taken from the outside, middle and inside layer of the pipe wall. About 10 mg of sample is analyzed by DSC using a heating rate of 10° C./min. To better compare the differences caused by molecular variables, the solidification history of the sample is standardized as follows: the specimen is recrystallized by melting the specimen in the DSC sample holder at 190° C., and then cooled down to 30° C. at the rate of 20° C./min to eliminate artifacts in the DSC curve that might otherwise be observed due to previous fabrication processes.

A three step procedure is used. First, the LTD in products, such as pipes or film, is determined by scanning the sample from 30° C. to 190° C., at the heating rate of 10° C./min. The characteristic of the resultant LTD is associated with both the material variables and the processing condition. The sample is maintained at 190° C., for one minute, to completely relax the molecular chains. Second, the sample is cooled at the cooling rate of 20° C./min, from 190° C. to 30° C., to allow the sample to re-crystallize under controlled conditions. The temperature is maintained at 30° C. for one minute. Third, the sample is heated at a rate of 10° C./min to determine LTD in the re-cystallized sample. This LTD is used to investigate the effect of material variables by eliminating the fabrication factors. First, the DSC melting peak is integrated. The melting temperature and the corresponding integrated partial area of the melting peak are recorded. The melting temperature is then used to calculate the lamella thickness, l, of polyethylene crystal according to the well-known Thomson-Gibbs equation from the melting point, Tm.

$$T_m = T_m^\circ \left(1 - \frac{2\sigma_e}{l \cdot \Delta h_m}\right), \quad (1)$$

where $T_m^\circ$ is the equilibrium melting point of an infinite crystal, $\sigma_e$ is the surface free energy of the basal plane, and $\Delta h_m$ is the enthalpy of fusion per unit volume. In *Die Makromolekulare Chemie*, 1968, 113, 1-22, Illers and Hendus experimentally determined the constants in equation (1). The lamella thickness, Lc (nm), then can be calculated from the melting point, Tm (K).

$$L_c = \frac{0.62 - 414.2}{414.2 - T_m}. \quad (2)$$

For a given melting temperature from the DSC melting peak, the corresponding lamella thickness is obtained from equation (2). Lamellar thickness distributions are also discussed in *Polymer* vol. 38, issue 23 (1997) by Zhou, Hongi, and Wilkes, the disclosure of which is hereby incorporated by reference. The integrated partial area of the melting peak is used to calculate the differentiated weight percent of the crystal for a given lamella thickness. The partial area, $\Delta H_i$, of a DSC melting peak is assumed to be proportional to the weight percent of the lamella crystal within this partial area. The differentiated weight percent, wt %, of the lamellae at the thickness $L_{c,i}$ is therefore determined by equation (3).

$$\text{wt } \%(L_{c,i}) = \frac{d(\Delta H_i)/\Delta H_{total}}{d(L_c)} \quad (3)$$

The plot of the weight percent from the integrated partial area as a function of the lamella thickness gives the LTD curve. In addition, the total heat fusion of the melting peak can be used to determine the crystallinity. The detailed data analysis process is discussed in the following. Analysis of the LTD curve obtained from the procedure described above can be analogized to the analysis of (MWD) or polydispersity index (PDI) based on the weight (Mw) and number (Mn) average molecular weight, the thickness average, Lt, and number average, Ln, lamella thickness are therefore defined by equation (4) and (5).

$$L_t = \frac{\sum_{i=1}^{\infty} L_{c,i}^2 n_i}{\sum_{i=1}^{\infty} L_{c,i} n_i} = \sum_{i=1}^{\infty} L_{c,i} \Delta H_i / \Delta H \quad (4)$$

$$L_c = \frac{\sum_{i=1}^{\infty} L_{c,i} n_i}{\sum_{i=1}^{\infty} n_i} = \frac{1}{\sum_{i=1}^{\infty} \left(\frac{\Delta H_i}{\Delta H}\right)/L_{c,i}} \quad (5)$$

Similar to the polydispersity index (PDI=MWD=Mw/Mn) which gives information regarding the molecular weight distribution, the lamella dispersity index, LDI, is hence given by equation $$LDI = \frac{L_t}{L_n}. \quad (6)$$

Thus, the LDI is a quantitative characteristic of the breadth of the LTD curve.

Differential Scanning Calorimetry (DSC)

Thermal measurements, Tm and Tc, are generated via a TA Instruments Model Q1000 DSC equipped with an RCS (refrigerated cooling system) cooling accessory and an auto sampler. A nitrogen purge gas flow of 50 ml/min is used throughout. The sample is pressed into a thin film using a press at 175° C. and 1500 psi (10.3 MPa) maximum pressure for about 15 seconds, then air-cooled to room temperature at atmospheric pressure. About 3 to 10 mg of material is then cut into a 6 mm diameter disk using a paper hole punch, weighed to the nearest 0.001 mg, placed in a light aluminum pan (ca 50 mg) and then crimped shut.

The thermal behavior of the sample is investigated with the following temperature profile. The sample is rapidly heated to 180° C., and held isothermal for three minutes, in order to remove any previous thermal history. The sample is then cooled to −40° C., at 10° C./min cooling rate, and is held at −40° C. for three minutes. The sample is then heated to 150° C., at 10° C./min heating rate. The cooling and second heating curves are recorded.

Gel Permeation Chromatography (GPC)

The following procedure was used to determine the molecular architecture of various polymer compositions. The chromatographic system consisted of a Waters (Millford, Mass.) 150° C. high temperature gel permeation chromatograph, equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories.

The carousel compartment was operated at 140° C., and the column compartment was operated at 150° C. The columns used were four Shodex HT 806M 300 mm, 13 μm columns and one Shodex HT803M 150 mm, 12 μm column. The solvent used was 1,2,4-trichlorobenzene. The samples were prepared at a concentration of 0.1 grams of polymer in 50 milliliters of solvent. The chromatographic solvent and the sample preparation solvent contained 200 μg/g of butylated hydroxytoluene (BHT). Both solvent sources were nitrogen sparged. Polyethylene samples were stirred gently at 160° C. for 4 hours. The injection volume used was 200 microliters and the flow rate was 0.67 milliliters/min.

Calibration of the GPC column set was performed with 21 narrow molecular weight distribution polystyrene standards with molecular weights ranging from 580 to 8,400,000 g/mol which were arranged in six "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight component to minimize degradation. The polystyrene standard peak molecular weights were converted to polyethylene molecular weights using equation 8 (as described in Williams and Ward, J. Polym. Sci., Polym. Let., 6, 621 (1968)):

$$M\text{polyethylene} = A \times (M\text{polystyrene})^B \quad (8),$$

where M is the molecular weight, A has a value of 0.41 and B is equal to 1.0.

The Systematic Approach for the determination of multi-detector offsets was done in a manner consistent with that published by Balke, Mourey, et al. (Mourey and Balke, Chromatography Polym. Chpt 12, (1992) and Balke, Thitiratsakul, Lew, Cheung, Mourey, Chromatography Polym. Chpt 13, (1992)), optimizing dual detector log results from Dow broad polystyrene 1683 to the narrow standard column calibration results from the narrow standards calibration curve using in-house software.

The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing 2nd Virial coefficient effects (concentration effects on molecular weight).

Molecular weight calculations were performed using in-house software. The calculation of the number-average molecular weight, weight-average molecular weight, and z-average molecular weight were made according to the following equations assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (9) below:

$$\text{a) } \overline{M_n} = \frac{\sum_i Wf_i}{\sum_i (Wf_i/M_i)}$$

$$\text{b) } \overline{M_w} = \frac{\sum_i (Wf_i * M_i)}{\sum_i Wf_i}$$

$$\text{c) } \overline{M_z} = \frac{\sum_i (Wf_i * M_i^2)}{\sum_i (Wf_i * M_i)}.$$

(9)

The term "bimodal," as used herein, means that the MWD in a GPC curve exhibits two component polymers, wherein one component polymer may even exist as a hump, shoulder or tail relative to the MWD of the other component polymer. A bimodal MWD can be deconvoluted into two components: LMW component and HMW component. After deconvolution, the peak width at half maxima (WAHM) and the average molecular weight (Mw) of each component can be obtained. Then the degree of separation (DOS) between the two components can be calculated by equation 10:

$$DOS = \frac{\log(M_w^H) - \log(M_w^L)}{WAHM^H + WAHM^L},$$

(10)

wherein $M_w^H$ and $M_w^L$ are the respective weight average molecular weight of the HMW component and the LMW component; and $WAHM^H$ and $WAHM^L$ are the respective peak width at the half maxima of the deconvoluted molecular weight distribution curve for the HMW component and the LMW component.

The DOS for the new composition is about 0.01 or higher. In some embodiments, DOS is higher than about 0.05, 0.1, 0.5, or 0.8. Preferably, DOS for the bimodal components is at least about 1 or higher. For example, DOS is at least about 1.2, 1.5, 1.7, 2.0, 2.5, 3.0, 3.5, 4.0, 4.5, or 5.0. In some embodiments, DOS is between about 5.0 to about 100, between about 100 to 500, or between about 500 to 1,000. It should be noted that DOS can be any number in the above range. In other embodiments, DOS exceeds 1,000.

Swell

The resin swell is measured by the Dow Lab Swell method, which consists of measuring the time required by an extruded polymer strand to travel a pre-determined distance of 230 mm. The Göttfert Rheograph 2003 with, 12 mm barrel, and equipped with a 10 L/D capillary die, is used for the measurement. The measurement is carried out at 190° C., at two fixed shear rates, 300 s$^{-1}$ and 1,000 s$^{-1}$, respectively. The more the resin swells, the slower the free strand end travels and, the longer it takes to cover 230 mm. The swell is reported as t300 and t1000 (s) values.

Rheology

The sample is compression molded into a disk for rheology measurement. The disks are prepared by pressing the samples into 0.071" (1.8 mm) thick plaques, and are subsequently cut into 1 in (25.4 mm) disks. The compression molding procedure is as follows: 365° F. (185° C.) for 5 min at 100 psi (689 kPa); 365° F. (185° C.) for three minutes, at 1500 psi (10.3 MPa); cooling at 27° F. (15° C.)/min to ambient temperature (about 23° C.).

The resin rheology is measured on the ARES I (Advanced Rheometric Expansion System) Rheometer. The ARES is a strain controlled rheometer. A rotary actuator (servomotor) applies shear deformation in the form of strain to a sample. In response, the sample generates torque, which is measured by the transducer. Strain and torque are used to calculate dynamic mechanical properties such as modulus and viscosity. The viscoelastic properties of the sample are measured in the melt, using a parallel plate set up, at constant strain (5%) and temperature (190° C.), and as a function of varying frequency (0.01 to 100 or 500 s$^{-1}$). The storage modulus (G'), loss modulus (G"), tan delta, and complex viscosity (eta*) of the resin are determined using Rheometrics Orchestrator software (v. 6.5.8).

Low shear rheological characterization is performed on a Rheometrics SR5000 in stress controlled mode, using a 25 mm parallel plates fixture. This type of geometry is preferred to cone and plate because it requires only minimal squeezing flow during sample loading, thus reducing residual stresses.

Creep measurements are carried out at 170° C. and 190° C. After zeroing the gap between the parallel plates, the temperature is increased to 220° C. for sample loading (about 5 min), in order to accelerate the relaxation of normal stresses, and then decreased to the measuring temperature. Creep test is performed under a stress of 20 Pa, which is the best compromise to have a good signal to noise (S/N) ratio, while remaining in the linear (low deformation) regime. The deformation is recorded with time up to 30,000 s, or until the viscosity leveled off, indicating that the steady state was reached. The steady-state viscosity is determined using the automatic feature of the Rheometrics Orchestrator software (v. 6.5.8). Several repeats are run, until the standard deviation on the steady-state viscosity decreased below 4%.

A Dynamic Mechanical Spectroscopy (DMS), also called frequency sweep, test in stress-controlled mode is performed before and after the first creep run to check for degradation. The angular frequency is varied from 0.1 to 100 rad/s with a stress amplitude of 1000 Pa, which corresponds to strain amplitudes between 0.1% (at 100 rad/s) and 10% (at 0.1 rad/s). It is concluded that stability is good. On the subsequent runs, the DMS test is run only after the creep test to avoid introducing perturbations due to shear history.

The steady-state data point from creep is combined with the viscosity curve from DMS to extend the accessible range of shear rates down to $10^{-6}$ 1/s, and fitted with the 4-parameter Carreau-Yasuda model:

$$\eta = c_1(1+(c_2 x)^{c_3})^{(c_4-1)/c_3} \qquad (11).$$

Antioxidant Content by High Pressure Liquid Chromatography (HPLC)

Antioxidants, such as Irgafos 168 and Irganox 1010, are commonly used to protect the polymer from thermal and or oxidative degradation. Irganox 1010 is tetrakis (methylene (3,5 di tert-butyl-4hydroxyhydrocinnamate) available from Ciba Geigy Inc. Irgafos 168 is tris-(2,4-di-tert-butylphenyl) phosphite available from Aldrich Chemical Company.

Sample Preparation: Polyolefin pellets are powdered using a Retsch Model ZM100 Grinder fitted with a 1.0 mm sieve. The 1.0 mm sieve produced particles with an average size of 0.5 mm. The pellets and grinder are chilled with liquid nitrogen prior to grinding. About 2 grams of polymer is placed in a polystyrene cup, and about 50 mL of liquid nitrogen is added to cool the polymer. About 50 mL of liquid nitrogen is poured into the funnel of the grinder to cool the mechanical parts, followed by pouring the liquid and the pellets from the polystyrene cup into the grinder.

Extraction: Five grams of the powder is extracted with 40 mls of carbon disulfide (C2S) by shaking with an automated shaker for 72 hours. Five mls of the extract are taken from the clear, transparent lower layer of the CS2 extract, and dried under a gently flowing dry nitrogen stream. The resulting residue is dissolved in 5 ml of isopropanol, with gentle heating on a steam bath, cooled and filtered using a 0.2 m syringe filter into a HPLC sample vial, and analyzed by HPLC according to the following procedure.

The HPLC instrument is a HP 1090 available from Hewlett-Packard, Inc., with a Thermo Hypersil column from Keystone Scientific. The column packing is Waters Spherisorb ODS 2. Column size is 150×4.6 mm, pore size 80 angstroms, and particle size 3 μm. The initial solvent is a mixture consisting of 30% water and 70% acetonitrile. At 10 minutes, 100% acetonitrile is introduced, then at 15 minutes a mixture consisting of 80% acetonitrile and 20% isopropanol is introduced. Total run time is 20 minutes, at a flow rate of 1 ml per minute. The 276 nm wavelength is monitored.

Calibration for each additive is performed by making up a known concentration of the additive in isopropanol (about 0.03 g per 100 ml). For oxidized Irgafos 168 the calibration is performed by oxidizing a standard isopropanol solution of Irgafos 168 with excess hydrogen peroxide for 1 hour.

Brittleness Temperature

Brittleness temperature is measured according to ASTM D-746-98, Procedure A, using a Tinius Olsen Brittle Point Tester, with specimen Type 1, for fixture type A, tightened with torque per Note 8. Heat transfer medium is methanol or isopropanol.

Thermal Stability

Thermal Stability is measured according to ASTM D-3350-02, section 10.1.9, by a DSC technique. Thermal Stability is also called Oxidation Induction Time, with the time to failure measured at 210° C. Test specimens taken from pipe or fittings, made from the virgin material, are measured using differential scanning calorimeter (DSC). The directions of the instrument (DSC) manufacturer regarding calibration and operation is followed, except when in conflict with other parts of section 10.1.9. The polyethylene-based resin contains sufficient antioxidant, so that the minimum induction temperature is 220° C., when tested in accordance with section 10.1.9.

Minimum Required Strength (MRS) Rating

Minimum required strength (MRS) Rating is determined in accordance with ISO 9080, using a 1 inch pipe specimen with standard dimension ratio (SDR=diameter/minimum wall thickness)=11. The pipe specimen is sealed with known internal pressure, and immersed in a water bath at the specified temperature.

The g' Average

The g' is expressed as the ratio of intrinsic viscosity of the instant high-density polyethylene composition to the intrinsic viscosity of a linear polymer reference. The g' average was determined according to the following procedure.

The chromatographic system consisted of a Waters (Millford, Mass.) 150° C. high temperature chromatograph, equipped with a Precision Detectors (Amherst, Mass.) 2-angle laser light scattering detector Model 2040, an IR4 infra-red detector from Polymer Char (Valencia, Spain), and a Viscotek (Houston, Tex.) 150R 4-capillary viscometer. The 15-degree angle of the light scattering detector was used for calculation purposes. Data collection was performed using Viscotek TriSEC software, version 3, and a 4-channel Viscotek Data Manager DM400. The system was equipped with an on-line solvent degas device from Polymer Laboratories. The carousel compartment was operated at 140° C., and the column compartment was operated at 150° C. The columns used were 4, 20-micron mixed-bed light scattering "Mixed A-LS" columns from Polymer Laboratories. The solvent used was 1,2,4-trichlorobenzene. The samples were prepared at a concentration of 0.1 grams of polymer in 50 milliliters of solvent. The chromatographic solvent and the sample preparation solvent contained 200 ppm of butylated hydroxytoluene (BHT). Both solvent sources were nitrogen sparged. Polyethylene samples were stirred gently at 160 degrees Celsius for 4 hours. The injection volume used was 200 microliters, and the flow rate was 1 milliliters/minute.

Calibration of the GPC column set was performed with 21 narrow molecular weight distribution polystyrene standards, with molecular weights ranging from 580 to 8,400,000, and were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000, and 0.05 grams in 50 milliliters of solvent for molecular weights less than 1,000,000. The polystyrene standards were dissolved at 80° C., with gentle agitation for 30 minutes. The narrow standards mixtures were run first, and in order of decreasing highest molecular weight component to minimize degradation. The polystyrene standard peak molecular weights were converted to polyethylene molecular weights using the following equation (as described in Williams and Ward, J. Polym. Sci., Polym. Let., 6, 621 (1968)):

$$M\text{polyethylene} = A \times (M\text{polystyrene})^B$$

Where M is the molecular weight, A has a value of 0.43 and B is equal to 1.0.

The Systematic Approach for the determination of multi-detector offsets was done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from Dow Broad Polystyrene 1683 to the narrow standard column calibration results from the narrow standards calibration curve using a software. The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight was obtained from the sample refractive index area and the refractive index detector calibration from a linear polyethylene homopolymer of 115,000 molecular weight. The chromatographic concentrations were assumed low enough to eliminate addressing 2nd Virial coefficient effects (concentration effects on molecular weight).

The g' average was calculated for the samples as follow:

1. Calibrated the light scattering, viscosity, and concentration detectors with NBS 1475 homopolymer polyethylene (or equivalent reference);
2. Corrected the light scattering and viscometer detector offsets relative to the concentration detector as described in the calibration section;
3. Subtracted baselines from the light scattering, viscometer, and concentration chromatograms and set integration windows making certain to integrate all of the low molecular weight retention volume range in the light scattering chromatogram that were observable from the refractometer chromatogram;
4. Established a linear homopolymer polyethylene Mark-Houwink reference line by injecting a standard with a polydispersity of at least 3.0, calculated the data file (from above calibration method), and recorded the intrinsic viscosity and molecular weight from the mass constant corrected data for each chromatographic slice;
5. Injected the HDPE sample of interest and calculated the data file (from above calibration method), and recorded the intrinsic viscosity and molecular weight from the mass constant corrected data for each chromatographic slice;
6. Shifted the homopolymer linear reference intrinsic viscosity by the following factor: IV=IV+1/(1+2*SCB/1,000C*branch point length) where IV is the intrinsic viscosity of the HDPE sample of interest, SCB/1,000C was determined from C13 NMR, and the branch point length is 2 for butene, 4 for hexene, or 6 for octene);
7. Calculated g' average according to the following equation.

$$g' = \frac{\sum_{j=WhereM>40,000}^{HighestM}\left[c_j \times \left(\frac{IV_j}{IV_{L_j}}\right)_M\right] + \sum_{j=LowestM}^{WhereM>40,000} c_j}{\sum_{j=LowestM}^{HighestM} c_j}$$

In the above equation, c is the concentration of the slice, IV is the intrinsic viscosity of the HDPE, and $IV_L$ is the intrinsic viscosity of the linear homopolymer polyethylene reference (corrected for SCB of the HDPE sample of interest) at the same molecular weight (M). The IV ratio was assumed to be one, at molecular weights less than 40,000 to account for natural scatter in the light scattering data.

The polyethylene composition may have a g' average of equal, or greater than, 1, as measured by Triple Detector GPC, as described above. As discussed above, the g' is expressed as the ratio of intrinsic viscosity of the instant high-density polyethylene composition to the intrinsic viscosity of a linear polymer reference. If the g' is equal, or greater than, 1, then the sample being analyzed is considered linear, and if g' is less than 1, it is, then, by definition a branched polymer as compared to a linear polymer. However, current testing methods may be subject to errors in their precision and accuracy; thus, proper steps must be taken to account for such precision errors. Therefore, small deviations, for example values of less than, or equal to, 0.020, from unity, i.e. 0.980 would still be defined as linear polymers.

EXAMPLES OF THE INVENTION

The following examples are to illustrate this invention and to not limit it. Ratios, parts, and percentages are by weight, unless otherwise stated.

The following samples were compared:
Inventive Samples: I922; I515; I516; I513; I514; I517; and D 2-4.
Comparative Samples: C918; C919; C920; C921; C923; C924; C636; C024; C025; C453; C454; C586; C587; C588; C589; C590; C591; C592; C510; C512; and Samples A-D.
Competitive Samples: COM049; COM769; XD-66.
Catalyst Preparation
Preparation of Catalyst Precursor For the inventive and comparative examples, a titanium trichloride catalyst precursor was prepared in an approximately 7,500 liter glass lined vessel, equipped with pressure and temperature control, and a turbine agitator. A nitrogen atmosphere (<5 ppm $H_2O$) was maintained at all times. Tetrahydrofuran (10,500 lbs, 4,800 kg, <400 ppm $H_2O$) was added to the vessel. The tetrahydrofuran was recovered from a closed cycle dryer, and contained approximately 0.1 percent Mg and 0.3 percent Ti. An "11 percent THF solution" of triethylaluminum was added to scavenge residual water. The reactor contents were heated to 40° C., and 13.7 lbs (6 kg) of granular magnesium metal (particle size 0.1-4 mm) was added, followed by 214.5 lbs (97.3 kg) of titanium tetrachloride added over a period of one-half hour.

The mixture was continuously agitated. The exotherm resulting from the addition of titanium tetrachloride caused the temperature of the mixture to rise to approximately 44° C. The temperature was then raised to 70° C., and held at that temperature for approximately four hours, then cooled to 50° C. At the end of this time, 522 pounds (238 kg) of magnesium dichloride were added, and heating initiated to raise the temperature to 70° C. The mixture was held at this temperature for another five hours, then cooled to 35° C., and filtered through a 100 mesh (150 μm) filter to remove solids.

Fumed silica (CAB-O-SIL™ TS-610, manufactured by the Cabot Corporation) (811 lbs, 368 kg) was added to the above precursor solution over a period of one hour. The mixture was stirred by means of a turbine agitator during this time, and for 4 hours thereafter, to thoroughly disperse the silica. The temperature of the mixture was held at 40° C. throughout this period, and a dry nitrogen atmosphere was maintained at all times. The resulting slurry was spray dried using an 8-foot diameter closed cycle spray dryer, equipped with a rotary atomizer. The rotary atomizer was adjusted to give catalyst particles with a D50 on the order of 20-30 μm. The scrubber section of the spray dryer was maintained at approximately +5 to −5° C.

Nitrogen gas was introduced into the spray dryer at an inlet temperature of 140 to 165° C., and was circulated at a rate of approximately 1000-1800 kg/hour. The catalyst slurry was fed to the spray dryer at a temperature of about 35° C., and a rate of 65-150 kg/hour, or sufficient to yield an outlet gas temperature in the range of 100-125° C. The atomization pressure was maintained at slightly above atmospheric. The resulting catalyst particles were mixed with mineral oil (Kaydol™ 350, available from Witco Corporation), under a nitrogen atmosphere in a 400 liter glass lined vessel, equipped with a turbine agitator, to form a slurry containing approximately 28 percent of the catalyst precursor.

Catalyst Precursor Partial Pre-Activation

In some of the polymerizations (noted 0017 reduction), the catalyst precursor was partially pre-activated. The mineral oil slurry of precursor was partially activated by contact at room temperature with a 30 percent mineral oil solution of diethylaluminum chloride (DEAC), a 50 percent mineral oil solution of tri-n-hexyl aluminum (TNHA), or a sequential mixture of both activators. The catalyst precursor slurry was added to a mixing vessel at room temperature in an amount less than a stoichiometric amount, based on Lewis base present in the precursor. An appropriate amount of activator was added while stirring. If both activators were used, the DEAC solution was added first, and the slurry was stirred for one hour, followed by addition of the TNHA solution, followed by stirring for another two hours. If only DEAC or TNHA activator was used, addition was followed by stirring for at least one hour prior to use. Following partial activation, the slurry containing the partially activated precursor was retained at room temperature prior to use.

Representative Polymerization

For the inventive and comparative examples, ethylene was copolymerized with 1-hexene in two fluidized bed reactors. Each polymerization was continuously conducted after equilibrium was reached, under the respective conditions, as set forth in the respective tables of Tables 2A-6I, as shown below. Polymerization was initiated in the first reactor by continuously feeding the catalyst (Ziegler/Natta catalyst) and cocatalyst (trialkyl aluminum) into a fluidized bed of polyethylene granules, together with ethylene, 1-hexene and hydrogen. The resulting copolymer, mixed with active catalyst, was withdrawn from the first reactor and transferred to the second reactor, using second reactor gas as a transfer medium. The second reactor also contained a fluidized bed of polyethylene granules. Ethylene, 1-hexene, and hydrogen were introduced into the second reactor, where the gases come into contact with the polymer and catalyst from the first reactor. Inert gases, nitrogen and isopentane, make up the remaining pressure in both the first and second reactors. In the second reactor, the cocatalyst was again introduced. The final product blend was continuously removed. As known in the art, 1 kPa is 0.145 psi, 1 kg is 2.205 lb and 1 in is 25.4 mm.

Summary of Results

The inventive examples have improved 60° C. burst performance that meets the ASTM D-2513-05 requirements of the 1000 psi hydrostatic design basis burst performance category, when tested at 60° C. This means that the extrapolated 100,000 hour intercept of the ductile failure data developed, falls within the 1000 psi hydrostatic design basis (HDB) category according to ASTM D-2837-04, when tested at 60° C. This category ranges from 960 psi at the lower level to 1200 psi at the upper level. The long-term hydrostatic strength is determined to the nearest 10 psi. Rounding procedures in practice E 29 should be followed (see note 1 in ASTM D2837). So long-term hydrostatic strength values having 955 psi to 1195 psi at 100,000 hours qualifies for the 1000 psi HDB rating.

The comparative samples all fall short of this requirement. The ductile failure curve has a distribution of 12-18 points or more, as specified in ASTM D-2837-04, depending on the length of testing. All samples were tested to at least 6,000 hours, and some samples were tested out to 15,000+ hours or more. These samples also needed to have excellent impact performance, as a measure of rapid crack propagation, and excellent slow crack growth performance. The inventive examples had among the best impact properties of all samples tested. When the proper component blend features, as measured by ATREF, show a single peak in an ATREF profile eluting above 30° C., and has a coefficient of viscosity average molecular weight (CMv) less than −0.0032 in the log (calculated Mv) versus elution temperature, said CMv calculated in the range of elution temperatures from 70° C. to 90° C. (Here Mv is the viscosity average molecular weight), the samples pass the 60° C. burst performance criteria.

Pipes prepared from the inventive compositions have passed the primary 60° C. burst validation test protocol as per Plastics Pipe Institute (PPI) TR#3 (2003), section F.4.1.2, having maintained burst performance at 90° C. and 690 psi hoop stress, for over 3800 hours, without failure. Pipes prepared from the inventive compositions could also be tested according to the PPI TR#3, section F.4.3, validation method to meet the validation test requirement as well.

TABLE 2A

| | \multicolumn{6}{c}{INVENTIVE SAMPLES} | | | | | |
|---|---|---|---|---|---|---|
| | \multicolumn{6}{c}{SAMPLE NO.} | | | | | |
| | I513 | I514 | I515 | I516 | I517 | I922 |
| Type | 0017 reduction | 0017 reduction | 0017 reduction | 0017 reduction | 0017 reduction | Precursor |
| REACTION CONDITIONS (First Reactor) | | | | | | |
| Temp. ° C. | 80.0 | 80.0 | 80.0 | 80.0 | 80.0 | 80.0 |
| C2 Part. Pressure, psi | 32.2 | 30.9 | 31.3 | 28.2 | 27.6 | 35.6 |
| H2/C2 Molar Ratio | 0.034 | 0.034 | 0.034 | 0.034 | 0.035 | 0.034 |
| C6/C2 Molar Ratio | 0.070 | 0.070 | 0.062 | 0.080 | 0.081 | 0.087 |
| Ethylene lb/hr | 22.1 | 20.4 | 20.5 | 21.1 | 19.6 | 27.3 |
| Hexene lb/hr | 1.0 | 0.9 | 0.8 | 1.1 | 1.1 | 1.3 |
| Hydrogen mlb/hr | 6.3 | 5.8 | 6.0 | 5.6 | 5.1 | 6.4 |
| Nitrogen lb/hr | 6.1 | 6.2 | 6.1 | 6.0 | 5.8 | 4.5 |
| Ethylene Mol % | 10.3 | 9.9 | 10.0 | 9.0 | 8.8 | 11.4 |
| Hexene Mol % | 0.7 | 0.7 | 0.6 | 0.7 | 0.7 | 1.0 |
| Hydrogen Mol % | 0.3 | 0.3 | 0.3 | 0.3 | 0.3 | 0.4 |
| Isopentane Mol % | 7.8 | 6.5 | 6.7 | 8.0 | 6.7 | 8.0 |

TABLE 2A-continued

INVENTIVE SAMPLES

| | \<td colspan=6>SAMPLE NO.| | | | | |
|---|---|---|---|---|---|---|
| | I513 | I514 | I515 | I516 | I517 | I922 |
| Nitrogen Mol % | 80.3 | 82.9 | 82.6 | 81.9 | 83.9 | 78.9 |
| Cat cc/hr | 2.2 | 2.2 | 2.2 | 2.2 | 2.2 | 14.4 |
| E.B. Production Rate, lb/hr | 25.1 | 24.0 | 23.9 | 24.0 | 24.1 | 34.8 |
| Bed Weight, lbs | 68.8 | 69.6 | 69.6 | 70.4 | 70.4 | 68.5 |
| FBD(lb/ft3) | 21.5 | 22.4 | 22.6 | 22.7 | 23.2 | 11.8 |
| Bed Volume, ft3 | 9.64 | 10.64 | 10.64 | 10.64 | 10.64 | 11.64 |
| Residence Time, hr | 2.7 | 2.9 | 2.9 | 2.9 | 2.9 | 2.0 |
| STY, lb/hr/ft3 | 2.6 | 2.3 | 2.3 | 2.3 | 2.3 | 3.0 |
| SGV (ft/sec) | 2.6 | 3.6 | 4.6 | 5.6 | 6.6 | 11.6 |

TABLE 2B

INVENTIVE SAMPLES continued

| | SAMPLE NO. | | | | | |
|---|---|---|---|---|---|---|
| | I513 | I514 | I515 | I516 | I517 | I922 |
| RESIN PROPERTIES (First Reactor) | | | | | | |
| Flow Index, dg/min I21 | 0.59 | 0.56 | 0.50 | 0.62 | 0.57 | 0.55 |
| Melt Index, dg/min I2 | — | — | — | — | — | — |
| Density, g/cm3 | 0.9250 | 0.9246 | 0.9257 | 0.9235 | 0.9232 | 0.9231 |
| MFR | — | — | — | — | — | — |
| Titanium, ppmw | 1.9 | 2.0 | 2.1 | 1.9 | 2.0 | 1.8 |
| Aluminum ppmw | 87.5 | 93.2 | 97.7 | 93.9 | 94.9 | 70.1 |
| Al/Ti | 83.7 | 81.3 | 81.3 | 87.9 | 84.8 | 70.9 |
| Bulk Density, lb/ft3 | 17.7 | 17.5 | 17.4 | 17.0 | 17.1 | 15.5 |
| APS, inches | 0.032 | 0.030 | 0.029 | 0.031 | 0.028 | 0.038 |
| Fines, Wt % LT 120 Mesh | 1.5 | 1.3 | 1.5 | 1.6 | 2.8 | 0.7 |
| GPC Analysis Conventional | | | | | | |
| Mn | 73300.0 | 70700.0 | 71100.0 | 66200.0 | 65500.0 | |
| Mw | 323000.0 | 320000.0 | 315000.0 | 306000.0 | 270000.0 | |
| Mw/Mn | 4.41 | 4.53 | 4.43 | 4.62 | 4.12 | |
| Mz | 911000.0 | 930000.0 | 849000.0 | 842000.0 | 711000.0 | |
| Absolute | | | | | | |
| Mn | 83100.0 | 81300.0 | 84400.0 | 76400.0 | 75800.0 | |
| Mw | 367000.0 | 361000.0 | 360000.0 | 350000.0 | 310000.0 | |
| Mz | 1031000.0 | 1008000.0 | 1000000.0 | 1000000.0 | 854000.0 | |
| Mz/Mw | 2.81 | 2.79 | 2.78 | 2.86 | 2.75 | |
| g' | 1.03 | 1.03 | 1.03 | 1.03 | 1.03 | |

TABLE 2C

INVENTIVE SAMPLES continued

| REACTION CONDITIONS (Second Reactor) | SAMPLE NO. | | | | | |
|---|---|---|---|---|---|---|
| | I513 | I514 | I515 | I516 | I517 | I922 |
| Temp. °C. | 95.0 | 95.0 | 95.0 | 94.9 | 95.0 | 94.9 |
| Pressure, psig | 397.1 | 397.1 | 397.0 | 396.8 | 397.1 | 342.1 |
| C2 Part. Pressure, psi | 95.2 | 94.0 | 92.7 | 101.8 | 85.5 | 108.8 |
| H2/C2 Molar | 0.4 | 0.7 | 0.5 | 0.3 | 0.9 | 0.5 |

TABLE 2C-continued

INVENTIVE SAMPLES continued

| REACTION CONDITIONS (Second Reactor) | I513 | I514 | I515 | I516 | I517 | I922 |
|---|---|---|---|---|---|---|
| Ratio C6/C2 Molar Ratio | 0.03 | 0.03 | 0.03 | 0.03 | 0.03 | 0.03 |
| Ethylene lb/hr | 31.1 | 26.4 | 27.0 | 37.8 | 14.4 | 36.6 |
| Hexene lb/hr | 0.9 | 0.9 | 0.8 | 0.8 | 0.5 | 1.1 |
| Isopentane lb/hr | 0.3 | 0.0 | 0.0 | 0.0 | 0.7 | 1.0 |
| Nitrogen lb/hr | 20.5 | 15.4 | 17.4 | 21.6 | 14.3 | 14.5 |
| Ethylene Mol % | 23.1 | 22.8 | 22.5 | 24.7 | 20.7 | 30.5 |
| Hexene Mol % | 0.7 | 0.7 | 0.7 | 0.7 | 0.5 | 1.0 |
| Hydrogen Mol % | 9.0 | 15.6 | 10.9 | 7.4 | 18.0 | 15.3 |
| Isopentane Mol % | 1.0 | 0.8 | 0.8 | 1.0 | 1.0 | 0.3 |
| Nitrogen Mol % | 63.9 | 59.1 | 63.7 | 64.1 | 58.8 | 52.2 |
| E.B. Production Rate, lb/hr | 17.9 | 14.7 | 17.2 | 21.3 | 13.6 | 24.4 |
| Bed Weight, lbs | 107.4 | 107.9 | 107.3 | 107.6 | 107.1 | 100.1 |
| Fluidized Bed Density (lb/ft3) | 13.4 | 13.5 | 13.5 | 12.8 | 13.4 | 13.4 |
| Bed Volume, ft3 | 11.0 | 12.0 | 12.0 | 12.0 | 12.0 | 13.0 |
| Residence Time, hr | 2.50 | 2.79 | 2.61 | 2.38 | 2.84 | 1.69 |
| Space Time Yield, lb/hr/ft3 | 3.9 | 3.2 | 3.4 | 3.8 | 3.1 | 4.6 |
| Superficial gas velocity (ft/sec) | 1.7 | 1.6 | 1.7 | 1.7 | 1.6 | 1.7 |

TABLE 2D

INVENTIVE SAMPLES continued

| RESIN PROPERTIES (Blend) | I513 | I514 | I515 | I516 | I517 | I922 |
|---|---|---|---|---|---|---|
| Flow Index, dg/min I21 (G) | 8.1 | 9.0 | 8.4 | 8.4 | 10.1 | 9.4 |
| Melt Index, dg/min I2 (G) | 0.16 | 0.15 | 0.14 | 0.18 | 0.15 | 0.17 |
| Density, g/cm3 (G) | 0.9394 | 0.9406 | 0.9407 | 0.9390 | 0.9406 | 0.9392 |
| MFR (MI21/MI2) (G) | 51.3 | 59.3 | 57.8 | 46.0 | 68.3 | 56.0 |
| Titanium, ppmw (G) | 1.0 | 1.6 | 1.1 | 1.0 | 1.2 | 0.9 |
| Aluminum ppmw (G) | 60.7 | 66.1 | 65.1 | 56.3 | 72.2 | 45.6 |
| Al/Ti (G) | 112.4 | 75.1 | 105.1 | 98.5 | 106.8 | 89.1 |
| Bulk Density, lb/ft3 (G) | 20.2 | 20.6 | 20.1 | 19.6 | 20.6 | 18.0 |
| APS, inches (G) | 0.030 | 0.027 | 0.027 | 0.030 | 0.028 | 0.035 |
| Fines, Wt % less than 120 Mesh (G) | 2.2 | 2.9 | 2.0 | 2.2 | 3.5 | 1.3 |
| Split % by Energy Balance (G) | 58.3 | 61.9 | 58.2 | 53.0 | 63.9 | 58.8 |
| Split % Calculated (G) | 48.5 | 53.3 | 49.2 | 43.0 | 54.4 | 48.5 |
| MI2 - g/10 min (P) ASTM D-1238-04 | 0.16 | 0.17 | 0.16 | 0.18 | 0.14 | 0.19 |
| MI5 - g/10 min (P) ASTM D-1238-04 | 0.54 | 0.63 | 0.54 | 0.65 | 0.55 | 0.70 |
| MI10 - g/10 min (P) ASTM D-1238-04 | 1.80 | 2.26 | 1.88 | 2.07 | 1.96 | 2.34 |
| MI21 - g/10 min (P) ASTM D-1238-04 | 7.75 | 11.10 | 8.85 | 8.88 | 10.33 | 11.34 |
| MFR (I21/I2) (P) ASTM D-1238-04 | 49.9 | 67.2 | 56.6 | 48.4 | 72.9 | 59.8 |
| MFR (I21/I5) (P) ASTM D-1238-04 | 14.2 | 17.6 | 16.4 | 13.7 | 18.8 | 16.2 |
| MFR (I10/I2) (P) ASTM D-1238-04 | 11.6 | 13.7 | 12.0 | 11.3 | 13.8 | 12.3 |
| Density (g/cc) (P) ASTM D-792-00 | 0.9445 | 0.9464 | 0.946 | 0.9447 | 0.9457 | 0.945 |
| IR structure (P) | | | | | | |
| Trans/1000 carbons (P) ASTM D6248-2004 | 0.02 | 0 | 0.013 | 0.015 | 0.0012 | 0.024 |
| Vinyls/1000 carbons (P) ASTM D6248-2004 | 0.21 | 0.25 | 0.22 | 0.2 | 0.22 | 0.18 |

TABLE 2D-continued

INVENTIVE SAMPLES continued

| | SAMPLE NO. | | | | | |
|---|---|---|---|---|---|---|
| | I513 | I514 | I515 | I516 | I517 | I922 |
| Methyls/1000 carbons (P) ASTM D2238-1999 | 3 | 3.4 | 2.8 | 3.1 | 4.1 | 3.5 |

G = Granular Polymer

P = Pelletized Polymer with Additives and Pigments

[Split % (calculated) = (weight of HMW/(sum weight (HMW + LMW))) × 100]

TABLE 2E

INVENTIVE SAMPLES continued

| | SAMPLE NO. | | | | | |
|---|---|---|---|---|---|---|
| Additive analysis | I513 | I514 | I515 | I516 | I517 | I922 |
| Irganox 1010 ppm | 1372 | 1378 | 1309 | 1396 | 1484 | 1409 |
| Irgafos 168 ppm total | 1601 | 1523 | 1544 | 1608 | 1596 | 785 |
| Irgafos 168 ppm Active | 1108 | 1350 | 1196 | 1064 | 1339 | 815 |
| Irgafos 168 ppm Inactive | 492 | 173 | 348 | 544 | 257 | 1600 |
| Percent Active I-168 | 69.3 | 88.6 | 77.5 | 66.2 | 83.9 | 49.1 |
| RMS-100 Viscosity MPa at 0.01 sec−1 shear rate | 83172 | 81192 | 90984 | 68549 | 91009 | 784000 |
| RMS-800 Viscosity MPa at 100 sec−1 shear rate | 2653 | 2267 | 2547 | 2659 | 2296 | 24093 |
| G′/G″ @ 0.01 sec−1 Shear Rate | 0.289 | 0.298 | 0.309 | 0.268 | 0.308 | 0.324 |
| G′/G″ @ 0.1 sec−1 Shear Rate | 0.418 | 0.432 | 0.443 | 0.387 | 0.448 | 0.438 |
| Viscosity ratio 0.01/100 data | 31.4 | 35.8 | 35.7 | 25.8 | 39.6 | 32.5 |
| Rheotens melt strength (cN) | 10.5 | 9.1 | 10.5 | 9.5 | 10.5 | 9.5 |
| Rheotens Velocity (mm) | 125 | 125 | 145 | 140 | 125 | 145 |
| DSC Melting Point (Deg C.) ASTM D-3418-03 | 128.54 | 128.84 | 128.74 | 128.6 | 128.28 | 129.27 |
| Heat of Fusion (J/g) ASTM D-3418-03 | 187.2 | 192.1 | 189.5 | 187 | 190.2 | 177.3 |
| DSC Crystallization point (Deg C.) ASTM D-3418-03 | 117.08 | 117.03 | 117.34 | 117.09 | 116.91 | 115 |
| Heat of Crystallization (J/g) ASTM D-3418-03 | 184.1 | 191.3 | 188.8 | 187.1 | 192.1 | 172.4 |
| DSC Induction Time (min) ASTM D-3350-05 | 69.16 | 50.81 | 84.24 | ~40 | 85.46 | |
| DSC Induction Temp (Deg C.) ASTM D-3350-05 | 244.8 | 238.9 | 238.8 | 243.4 | 249.5 | |
| C13 NMR Wt % Hexene ASTM D-5017-91 | 2.3 | 2.2 | 2 | 2.2 | 2.5 | 2.5 |
| Branches/1000 C in Backbone ASTM D-5017-91 | 3.7 | 3.6 | 3.3 | 3.3 | 3.8 | |
| Atref HD fraction (%) | 75.2 | 76.3 | 78.2 | 80.9 | 72.5 | 77 |
| Temperature Minimum (C.) | 86 | 86 | 86.1 | 86.1 | 86.1 | 86 |
| SCB portion | 13.9 | 11.6 | 9.7 | 10.3 | 15.6 | 11 |
| SCB portion minimum temperature (C.) | 52 | 52 | 58 | 62 | 51 | 60 |
| SCB distribution Mv | 93249 | 92200 | 97395 | 98596 | 80000 | 90569 |
| ATREF Purge (%) | 10.9 | 12.1 | 12.1 | 8.8 | 11.9 | 12.0 |

TABLE 2F

INVENTIVE SAMPLES continued

| | \multicolumn{6}{c}{SAMPLE NO.} | | | | | |
|---|---|---|---|---|---|---|
| | I513 | I514 | I515 | I516 | I517 | I922 |
| Purge Mv | 59223 | 52362 | 57004 | 39936 | 44738 | 74334 |
| ATREF Overall Mv Average | 89540 | 87380 | 92508 | 93434 | 75803 | 88621 |
| ATREF Dv viscosity - temperature slope (70-90 C. region) | −0.0041 | −0.015 | −0.019 | −0.015 | −0.0093 | −0.013 |
| Triple Detector Results | | | | | | |
| Conventional GPC | | | | | | |
| Mn | 30920 | 24880 | 28400 | 36700 | 24310 | 27380 |
| Mw | 201830 | 198560 | 198360 | 194360 | 199440 | 128890 |
| Mz | 801400 | 839800 | 800000 | 770200 | 804700 | 426900 |
| Mw/Mn | 6.5 | 8.0 | 7.0 | 5.3 | 8.2 | 4.7 |
| Absolute GPC | | | | | | |
| Mn | 29684 | 24615 | 28616 | 35350 | 23440 | 27980 |
| Mw | 219050 | 210860 | 214870 | 208740 | 211090 | 158820 |
| Mw (abs)/Mn abs | 7.4 | 8.6 | 7.5 | 5.9 | 9.0 | 5.7 |
| Mz (BB) | 815800 | 830100 | 813700 | 775900 | 854300 | 570600 |
| Mz (abs) | 898400 | 902100 | 886800 | 906300 | 953400 | 969800 |
| Mz + 1 (BB) | 1467700 | 1459100 | 1453200 | 1407700 | 1486600 | 1164800 |
| Mz (abs)/Mw | 4.1 | 4.3 | 4.1 | 4.3 | 4.5 | 6.1 |

TABLE 2G

INVENTIVE SAMPLES continued

| | \multicolumn{6}{c}{SAMPLE NO.} | | | | | |
|---|---|---|---|---|---|---|
| | I513 | I514 | I515 | I516 | I517 | I922 |
| Plaque Properties | | | | | | |
| PENT (2.4 MPa) Hrs ASTM D-1473-01 | >9,300 | >10,000 | >10,000 | >10,000 | >10,000 | >15,000 (on test) |
| RCP Gc @ 23 C. from PENT plaque milled to 2 mm thick samples (KJ/m2) Modified (2 mm) ASTM F-2231-02 | Incomplete break no reading available | 178 and Incomplete break | Incomplete break no reading available | Incomplete break no reading available | 221 and Incomplete break | 196 |
| RCP Gc @ 23 C. from PENT plaque milled to 3 mm thick samples (KJ/m2) ASTM F-2231-02 | 189 | 109.8 | 156 | 169 | 116 | |
| Flexural Modulus (psi) @ 0.5 inches/min ASTM D-790-03 | 136500 | 151400 | 144600 | 137000 | 138500 | 139200 |
| SD | 10400 | 4536 | 6700 | 9314 | 8660 | 8820 |
| Secant Modulus (psi) 2% @ 0.5 inches/min ASTM D-790-03 | 91300 | 98800 | 96800 | 92000 | 95200 | 98100 |
| SD | 2300 | 2178 | 2100 | 1624 | 1920 | 2162 |
| Secant Modulus (psi) 1% @ 0.5 inches/min ASTM D-790-03 | 109600 | 119400 | 116400 | 110200 | 114200 | 117400 |
| SD | 3440 | 2897 | 3000 | 2693 | 2500 | 3100 |
| Tensile Strength (PSI) ASTM D-638-03 | 5327 | 5070 | 5280 | 5565 | 5168 | 4920 |
| SD | 230 | 475 | 317 | 228 | 204 | 542 |
| % Elongation ASTM D-638-03 | 730 | 730 | 730 | 731 | 693 | 698 |
| SD | 13 | 25 | 20 | 12.6 | 15 | 35 |
| Yield Strength (psi) ASTM D-638-03 | 2460 | 2590 | 2570 | 2593 | 2700 | 2537 |

TABLE 2G-continued

INVENTIVE SAMPLES continued

| | SAMPLE NO. | | | | | |
|---|---|---|---|---|---|---|
| | I513 | I514 | I515 | I516 | I517 | I922 |
| SD | 53 | ~40 | 58 | 197 | 268 | 38 |
| Yield Strain (%) ASTM D-638-03 | 4.1 | 4 | 3.8 | 4.97 | 5.8 | 4.85 |
| SD | 0.17 | 0.1 | 0.1 | 1.84 | 2.8 | 0.28 |
| Burst Properties | | | | | | |
| 10**5 intercept at 23 C. (psi) ASTM D-1598-02 ASTM D-2837-04 | >1347 | >1333 | >1358 | >1334 | >1366 | 1338 |
| 10**5 intercept at 60 C., (psi) ASTM D-1598-02 ASTM D-2837-04 | >961* | >966* | >963* | >978* | >969* | 983 |
| Hours on test at 60 C. | >12000* in progress | >12000* In progress | >12000* In progress | >12000* passed | >12000* in progress | >14084 Pass |
| 90 C. validation test (690 psi Hoop stress for >3800 hours) PPI TR #3 Section F.4.2.1 | | | | | | |

*Still on test.

TABLE 3A

COMPARATIVE SAMPLES

| | SAMPLE NO. | | | | |
|---|---|---|---|---|---|
| | C024 | C025 | C453 | C454 | C510 |
| Type | precursor | precursor | precursor | precursor | 0017 reduction |
| First Reactor REACTION CONDITIONS | | | | | |
| Temp. ° C. | 80 | 80 | 80 | 80 | 80 |
| C2 Part. Pressure, psi | 25 | 24 | 27 | 27 | 34.0 |
| H2/C2 Molar Ratio | 0.027 | 0.015 | 0.023 | 0.022 | 0.030 |
| C6/C2 Molar Ratio | 0.08 | 0.125 | 0.105 | 0.125 | 0.087 |
| Ethylene lb/hr | 21.3 | 22.4 | 23 | 24.3 | 20.7 |
| Hexene lb/hr | 1.2 | 2.2 | 2 | 2.4 | 1.3 |
| Hydrogen mlb/hr | | | | | 5.9 |
| Isopentane lb/hr | 0 | 0 | 2 | 2 | 0.0 |
| Nitrogen lb/hr | | | | | 5.9 |
| Ethylene Mol % | | | | | 10.8 |
| Hexene Mol % | | | | | 0.9 |
| Hydrogen Mol % | | | | | 0.3 |
| Isopentane Mol % | | | | | 7.5 |
| Nitrogen Mol % | | | | | 80.8 |
| Cat cc/hr | | | | | 2.2 |
| E.B. Production Rate, lb/hr | 26 | 28 | 28 | 30 | 25.0 |
| Bed Weight, lbs | | | | | 63.3 |
| FBD (lb/ft3) | | | | | 21.3 |
| Bed Volume, ft3 | | | | | 8.64 |
| Residence Time, hr | 3.88 | 3.47 | 3.66 | 2.88 | 2.5 |
| STY, lb/hr/ft3 | 2.6 | 2.9 | 2.2 | 3.3 | 2.9 |
| SGV (ft/sec) | | | | | 1.6 |

TABLE 3B

COMPARATIVE SAMPLES

| | SAMPLE NO. | | | | |
|---|---|---|---|---|---|
| | C024 | C025 | C453 | C454 | C510 |
| RESIN PROPERTIES (First reactor) | | | | | |
| Flow Index, dg/min I21 | 0.44 | 0.45 | 0.43 | 0.44 | 0.63 |
| Melt Index, dg/min I2 | | | | | — |
| Density, g/cm3 | 0.9238 | 0.9166 | 0.9187 | 0.9162 | 0.9230 |
| MFR | | | | | — |
| Titanium, ppmw | 2.73 | 2.28 | 2.21 | 2.43 | 1.7 |
| Aluminum ppmw | 76.5 | 68.3 | 99.7 | 90.9 | 82.7 |
| Al/Ti | | | | | 85.5 |
| Bulk Density, lb/ft3 | 18.8 | 17.9 | 18.1 | 17.5 | 15.0 |
| APS, inches | 0.0272 | 0.0316 | 0.031 | 0.0289 | 0.033 |
| Fines, Wt % LT 120 Mesh | 2.7 | 1.9 | 2.1 | 2.3 | 0.5 |
| GPC Analysis Conventional | | | | | |
| Mn | | | | | 66400.0 |
| Mw | | | | | 262300.0 |
| Mw/Mn | | | | | 3.95 |
| Mz | | | | | 714000.0 |
| Absolute | | | | | |
| Mn | | | | | 88900.0 |
| Mw | | | | | 316000.0 |
| Mz | | | | | 936000.0 |
| Mz/Mw | | | | | 2.96 |
| g' | | | | | 1.03 |
| Weight Fraction <1,000,000 | | | | | 0.957 |

TABLE 3C

COMPARATIVE SAMPLES

| | SAMPLE NO. | | | | |
|---|---|---|---|---|---|
| REACTION CONDITIONS (Second reactor) | C024 | C025 | C453 | C454 | C510 |
| Temp. °C. | 100 | 100 | 100 | 100 | 95.0 |
| Pressure, psig | 397 | 398 | 373 | 393 | 397.1 |
| C2 Part. Pressure, psi | 79 | 86.4 | 82.5 | 92.3 | 104.6 |
| H2/C2 Molar Ratio | 1.75 | 1.75 | 1.75 | 1.75 | 0.5 |
| C6/C2 Molar Ratio | 0.053 | 0.025 | 0.015 | 0.025 | 0.02 |
| Ethylene lb/hr | 21.8 | 24.6 | 18.8 | 27.9 | 25.9 |
| Hexene lb/hr | 1.3 | 0.6 | 0.4 | 0.9 | 0.7 |
| Isopentane lb/hr | | | | | 0.5 |
| Nitrogen lb/hr | | | | | 14.6 |
| Ethylene Mol % | | | | | 25.4 |
| Hexene Mol % | | | | | 0.6 |
| Hydrogen Mol % | | | | | 12.7 |
| Isopentane Mol % | | | | | 1.0 |
| Nitrogen Mol % | | | | | 59.5 |
| E.B. Production Rate, lb/hr | 19.5 | 21 | 16.6 | 22.5 | 17.0 |
| Bed Weight, lbs | 132.4 | 133.7 | 116.9 | 117.5 | 108.3 |
| Fluidized Bed Density (lb/ft3) | | | | | 12.4 |
| Bed Volume, ft3 | | | | | 10.0 |
| Residence Time, hr | 5.99 | 5.36 | 4.88 | 3.86 | 2.58 |
| Space Time Yield, lb/hr/ft3 | 2.2 | 2.5 | 1.9 | 2.9 | 4.2 |
| Superficial gas velocity (ft/sec) | | | | | 1.7 |

TABLE 3D

COMPARATIVE SAMPLES

| RESIN PROPERTIES | SAMPLE NO. | | | | |
|---|---|---|---|---|---|
| (Blend) | C024 | C025 | C453 | C454 | C510 |
| Flow Index, dg/min I21 (G) | 13.2 | 14.3 | 9.5 | 20.9 | 9.6 |
| Melt Index, dg/min I2 (G) | 0.14 | 0.13 | 0.09 | 0.16 | 0.16 |
| Density, g/cm3 (G) | 0.9414 | 0.9395 | 0.9397 | 0.9403 | 0.9396 |
| MFR (MI21/MI2) (G) | 97.7 | 111.1 | 103.9 | 132.8 | 58.9 |
| Titanium, ppmw (G) | 1.49 | 1.3 | 1.36 | 1.29 | 1.0 |
| Aluminum ppmw (G) | 55.3 | 47 | 71.3 | 52.1 | 62.4 |
| Al/Ti (G) | | | | | 114.4 |
| Bulk Density, lb/ft3 | 23 | 22.4 | 21.8 | 21.6 | 18.1 |
| APS, inches | 0.0271 | 0.0303 | 0.031 | 0.029 | 0.030 |
| Fines, Wt % less than 120 Mesh (G) | 3.3 | 3 | 2.7 | 3 | 1.4 |
| Split % by Energy Balance | 57.2 | 57.2 | 62.7 | 57.2 | 59.6 |
| Split % calculated (G) | 54.0 | 53.3 | 57.4 | 49.0 | 49.5 |

[Split % (calculated) = (weight of HMW/(sum weight (HMW + LMW))) × 100]

TABLE 3E

COMPARATIVE SAMPLES

| | SAMPLE NO. | | | | |
|---|---|---|---|---|---|
| | C024 | C025 | C453 | C454 | C510 |
| MI2 - g/10 min (P) ASTM D-1238-04 | 0.14 | 0.12 | 0.09 | 0.17 | 0.19 |
| MI5 - g/10 min (P) ASTM D-1238-04 | 0.48 | 0.61 | 0.39 | 0.66 | 0.69 |
| MI10 - g/10 min (P) ASTM D-1238-04 | 1.95 | 3.47 | 1.47 | 3.26 | 2.31 |
| MI21 - g/10 min (P) ASTM D-1238-04 | 27.4 | 15.1 | 10.16 | 19.9 | 10.77 |
| MFR (I21/I2) (P) | 195.7 | 125.8 | 112.9 | 117.1 | 56.5 |
| MFR (I21/I5) (P) | 57.1 | 24.8 | 26.1 | 30.2 | 15.6 |
| MFR (I10/I2) (P) | 13.9 | 28.9 | 16.3 | 19.2 | 12.1 |
| Density (g/cc) (P) ASTM D-792-00 | 0.942 | 0.9406 | 0.9406 | 0.9406 | 0.9448 |
| IR structure (P) | | | | | |
| Trans/1000 carbons (P) ASTM D-6248-2004 | 0.005 | 0.008 | 0.005 | 0.012 | 0.016 |
| Vinyls/1000 carbons (P) ASTM D-6248-2004 | 0.099 | 0.167 | 0.128 | 0.192 | 0.22 |

TABLE 3E-continued

COMPARATIVE SAMPLES

| | SAMPLE NO. | | | | |
|---|---|---|---|---|---|
| | C024 | C025 | C453 | C454 | C510 |
| Methyls/1000 carbons (P) ASTM D-2238-1999 | 5.1 | 6.23 | 5.21 | 5.22 | 3.7 |

TABLE 3F

COMPARATIVE SAMPLES

| | SAMPLE NO. | | | | |
|---|---|---|---|---|---|
| Additive analysis | C024 | C025 | C453 | C454 | C510 |
| Irganox 1010 ppm | | | 1708 | 1866 | 1422 |
| Irgafos 168 ppm total | | | 1580 | 1838 | 1549 |
| Irgafos 168 ppm Active | | | 1459 | 1664 | 1178 |
| Irgafos 168 ppm Inactive | | | | | 371 |
| Percent Active I-168 | | | 0.92 | 0.91 | 76.0 |
| RMS-100 Viscosity MPa at 0.01 sec−1 shear rate | | | | | 72407 |
| RMS-800 Viscosity MPa at 100 sec−1 shear rate | | | | | 2360 |
| G'/G" @ 0.01 sec−1 Shear Rate | | | | | 0.279 |
| G'/G" @ 0.1 sec−1 Shear Rate | | | | | 0.41 |
| Viscosity ratio 0.01/100 data | | | | | 30.7 |
| Rheotens melt strength (cN) | | | | | 9.3 |
| Rheotens Velocity (mm) | | | | | 135 |
| DSC Melting Point (Deg C.) ASTM D-3418-03 | | | | | 128.83 |
| Heat of Fusion (J/g) ASTM D-3418-03 | | | | | 189.4 |
| DSC Crystallization point (Deg C.) ASTM D-3418-03 | | | | | 117.05 |
| Heat of Crystallization (J/g) ASTM D-3418-03 | | | | | 188.2 |
| DSC Induction Time (min) ASTM D-3350-05 | | | | | >90 |
| DSC Induction Temp (Deg C.) ASTM D-3350-05 | | | | | 247.5 |

TABLE 3G

COMPARATIVE SAMPLE

| | SAMPLE NO. | | | | |
|---|---|---|---|---|---|
| | C024 | C025 | C453 | C454 | C510 |
| C13 NMR Wt % Hexene ASTM D-5017-91 | | | | | 2.4 |
| Branches/1000 C. in Backbone ASTM D-5017-91 | | | | | 3.9 |
| Atref HD fraction (%) | | | 59.2 | 59 | 76.2 |
| Temperature Minimum (C.) | | | 86 | 86.2 | 86.1 |
| SCB portion | | | 23.8 | 22 | 13.3 |
| SCB portion minimum temperature (C.) | | | 52 | 54 | 50 |
| SCB distribution Mv | | | 92376 | 90910 | 98920 |
| Aterf Purge (%) | | | 23.3 | 19 | 10.5 |
| Purge Mv | | | 140531 | 109153 | 76650 |
| Atref Overall Mv Average | | | 103596 | 94376 | 96582 |
| Atref Dv viscosity - temperature slope (70-90 C. region) | | | 0.0041 | 0.0011 | −0.0023 |
| Triple Detector Results Conventional GPC | | | | | |
| Mn | | | | | 26580 |
| Mw | | | | | 195000 |
| Mz | | | | | 829200 |
| Mw/Mn | | | | | 7.3 |
| Absolute GPC | | | | | |
| Mn | | | | | 27433 |
| Mw | | | | | 212800 |
| Mw (abs)/Mn Abs | | | | | 7.8 |
| Mz (BB) | | | | | 833100 |
| Mz (abs) | | | | | 921700 |
| Mz + 1 (BB) | | | | | 1490000 |
| Mz (abs)/Mw | | | | | 4.3 |

TABLE 3H

COMPARATIVE SAMPLE

| | SAMPLE NO. | | | | |
|---|---|---|---|---|---|
| Plague Properties | C024 | C025 | C453 | C454 | C510 |
| PENT (2.4 MPa) Hrs ASTM D-1473-01 | >4463 | >5498 @2.6 | >4844 @2.6 | >8909 @2.6 | >8549 |
| RCP Gc @ 23 C. from PENT plaque milled to 2 mm thick samples (KJ/m2) Modified (2 mm) ASTM F-2231-02 | 165 | 222 | 225 | 214 | Incomplete break no reading available |
| RCP Gc @ 23 C. from PENT plaque milled to 3 mm thick samples (KJ/m2) | | | | | 214 |

TABLE 3H-continued

COMPARATIVE SAMPLE

| Plaque Properties | SAMPLE NO. | | | | |
|---|---|---|---|---|---|
| | C024 | C025 | C453 | C454 | C510 |
| ASTM F-2231-02 Flexural Modulus (psi) @ 0.5 inches/min ASTM D-790-03 | 148000 | 140000 | 151000 | 150000 | 136600 |
| SD | | | | | 7438 |
| Secant Modulus (psi) 2% @ 0.5 inches/min ASTM D-790-03 | 100700 | 96700 | 100000 | 97000 | 94900 |
| SD | | | | | 2515 |
| Secant Modulus (psi) 1% @ 0.5 inches/min ASTM D-790-03 | 120000 | 115000 | 120000 | 117000 | 112700 |
| SD | | | | | 3762 |
| Tensile Strength (PSI) ASTM D-638-03 | 4740 | 4680 | 4214 | 4335 | 5071 |
| SD | | | | | 441 |
| % Elongation ASTM D-638-03 | 720 | 675 | 730 | 710 | 710 |
| SD | | | | | 17.4 |
| Yield Strength (psi) ASTM D-638-03 | 3014 | 2849 | 2744 | 2718 | 2521 |
| SD | | | | | 141 |
| Yield Strain (%) ASTM D-638-03 | 5.4 | 6.4 | 7.4 | 7.1 | 5.97 |
| SD | | | | | 4.4 |

TABLE 3I

COMPARATIVE SAMPLE

| Burst Properties | SAMPLE NO. | | | | |
|---|---|---|---|---|---|
| | C024 | C025 | C453 | C454 | C510 |
| 10**5 intercept at 23 C. (psi) ASTM D-1598-02 ASTM D-2837-04 | NA | NA | NA | NA | Failed Screening test @ 60 C. |
| 10**5 intercept at 60 C., (psi) ASTM D-1598-02 | Failed | Failed | Failed | Failed | Failed Screening test |
| ASTM D-2837-04 90 C. validation test (690 psi Hoop stress for >3800 hours) | NA | NA | NA | NA | NA |

NA = Not Applicable

TABLE 4A

COMPARATIVE SAMPLES

| | SAMPLE NO. | | | | | |
|---|---|---|---|---|---|---|
| | C512 | C586 | C587 | C588 | C589 | C590 |
| Type | 0017 reduction | 0017 reduction | 0017 reduction | 0017 reduction | 0017 reduction | 0017 reduction |
| First Reactor REACTION CONDITIONS | | | | | | |
| Temp. ° C. | 80.0 | 80.0 | 80.0 | 80.0 | 80.0 | 80.0 |
| C2 Part. Pressure, psi | 30.7 | 25.8 | 24.4 | 23.9 | 26.9 | 36.1 |
| H2/C2 Molar Ratio | 0.026 | 0.050 | 0.053 | 0.037 | 0.062 | 0.043 |
| C6/C2 Molar Ratio | 0.092 | 0.047 | 0.076 | 0.042 | 0.040 | 0.025 |
| Ethylene lb/hr | 21.9 | 21.3 | 22.8 | 21.7 | 22.3 | 21.7 |
| Hexene lb/hr | 1.3 | 0.7 | 1.2 | 0.6 | 0.6 | 0.5 |
| Hydrogen mlb/hr | 5.1 | | | | | |
| Isopentane lb/hr | — | 3.0 | 3.0 | 3.0 | 3.0 | 3.0 |
| Nitrogen lb/hr | 6.0 | | | | | |
| Ethylene Mol % | 9.8 | | | | | |
| Hexene Mol % | 0.9 | | | | | |

TABLE 4A-continued

COMPARATIVE SAMPLES

|  | \multicolumn{6}{c}{SAMPLE NO.} | | | | | |
| --- | --- | --- | --- | --- | --- | --- |
|  | C512 | C586 | C587 | C588 | C589 | C590 |
| Hydrogen Mol % | 0.3 | | | | | |
| Isopentane Mol % | 7.3 | | | | | |
| Nitrogen Mol % | 82.1 | | | | | |
| Cat cc/hr | 2.2 | | | | | |
| E.B. Production Rate, lb/hr | 25.0 | 26.0 | 26.9 | 26.1 | 25.9 | 26.0 |
| Bed Weight, lbs | 70.2 | | | | | |
| FBD(lb/ft3) | 22.5 | | | | | |
| Bed Volume, ft3 | 9.64 | | | | | |
| Residence Time, hr | 2.8 | 2.9 | 2.8 | 2.9 | 2.9 | 2.8 |
| STY, lb/hr/ft3 | 2.6 | 1.8 | 2.7 | 2.4 | 2.4 | 2.4 |
| SGV (ft/sec) | 2.6 | | | | | |

TABLE 4B

COMPARATIVE SAMPLES

|  | SAMPLE NO. | | | | | |
| --- | --- | --- | --- | --- | --- | --- |
|  | C512 | C586 | C587 | C588 | C589 | C590 |
| RESIN PROPERTIES (First reactor) | | | | | | |
| Flow Index, dg/min I21 | 0.54 | 0.5 | 0.61 | 0.3 | 0.60 | 0.27 |
| Melt Index, dg/min I2 | — | — | — | — | — | — |
| Density, g/cm3 | 0.9212 | 0.9291 | 0.9248 | 0.9284 | 0.9306 | 0.9300 |
| MFR | — | — | — | — | — | — |
| Titanium, ppmw | 1.9 | 3.8 | 3.3 | 4.5 | 3.8 | 4.2 |
| Aluminum ppmw | 89.0 | 110.0 | 80.7 | 113.4 | 113.4 | 97.8 |
| Al/Ti | 85.2 | 51.6 | 44.5 | 45.2 | 53.9 | 41.3 |
| Bulk Density, lb/ft3 | 17.0 | 20.4 | 20.8 | 21.4 | 22.2 | 24.8 |
| APS, inches | 0.033 | 0.028 | 0.027 | 0.028 | 0.027 | 0.025 |
| Fines, Wt % LT 120 Mesh | 1.1 | 1.1 | 1.4 | 1.1 | 1.3 | 0.9 |
| GPC Analysis | | | | | | |
| Conventional | | | | | | |
| Mn | 65900.0 | | | | | |
| Mw | 259000.0 | | | | | |
| Mw/Mn | 3.93 | | | | | |
| Mz | 659000.0 | | | | | |
| Absolute | | | | | | |
| Mn | 77600.0 | | | | | |
| Mw | 293000.0 | | | | | |
| Mz | 771000.0 | | | | | |
| Mz/Mw | 2.63 | | | | | |
| g' | 1.03 | | | | | |
| Weight Fraction <1,000,000 | 0.962 | | | | | |

TABLE 4C

COMPARATIVE SAMPLES

| REACTION CONDITIONS (Second reactor) | SAMPLE NO. | | | | | |
| --- | --- | --- | --- | --- | --- | --- |
|  | C512 | C586 | C587 | C588 | C589 | C590 |
| Temp. ° C. | 95.0 | 94.9 | 94.9 | 95.3 | 99.9 | 94.9 |
| Pressure, psig | 397.3 | 392.6 | 392.6 | 392.5 | 392.8 | 393.0 |
| C2 Part. Pressure, psi | 102.9 | 63.0 | 68.8 | 65.5 | 61.6 | 76.9 |

TABLE 4C-continued

COMPARATIVE SAMPLES

| REACTION CONDITIONS (Second reactor) | SAMPLE NO. | | | | | |
|---|---|---|---|---|---|---|
| | C512 | C586 | C587 | C588 | C589 | C590 |
| H2/C2 Molar Ratio | 0.6 | 1.3 | 1.3 | 1.3 | 1.8 | 1.3 |
| C6/C2 Molar Ratio | 0.02 | 0.07 | 0.03 | 0.08 | 0.08 | 0.08 |
| Ethylene lb/hr | 30.3 | 16.4 | 20.8 | 19.9 | 18.2 | 21.3 |
| Hexene lb/hr | 0.5 | 1.2 | 0.8 | 1.5 | 1.5 | 1.6 |
| Isopentane lb/hr | — | | | | | |
| Nitrogen lb/hr | 22.1 | | | | | |
| Ethylene Mol % | 24.9 | | | | | |
| Hexene Mol % | 0.6 | | | | | |
| Hydrogen Mol % | 15.1 | | | | | |
| Isopentane Mol % | 1.0 | | | | | |
| Nitrogen Mol % | 57.4 | | | | | |
| E.B. Production Rate, lb/hr | 16.6 | 15.6 | 16.9 | 18.0 | 15.7 | 19.0 |
| Bed Weight, lbs | 107.3 | 91.1 | 89.1 | 91.0 | 90.3 | 89.4 |
| Fluidized Bed Density (lb/ft3) | 13.5 | | | | | |
| Bed Volume, ft3 | 11.0 | | | | | |
| Residence Time, hr | 2.58 | 2.2 | 2.0 | 2.1 | 2.2 | 2.0 |
| Space Time Yield, lb/hr/ft3 | 3.8 | 2.7 | 3.9 | 3.7 | 3.5 | 3.8 |
| Superficial gas velocity (ft/sec) | 1.6 | | | | | |

TABLE 4D

COMPARATIVE SAMPLES

| RESIN PROPERTIES (Blend) | SAMPLE NO. | | | | | |
|---|---|---|---|---|---|---|
| | C512 | C586 | C587 | C588 | C589 | C590 |
| Flow Index, dg/min I21 (G) | 9.9 | 8.9 | 10.0 | 8.1 | 9.8 | 8.0 |
| Melt Index, dg/min I2 (G) | 0.15 | 0.12 | 0.14 | 0.09 | 0.13 | 0.10 |
| Density, g/cm3 (G) | 0.9395 | 0.9407 | 0.9407 | 0.9401 | 0.9408 | 0.9408 |
| MFR (MI21/MI2) (G) | 65.0 | 71.5 | 70.7 | 90.6 | 75.5 | 83.0 |
| Titanium, ppmw (G) | 1.0 | 2.2 | 2.0 | 2.4 | 2.3 | 2.3 |
| Aluminum ppmw (G) | 60.0 | 71.2 | 56.7 | 66.6 | 69.6 | 49.0 |
| Al/Ti (G) | 106.0 | 58.1 | 49.9 | 49.8 | 53.6 | 37.4 |
| Bulk Density, lb/ft3 (G) | 20.0 | 23.6 | 23.7 | 24.2 | 24.3 | 27.2 |
| APS, inches (G) | 0.031 | 0.027 | 0.026 | 0.0 | 0.026 | 0.027 |
| Fines, Wt % less than 120 Mesh (G) | 2.3 | 3.0 | 2.8 | 2.6 | 1.9 | 1.0 |
| Split % by Energy Balance (G) | 60.1 | 62.5 | 61.4 | 59.2 | 62.2 | 57.7 |
| Split % calculated (G) | 49.8 | 57.3 | 57.7 | 53.7 | 60.6 | 52.9 |

[Split % (calculated) = (weight of HMW/(sum weight (HMW + LMW))) × 100]

TABLE 4E

COMPARATIVE EXAMPLES

| | SAMPLE NO. | | | | | |
|---|---|---|---|---|---|---|
| | C512 | C586 | C587 | C588 | C589 | C590 |
| MI2 - g/10 min (P) ASTM D-1238-04 | 0.15 | 0.12 | 0.14 | 0.08 | 0.13 | 0.1 |
| MI5 - g/10 min (P) ASTM D-1238-04 | 0.59 | 0.47 | 0.53 | 0.34 | 0.47 | 0.38 |
| ASTM D-1238-04 | 1.97 | 1.6 | 1.8 | 1.3 | 1.7 | 1.4 |
| MI21 - g/10 min (P) ASTM D-1238-04 | 10.21 | 8.6 | 9.4 | 7.6 | 9.5 | 8.1 |
| MFR (I21/I2) (P) | 68.4 | 71.7 | 67.1 | 95.0 | 73.1 | 81.0 |
| MFR (I21/I5) (P) | 17.2 | 18.3 | 17.7 | 22.4 | 20.2 | 21.3 |
| MFR (I10/I2) (P) | 13.2 | 13.3 | 12.9 | 16.3 | 13.1 | 14.0 |
| Density (g/cc) (P) ASTM D-790-00 | 0.9451 | 0.9413 | 0.9408 | 0.9407 | 0.9412 | 0.9419 |
| IR structure (P) | | | | | | |
| Trans/1000 carbons (P) ASTM D-6248-2004 | 0.009 | 0.012 | 0.008 | 0.01 | 0 | 0.01 |
| Vinyls/1000 carbons (P) ASTM D-6248-2004 | 0.23 | 0.148 | 0.135 | 0.167 | 0.14 | 0.148 |

TABLE 4E-continued

COMPARATIVE EXAMPLES

| | SAMPLE NO. | | | | | |
|---|---|---|---|---|---|---|
| | C512 | C586 | C587 | C588 | C589 | C590 |
| Methyls/1000 carbons (P) ASTM D-2238-1999 Additive analysis | 4.1 | 3.2 | 3.17 | 3.99 | 4.2 | 3.72 |
| Irganox 1010 ppm | 1458 | 1392 | 1278 | 1645 | 1246 | 1359 |
| Irgafos 168 ppm total | 1573 | 1365 | 1310 | 1662 | 1216 | 1393 |
| Irgafos 168 ppm Active | 1276 | 1153 | 1129 | 1472 | 1019 | 1215 |
| Irgafos 168 ppm Inactive | 297 | 212 | 181 | 190 | 197 | 178 |
| Percent Active I-168 | 81.1 | 0.84 | 0.86 | 0.89 | 0.84 | 0.87 |

TABLE 4F

COMPARATIVE EXAMPLES

| | SAMPLE NO. | | | | | |
|---|---|---|---|---|---|---|
| | C512 | C586 | C587 | C588 | C589 | C590 |
| RMS-100 Viscosity MPa at 0.01 sec−1 shear rate | 90795 | 1.10E+05 | 9.80E+04 | 1.60E+05 | 1.10E+05 | 1.30E+05 |
| RMS-800 Viscosity MPa at 100 sec−1 shear rate | 2370 | 2460 | 2460 | 2550 | 2410 | 2560 |
| G'/G" @ 0.01 sec−1 Shear Rate | 0.305 | 0.33 | 0.29 | 0.37 | 0.32 | 0.33 |
| G'/G" @ 0.1 sec−1 Shear Rate | 0.451 | 0.47 | 0.43 | 0.54 | 0.46 | 0.48 |
| Viscosity ratio 0.01/100 data | 38.3 | 44.7 | 39.8 | 62.7 | 45.6 | 50.8 |
| Rheotens melt strength (cN) | 10.5 | | | | | |
| Rheotens Velocity (mm) | 145 | | | | | |
| DSC Melting Point (Deg C.) ASTM D-3418-03 | 128.67 | 128.31 | 128.05 | 128.88 | 128.89 | 129.01 |
| Heat of Fusion (J/g) ASTM D-3418-03 | 189.3 | 181.5 | 179 | 179.4 | 181 | 179.6 |
| DSC Crystallization point (Deg C.) ASTM D-3418-03 | 117.04 | 116.09 | 116.03 and 76.38 | 115.65 | 115.56 | 116.11 |
| Heat of Crystallization (J/g) ASTM D-3418-03 | 188.4 | 176.1 | 178.9 | 178.7 | 176.7 | 177.6 |
| DSC Induction Time (min) ASTM D-3350-05 | 60.07 | 32.29 | 40.73 | 54.74 | 34.53 | 55.94 |
| DSC Induction Temp (Deg C.) ASTM D-3350-05 | 237.9 | 235.25 | 242.28 | 244.83 | 237.65 | 244.61 |

TABLE 4G

COMPARATIVE EXAMPLES

| | SAMPLE NO. | | | | | |
|---|---|---|---|---|---|---|
| | C512 | C586 | C587 | C588 | C589 | C590 |
| C13 NMR Wt % Hexene ASTM D-5017-91 | 2.5 | 2.8 | 3 | 2.9 | 3.1 | 3 |
| Branches/1000 C. in Backbone ASTM D-5017-91 | 4.2 | | | | | |
| Atref HD fraction (%) | 73.8 | 68.8 | 72.8 | 68.2 | 66.1 | 71.5 |
| Temperature Minimum (C.) | 86.1 | 86 | 86.1 | 86 | 86 | 86.1 |
| SCB portion | 14.3 | 16.2 | 13.8 | 18 | 19.6 | 16.9 |
| SCB portion minimum temperature (C.) | 50 | 50 | 55 | 37 | 45 | 45 |
| SCB distribution Mv | 78786 | | | | | |
| Aterf Purge (%) | 11.9 | 15 | 13.4 | 13.8 | 14.3 | 11.6 |
| Purge Mv | 52026 | 110086 | 106484 | 116470 | 102464 | 92141 |
| Atref Overall Mv Average | 75602 | 117608 | 106552 | 125155 | 116623 | 115821 |
| Atref Dv viscosity - temperature slope (70-90 C. region) | 0.0024 | 0.021 | 0.0028 | 0.019 | 0.069 | 0.069 |
| Triple Detector Results | | | | | | |
| Conventional GPC | | | | | | |
| Mn | 27620 | 15950 | 20120 | 16670 | 11740 | 13120 |
| Mw | 199810 | 196180 | 201500 | 209430 | 198450 | 207000 |
| Mz | 816600 | 835700 | 876700 | 878600 | 869700 | 886800 |
| Mw/Mn | 7.2 | 12.3 | 10.0 | 12.6 | 16.9 | 15.8 |
| Absolute GPC | | | | | | |
| Mn | 26385 | 18821 | 23840 | 20437 | 14325 | 15633 |
| Mw | 210240 | 226160 | 227130 | 243880 | 244730 | 219720 |
| Mw (abs)/Mn abs | 8.0 | 12.0 | 9.5 | 11.9 | 17.1 | 14.1 |
| Mz(BB) | 861700 | 914200 | 912500 | 991700 | 926800 | 945000 |
| Mz (abs) | 924800 | 1075400 | 1070100 | 1134800 | 1172500 | 987500 |
| Mz + 1 (BB) | 1539000 | 1764000 | 1808700 | 1850200 | 1725700 | 1799900 |
| Mz (abs)/Mw | 4.4 | 4.76 | 4.71 | 4.65 | 4.79 | 4.49 |
| Mw (abs)/Mw (GPC) | | 1.15 | 1.13 | 1.16 | 1.23 | 1.06 |

TABLE 4H

COMPARATIVE SAMPLES

| | SAMPLE NO. | | | | | |
|---|---|---|---|---|---|---|
| Plaque Properties | C512 | C586 | C587 | C588 | C589 | C590 |
| PENT (2.4 MPa) Hrs ASTM D-1473-01 | >8279 | >19442 (discont'd) | >19685 (discont'd) | >19594 (discont'd) | 7923 | 2095 |
| RCP Gc @ 23 C. from PENT plaque milled to 2 mm thick samples (KJ/m2) Modified (2 mm) ASTM F-2231-02 | Incomplete break no reading available | 134 | 155 | 118 | 57 | 121 |
| RCP Gc @ 23 C. from PENT plaque milled to 3 mm thick samples (KJ/m2) ASTM F-2231-02 | 176 | | | | | |
| Flexural Modulus (psi) @ 0.5 inches/min ASTM D-790-03 | 135800 | 137000 | 135000 | 131000 | 138000 | 136000 |
| SD | 5944 | | | | | |
| Secant Modulus (psi) 2% @ 0.5 inches/min ASTM D-790-03 | 96200 | 97400 | 100000 | 92500 | 97600 | 97500 |

TABLE 4H-continued

COMPARATIVE SAMPLES

| Plaque Properties | SAMPLE NO. | | | | | |
|---|---|---|---|---|---|---|
| | C512 | C586 | C587 | C588 | C589 | C590 |
| SD | 2550 | | | | | |
| Secant Modulus (psi) 1% @ 0.5 inches/min ASTM D-790-03 | 114200 | 117000 | 119000 | 111000 | 117000 | 118000 |
| SD | 3670 | | | | | |
| Tensile Strength (PSI) ASTM D638-03 | 5088 | 5320 | 5370 | 5250 | 5190 | 5060 |
| SD | 412 | | | | | |
| % Elongation ASTM D638-03 | 710 | 880 | 780 | 870 | 961 | 960 |
| SD | 14 | | | | | |
| Yield Strength (psi) ASTM D638-03 | 2483 | 2900 | 2790 | 2750 | 2940 | 3030 |
| SD | 77 | | | | | |
| Yield Strain (%) ASTM D638-03 | 3.974 | 7.7 | 6.5 | 7.4 | 7.5 | 6.1 |
| SD | 0.09 | | | | | |

TABLE 4I

COMPARATIVE EXAMPLES

| Burst Properties | SAMPLE NO. | | | | | |
|---|---|---|---|---|---|---|
| | C512 | C586 | C587 | C588 | C589 | C590 |
| $10^{**}5$ intercept at 23 C. (psi) ASTM D-1598-02 ASTM D-2837-04 | Failed Screening test @ 60 C. | NA | NA | NA | NA | NA |
| $10^{**}5$ intercept at 60 C., (psi) ASTM D-1598-02 ASTM D-2837-04 | Failed Screening test | Failed | Failed | Failed | Failed | Failed |
| 90 C. validation test (690 psi Hoop stress for >3800 hours) PPI TR #3 Section F.4.2.1 | NA | NA | NA | NA | NA | NA |

NA = Not Applicable

TABLE 5A

COMPARATIVE SAMPLES

| | SAMPLE NO. | | | | |
|---|---|---|---|---|---|
| | C591 | C592 | C636 | C916 | C918 |
| Type | 0017 reduction | 0017 reduction | Precursor | Precursor | Precursor |
| Temp. °C. | 80.0 | 80.0 | 80 | 80.0 | 80.0 |
| C2 Part. Pressure, psi | 31.9 | 29.1 | 28 | 32.0 | 33.4 |
| H2/C2 Molar Ratio | 0.061 | 0.043 | 0.02930 | 0.037 | 0.037 |
| C6/C2 Molar Ratio | 0.038 | 0.067 | 0.0617 | 0.084 | 0.084 |
| Ethylene lb/hr | 21.7 | 22.7 | | 26.7 | 27.1 |
| Hexene lb/hr | 0.6 | 1.2 | | 1.3 | 1.3 |
| Hydrogen mlb/hr | | | | 2.5 | 2.2 |
| Isopentane lb/hr | 3.0 | 3.0 | | — | — |
| Nitrogen lb/hr | | | | 4.4 | 4.2 |
| Ethylene Mol % | | | | 10.2 | 10.6 |
| Hexene Mol % | | | | 0.9 | 0.9 |
| Hydrogen Mol % | | | | 0.4 | 0.4 |
| Isopentane Mol % | | | | 8.0 | 8.0 |
| Nitrogen Mol %. | | | | 80.2 | 80.0 |
| Cat cc/hr | | | 2.7 | 4.4 | 13.4 |
| E.B. Production Rate, lb/hr | 26.0 | 27.3 | 24.0 | 34.8 | 35.1 |
| Bed Weight, lbs | | | 98.4 | 68.3 | 68.5 |
| FBD(lb/ft³) | | | 12.0 | 13.2 | 12.8 |
| Bed Volume, ft³ | | | 8.2 | 8.64 | 10.64 |
| Residence Time, hr | 2.8 | 2.7 | 4.10 | 2.0 | 1.9 |
| STY, lb/hr/ft³ | 2.4 | 2.8 | 2.9 | 4.0 | 3.3 |
| SGV (ft/sec) | | | | 1.6 | 10.6 |

TABLE 5B

COMPARATIVE SAMPLES

| RESIN PROPERTIES | SAMPLE NO. | | | | |
|---|---|---|---|---|---|
| (First reactor) | C591 | C592 | C636 | C916 | C918 |
| Flow Index, dg/min I21 | 0.57 | 0.50 | 0.4 | 0.65 | 0.66 |
| Melt Index, dg/min I2 | — | — | — | — | — |
| Density, g/cm$^3$ | 0.9291 | 0.9244 | 0.9261 | 0.9238 | 0.9238 |
| MFR | — | — | — | — | — |
| Titanium, ppmw | 4.0 | 4.1 | 3.10 | 2.1 | 1.9 |
| Aluminum ppmw | 90.9 | 103.7 | 107.7 | 63.9 | 61.5 |
| Al/Ti | 40.4 | 45.5 | 62.4 | 53.9 | 56.4 |
| Bulk Density, lb/ft3 | 23.3 | 21.5 | 17.7 | 15.9 | 15.9 |
| APS, inches | 0.026 | 0.025 | 0.0345 | 0.036 | 0.037 |
| Fines, Wt % LT 120 Mesh | 1.2 | 1.1 | 1.9 | 1.6 | 1.3 |

TABLE 5C

COMPARATIVE SAMPLES

| CONDITIONS REACTION | SAMPLE NO. | | | | |
|---|---|---|---|---|---|
| (Second reactor) | C591 | C592 | C636 | C916 | C918 |
| Temp. °C. | 94.9 | 94.9 | 99.9 | 94.9 | 94.9 |
| Pressure, psig | 392.6 | 392.6 | 380 | 388.0 | 386.8 |
| C2 Part. Pressure, psi | 64.8 | 70.4 | 75.3 | 84.8 | 91.0 |
| H2/C2 Molar Ratio | 1.3 | 1.3 | 1.74800 | 1.3 | 0.8 |
| C6/C2 Molar Ratio | 0.07 | 0.03 | 0.0486 | 0.035 | 0.035 |
| Ethylene lb/hr | 17.8 | 19.8 | 25.2 | 30.3 | |
| Hexene lb/hr | 1.3 | 0.7 | | 0.8 | 0.9 |
| Isopentane lb/hr | | | | 0.6 | 0.0 |
| Nitrogen lb/hr | | | | 13.6 | 16.7 |
| Ethylene Mol % | | | | 21.0 | 22.6 |
| Hexene Mol % | | | | 0.7 | 0.8 |
| Hydrogen Mol % | | | | 27.3 | 19.2 |
| Isopentane Mol % | | | | 0.3 | 0.2 |
| Nitrogen Mol % | | | | 49.3 | 55.8 |
| E.B. Production Rate, lb/hr | 16.1 | 17.5 | 19.5 | 16.1 | 18.6 |
| Bed Weight, lbs | 90.1 | 89.5 | 152.3 | 97.9 | 98.0 |

TABLE 5C-continued

COMPARATIVE SAMPLES

| CONDITIONS REACTION | SAMPLE NO. | | | | |
|---|---|---|---|---|---|
| (Second reactor) | C591 | C592 | C636 | C916 | C918 |
| Fluidized Bed Density (lb/ft$^3$) | | | 11.2 | 14.1 | 13.7 |
| Bed Volume, ft$^3$ | | | 13.6 | 10.0 | 12.0 |
| Residence Time, hr | 2.1 | 2.0 | 3.5 | 1.92 | 1.82 |
| Space Time Yield, lb/hr/ft$^3$ | 3.5 | 4.0 | 1.4 | 5.1 | 4.5 |
| Superficial gas velocity (ft/sec) | | | | 1.8 | 1.7 |

TABLE 5D

COMPARATIVE SAMPLES

| RESIN PROPERTIES | SAMPLE NO. | | | | |
|---|---|---|---|---|---|
| (Blend) | C591 | C592 | C636 | C916 | C918 |
| Flow Index, dg/min I21 (G) | 9.0 | 8.5 | 8.9 | 9.9 | 9.7 |
| Melt Index, dg/min I2 (G) | 0.15 | 0.1 | 0.38 (MI5) | 0.13 | 0.14 |
| Density, g/cm$^3$ (G) | 0.9400 | 0.9403 | 0.9407 | 0.9399 | 0.9396 |
| MFR (MI21/MI2) (G) | 61.1 | 69.4 | 23.4 (MI21/MI5) | 73.9 | 67.6 |
| Titanium, ppmw (G) | 2.4 | 2.5 | 1.88 | 1.3 | 1.1 |
| Aluminum ppmw (G) | 57.9 | 56.0 | 74.9 | 58.1 | 46.5 |
| Al/Ti (G) | 43.2 | 39.9 | 71.2 | 80.5 | 75.5 |
| Bulk Density, lb/ft3 (G) | 26.3 | 24.6 | 20.4 | 19.6 | 18.7 |
| APS, inches (G) | 0.026 | 0.025 | 0.0302 | 0.033 | 0.034 |
| Fines, Wt % less than120 Mesh (G) | 2.0 | 1.7 | 3.7 | 2.3 | 1.9 |
| Split % by Energy Balance (G) | 61.7 | 60.9 | | 68.4 | 65.4 |
| Split % calculated (G) | 58.5 | 57.8 | 57.7 | 58.6 | 55.4 |

[Split % (calculated) = (weight of HMW/(sum weight (HMW + LMW))) × 100]

TABLE 5E

COMPARATIVE SAMPLES

| | SAMPLE NO. | | | | |
|---|---|---|---|---|---|
| | C591 | C592 | C636 | C916 | C918 |
| MI2 - g/10 min (P) ASTM D-1238-04 | 0.14 | 0.13 | 0.0977 | 0.13 | 0.16 |
| MI5 - g/10 min (P) ASTM D-1238-04 | 0.53 | 0.45 | 0.382 | 0.48 | 0.60 |
| ASTM D-1238-04 | 1.8 | 1.6 | 1.51 | 1.71 | 2.13 |
| MI21 - g/10 min(P) ASTM D-1238-04 | 9.4 | 8.2 | 9.45 | 9.14 | 10.59 |
| MFR (I21/I2) (P) | 67.1 | 63.1 | 96.7 | 71.0 | 65.1 |
| MFR (I21/I5) (P) | 17.7 | 18.2 | 24.7 | 18.9 | 17.7 |
| MFR (I10/I2) (P) | 12.9 | 12.3 | 15.5 | 13.3 | 13.1 |
| Density (g/cc) (P) ASTM D-790-00 | 0.9403 | 0.9403 | 0.9425 | 0.9456 | 0.9446 |
| IR structure (P) | | | | | |
| Trans/1000 carbons (P) ASTM D-6248-2004 | 0 | 0 | 0.023 | 0.001 | 0.005 |
| Vinyls/1000 carbons (P) ASTM D-6248-2004 | 0.135 | 0.126 | 0.219 | 0.17 | 0.2 |

TABLE 5E-continued

COMPARATIVE SAMPLES

| | \multicolumn{5}{c}{SAMPLE NO.} | | | | |
|---|---|---|---|---|---|
| | C591 | C592 | C636 | C916 | C918 |
| Methyls/1000 carbons (P) ASTM D-2238-1999 | 3.61 | 3.12 | 3.89 | 4.4 | 4 |
| Additive analysis | | | | | |
| Irganox 1010 ppm | 1324 | 1233 | 1824 | 1421 | 1462 |
| Irgafos 168 ppm total | 1316 | 1365 | 2199 | 953 | 968 |
| Irgafos 168 ppm Active | 1080 | 1119 | 1994 | 533 | 654 |
| Irgafos 168 ppm Inactive | 236 | 246 | 205 | 1486 | 1622 |
| Percent Active I-168 | 0.82 | 0.82 | 90.68 | 64.1 | 59.7 |

TABLE 5F

COMPARATIVE SAMPLES

| | SAMPLE NO. | | | | |
|---|---|---|---|---|---|
| | C591 | C592 | C636 | C916 | C918 |
| RMS-100 Viscosity MPa·S at 0.01 sec−1 shear rate | 9.00E+05 | 1.10E+06 | | 1070000 | 866000 |
| RMS-800 Viscosity MPa·S at 100 sec−1 shear rate | 25200 | 26100 | | 24252 | 24463 |
| G'/G" @ 0.01 sec−1 Shear Rate | 0.29 | 0.32 | | 0.337 | 0.284 |
| G'/G" @ 0.1 sec−1 Shear Rate | 0.42 | 0.45 | | 0.467 | 0.421 |
| Viscosity ratio 0.01/100 data | 35.7 | 42.1 | | 44.1 | 35.4 |
| Rheotens melt strength (cN) | | | 13 | 11 | 10 |
| Rheotens Velocity (mm) | | | | 145 | 149 |
| DSC Melting Point (Deg C.) ASTM D-3418-03 | 128.85 | 129.6 | 127.47 | 128.26 | 128.37 |
| Heat of Fusion (J/g) ASTM D-3418-03 | 180.2 | 173.6 | 190.8 | 184.7 | 180.6 |
| DSC Crystallization point (Deg C.) ASTM D-3418-03 | 115.45 | 115.45 | 116.41 | 116.05 | 116.1 |
| Heat of Crystallization (J/g) ASTM D-3418-03 | 179.5 | 172.4 | 188.6 | 178 | 175.9 |
| DSC Induction Time (min) ASTM D-3350-05 | 43.62 | 39.9 | | | |
| DSC Induction Temp (Deg C.) ASTM D-3350-05 | 237.86 | 245.58 | | | |
| C13 NMR Wt % Hexene ASTM D-5017-91 | 3.1 | 2.8 | 2.4 | 3.1 | 2.7 |

TABLE 5G

COMPARATIVE SAMPLES

| | SAMPLE NO. | | | | |
|---|---|---|---|---|---|
| | C591 | C592 | C636 | C916 | C918 |
| Atref HD fraction (%) | 74.7 | 77 | 73 | 69.2 | 68.3 |
| Temperature Minimum (C.) | 86.1 | 86.3 | 86.1 | 87.1 | 86.1 |

TABLE 5G-continued

| COMPARATIVE SAMPLES | | | | | |
|---|---|---|---|---|---|
| | SAMPLE NO. | | | | |
| | C591 | C592 | C636 | C916 | C918 |
| SCB portion | 14.6 | 12.3 | 14.6 | 17 | 14 |
| SCB portion minimum temperature (C.) | 50 | 56 | 56 | 55 | 60 |
| SCB distribution Mv | 92496 | 91775 | 112183 | 109150 | 119540 |
| ATREF Purge (%) | 10.7 | 10.7 | 12.4 | 13.8 | 17.7 |
| Purge Mv | 73084 | 86842 | 97678 | 84706 | 112700 |
| ATREF Overall Mv Average | 90419 | 91247 | 110384 | 105777 | 118329 |
| ATREF Dv viscosity - temperature slope (70° C.-90° C. region) | 0.054 | 0.018 | 0.041 | −0.0032 | 0.021 |
| Triple Detector Results | | | | | |
| Conventional GPC | | | | | |
| Mn | 16690 | 19640 | 10890 | 17770 | 21120 |
| Mw | 194430 | 200670 | | 161720 | 162700 |
| Mz | 808700 | 880800 | | 707900 | 680800 |
| Mw/Mn | 11.6 | 10.2 | | 9.1 | 7.7 |
| Absolute GPC | | | | | |
| Mn | 20881 | 23343 | | 17309 | 19200 |
| Mw | 215820 | 209010 | 241400 | 157960 | 168500 |
| Mw (abs)/Mn abs | 10.3 | 9.0 | 22.2 | 9.1 | 8.8 |
| Mz(BB) | 845200.0 | 805000.0 | 1290000 | 590100 | 645500 |
| Mz (abs) | 965500 | 896400 | | 620400 | 732400 |
| Mz + 1 (BB) | 1647200.0 | 1536400.0 | 2504000.0 | 1114200 | 1196200 |
| Mz (abs)/Mw | 4.47 | 4.29 | 5.3 | 3.9 | 4.3 |
| Mw (abs)/Mw (GPC) | 1.11 | 1.04 | | | |

TABLE 5H

| COMPARATIVE SAMPLES | | | | | |
|---|---|---|---|---|---|
| | SAMPLE NO. | | | | |
| Plaque Properties | C591 | C592 | C636 | C916 | C918 |
| PENT (2.4 MPa) Hrs ASTM D-1473-01 | 18047 | >19320 (discontinued) | 1687 | 12880 (discontinued) | >13,181 (on test) |
| RCP Gc @ 23 C. from PENT plaque milled to 2 mm thick samples (KJ/m2) Modified (2 mm) ASTM F-2231-02 | 127 | 175 | 176.1 | 194.5 | 175.7 |
| RCP Gc @ 23 C. from PENT plaque milled to 3 mm thick samples (KJ/m2) ASTM F-2231-02 | | | | | |
| Flexural Modulus (psi) @ 0.5 inches/min ASTM D-790-03 | 134000 | 135000 | 144400 | 151000 | 148770 |
| SD | | | | 8666 | 5640 |
| Secant Modulus (psi) 2% @ 0.5 inches/min ASTM D-790-03 | 95000 | 100000 | | 102000 | 100075 |
| SD | | | | 920 | 1675 |
| Secant Modulus (psi) 1% @ 0.5 inches/min ASTM D-790-03 | 114000 | 120000 | | 122300 | 120000 |
| SD | | | | 1473 | 281 |
| Tensile Strength (PSI) ASTM D638-03 | 5320 | 5470 | 4764 | 5074 | 5554 |
| SD | | | | 444 | 300 |
| % Elongation | 880 | 730 | 752 | 740 | 630 |

TABLE 5H-continued

COMPARATIVE SAMPLES

| Plaque Properties | C591 | C592 | C636 | C916 | C918 |
|---|---|---|---|---|---|
| ASTM D638-03 | | | | | |
| SD | | | | 55 | 118 |
| Yield Strength (psi) | 2440 | 2860 | 2700 | 2448 | 2572 |
| ASTM D638-03 | | | | | |
| SD | | | | 65 | 163 |
| Yield Strain (%) | 15.7? | 11? | 5.9 | 4 | 5.6 |
| ASTM D638-03 | | | | | |
| SD | | | | 0.25 | 3.6 |

TABLE 5I

COMPARATIVE SAMPLES

| Burst Properties | C591 | C592 | C636 | C916 | C918 |
|---|---|---|---|---|---|
| 10**5 intercept at 23 C. (psi) ASTM D-1598-02 ASTM D-2837-04 | NA | NA | NA | NA | 1328 |
| 10**5 intercept at 60 C., (psi) ASTM D-1598-02 ASTM D-2837-04 | Failed | Failed | ~940 | Failed | 952 |

TABLE 5I-continued

COMPARATIVE SAMPLES

| Burst Properties | C591 | C592 | C636 | C916 | C918 |
|---|---|---|---|---|---|
| Hours on test at 60 C. 90 C. validation test (690 psi Hoop stress for >3800 hours) PPI TR #3 Section F.4.2.1 | NA | NA | NA | NA | 7388 |

NA = Not Applicable

TABLE 6A

COMPARATIVE SAMPLES

| | C919 | C920 | C921 | C923 | C924 |
|---|---|---|---|---|---|
| Type | Precursor | Precursor | Precursor | Precursor | 0017 reduction |
| First Reactor REACTION CONDITIONS | | | | | |
| Temp. ° C. | 80.0 | 80.0 | 80.0 | 80.0 | 80.0 |
| C2 Part. Pressure, psi | 30.8 | 36.8 | 33.5 | 26.5 | 38.8 |
| H2/C2 Molar Ratio | 0.012 | 0.034 | 0.028 | 0.034 | 0.027 |
| C6/C2 Molar Ratio | 0.115 | 0.124 | 0.112 | 0.099 | 0.114 |
| Ethylene lb/hr | 27.5 | 26.8 | 27.5 | 26.9 | 27.0 |
| Hexene lb/hr | 1.8 | 2.1 | 1.8 | 1.5 | 1.9 |
| Hydrogen mlb/hr | 2.7 | 7.1 | 5.4 | 5.2 | 5.4 |
| Isopentane lb/hr | — | — | — | — | — |
| Nitrogen lb/hr | 4.6 | 4.3 | 4.4 | 4.1 | 3.8 |
| Ethylene Mol % | 9.8 | 11.8 | 10.7 | 8.5 | 12.4 |
| Hexene Mol % | 1.1 | 1.4 | 1.2 | 0.8 | 1.4 |
| Hydrogen Mol % | 0.1 | 0.4 | 0.3 | 0.3 | 0.3 |
| Isopentane Mol % | 8.0 | 8.0 | 8.0 | 8.0 | 8.0 |
| Nitrogen Mol % | 79.7 | 78.5 | 79.2 | 82.3 | 78.2 |
| Cat cc/hr | 14.4 | 14.4 | 14.4 | 14.4 | 15.4 |
| E.B. Production Rate, lb/hr | 34.7 | 34.8 | 34.8 | 35.0 | 35.1 |
| Bed Weight, lbs | 68.7 | 68.5 | 68.5 | 68.5 | 68.3 |
| FBD (lb/ft3) | 12.3 | 12.3 | 12.3 | 12.7 | 11.7 |
| Bed Volume, ft3 | 11.64 | 11.64 | 11.64 | 11.64 | 12.64 |
| Residence Time, hr | 2.0 | 2.0 | 2.0 | 2.0 | 1.9 |
| STY, lb/hr/ft3 | 3.0 | 3.0 | 3.0 | 3.0 | 2.8 |
| SGV (ft/sec) | 11.6 | 11.6 | 11.6 | 11.6 | 12.6 |

TABLE 6B

COMPARATIVE SAMPLES

| RESIN PROPERTIES (First reactor) | SAMPLE NO. | | | | |
|---|---|---|---|---|---|
| | C919 | C920 | C921 | C923 | C924 |
| Flow Index, dg/min I21 | 0.26 | 0.87 | 0.66 | 0.56 | 0.71 |
| Melt Index, dg/min I2 | — | — | — | — | — |
| Density, g/cm3 | 0.9179 | 0.9183 | 0.9194 | 0.9206 | 0.9205 |
| MFR | — | — | — | — | — |
| Titanium, ppmw | 1.7 | 1.8 | 1.8 | 2.3 | 1.6 |
| Aluminum ppmw | 60.6 | 65.0 | 71.7 | 65.5 | 71.6 |
| Al/Ti | 62.3 | 63.4 | 71.9 | 50.1 | 81.0 |
| Bulk Density, lb/ft3 | 16.1 | 15.8 | 15.3 | 16.4 | 15.4 |
| APS, inches | 0.041 | 0.041 | 0.039 | 0.038 | 0.041 |
| Fines, Wt % LT 120 Mesh | 1.5 | 1.0 | 1.2 | 0.9 | 0.4 |

TABLE 6C

COMPARATIVE SAMPLES

| REACTION CONDITIONS (Second reactor) | SAMPLE NO. | | | | |
|---|---|---|---|---|---|
| | C919 | C920 | C921 | C923 | C924 |
| Temp. °C. | 94.9 | 94.9 | 95.0 | 94.9 | 95.0 |
| Pressure, psig | 387.7 | 386.6 | 386.7 | 342.6 | 342.7 |
| C2 Part. Pressure, psi | 123.6 | 100.1 | 113.4 | 70.1 | 127.1 |
| H2/C2 Molar Ratio | 0.8 | 0.5 | 0.5 | 1.3 | 0.5 |
| C6/C2 Molar Ratio | 0.013 | 0.011 | 0.011 | 0.01 | 0.01 |
| Ethylene lb/hr | 37.8 | 33.5 | 37.7 | 27.5 | 36.7 |
| Hexene lb/hr | 0.5 | 0.4 | 0.4 | 0.3 | 0.4 |
| Isopentane lb/hr | 1.0 | 1.0 | 1.0 | 1.0 | 2.0 |
| Nitrogen lb/hr | 13.5 | 17.6 | 17.4 | 21.2 | 13.1 |
| Ethylene Mol % | 30.7 | 24.9 | 28.2 | 19.6 | 35.6 |
| Hexene Mol % | 0.4 | 0.3 | 0.3 | 0.2 | 0.4 |
| Hydrogen Mol % | 26.0 | 12.4 | 14.1 | 25.5 | 17.7 |
| Isopentane Mol % | 0.4 | 0.3 | 0.3 | 0.4 | 0.3 |
| Nitrogen Mol % | 41.8 | 61.5 | 56.1 | 53.8 | 45.6 |
| E.B. Production Rate, lb/hr | 22.9 | 20.7 | 25.1 | 16.6 | 24.1 |
| Bed Weight, lbs | 98.6 | 98.6 | 99.6 | 98.0 | 98.4 |
| Fluidized Bed Density (lb/ft3) | 13.8 | 12.7 | 13.0 | 14.6 | 14.0 |
| Bed Volume, ft3 | 13.0 | 13.0 | 13.0 | 13.0 | 14.0 |
| Residence Time, hr | 1.71 | 1.78 | 1.66 | 1.90 | 1.66 |
| Space Time Yield, lb/hr/ft3 | 4.4 | 4.3 | 4.6 | 4.0 | 4.2 |
| Superficial gas velocity (ft/sec) | 1.7 | 1.7 | 1.7 | 1.6 | 1.6 |

TABLE 6D

COMPARATIVE SAMPLES

| RESIN PROPERTIES (Blend) | SAMPLE NO. | | | | |
|---|---|---|---|---|---|
| | C919 | C920 | C921 | C923 | C924 |
| Flow Index, dg/min I21 (G) | 8.6 | 8.6 | 9.2 | 7.5 | 9.0 |
| Melt Index, dg/min I2 (G) | 0.09 | 0.17 | 0.17 | 0.11 | 0.17 |
| Density, g/cm3 (G) | 0.9405 | 0.9371 | 0.9397 | 0.9392 | 0.9396 |
| MFR (MI21/MI2) (G) | 100.6 | 49.6 | 54.3 | 70.2 | 54.4 |
| Titanium, ppmw (G) | 1.0 | 1.1 | 0.9 | 1.6 | 0.9 |
| Aluminum ppmw (G) | 41.8 | 50.6 | 41.4 | 54.6 | 46.3 |
| Al/Ti (G) | 77.1 | 80.3 | 85.3 | 62.4 | 91.9 |
| Bulk Density, lb/ft3 (G) | 18.7 | 17.9 | 17.9 | 19.5 | 18.9 |
| APS, inches (G) | 0.036 | 0.038 | 0.038 | 0.033 | 0.039 |
| Fines, Wt % less than 120 Mesh (G) | 1.8 | 1.2 | 1.5 | 1.8 | 0.6 |
| Split % by Energy Balance (G) | 60.3 | 62.6 | 58.1 | 67.8 | 59.3 |
| Split % calculated (G) | 47.9 | 54.8 | 50.5 | 60.5 | 51.6 |
| MI2 - g/10 min (P) ASTM D-1238-04 | 0.10 | 0.19 | 0.19 | 0.10 | 0.17 |
| MI5 - g/10 min (P) ASTM D-1238-04 | 0.42 | 0.67 | 0.71 | 0.46 | 0.66 |
| MI10 - g/10 min (P) ASTM D-1238-04 | 1.68 | 2.16 | 2.36 | 1.53 | 2.20 |
| MI21 - g/10 min (P) ASTM D-1238-04 | 9.14 | 9.84 | 11.06 | 8.13 | 10.58 |
| MFR (I21/I2) (P) | 90.7 | 51.0 | 58.3 | 81.1 | 61.6 |
| MFR (I21/I5) (P) | 21.6 | 14.7 | 15.6 | 17.7 | 16.1 |
| MFR (I10/I2) (P) | 16.6 | 11.2 | 12.4 | 15.2 | 12.8 |

[Split % (calculated) = (weight of HMW/(sum weight (HMW + LMW))) × 100]

TABLE 6E

COMPARATIVE SAMPLES

| | SAMPLE NO. | | | | |
|---|---|---|---|---|---|
| | C919 | C920 | C921 | C923 | C924 |
| Density (g/cc) (P) ASTM D-792-00 | 0.9457 | 0.9424 | 0.9455 | 0.9451 | 0.9447 |
| IR structure (P) | | | | | |
| Trans/1000 carbons(P) ASTM D-6248-2004 | 0.034 | 0.062 | 0.04 | 0.02 | 0.036 |
| Vinyls/1000 carbons (P) ASTM D-6248-2004 | 0.2 | 0.16 | 0.18 | 0.17 | 0.18 |
| Methyls/1000 carbons (P) ASTM D-2238-1999 | 4.4 | 1.5 | 4 | 4.7 | 4.2 |

TABLE 6E-continued

COMPARATIVE SAMPLES

| | SAMPLE NO. | | | | |
|---|---|---|---|---|---|
| | C919 | C920 | C921 | C923 | C924 |
| Additive analysis | | | | | |
| Irganox 1010 ppm | 1500 | 1494 | 1486 | 1452 | 1642 |
| Irgafos 168 ppm total | 918 | 760 | 733 | 823 | 836 |
| Irgafos 168 ppm Active | 694 | 907 | 923 | 826 | 1049 |
| Irgafos 168 ppm Inactive | 1612 | 1667 | 1656 | 1649 | 1885 |
| Percent Active I-168 | 56.9 | 45.6 | 44.3 | 49.9 | 44.4 |
| RMS-100 Viscosity MPa·S at 0.01 sec−1 shear rate | 150000 | 74500 | 75400 | 132000 | 92700 |
| RMS-800 Viscosity MPa·S at 100 sec−1 shear rate | 2379 | 2616 | 2467 | 2649 | 2545 |
| G'/G" @ 0.01 sec−1 Shear Rate | 0.327 | 0.295 | 0.308 | 0.397 | 0.384 |
| G'/G" @ 0.1 sec−1 Shear Rate | 0.563 | 0.404 | 0.422 | 0.511 | 0.48 |
| Viscosity ratio 0.01/100 data | 63.1 | 28.5 | 30.6 | 49.8 | 36.4 |
| Rheotens melt strength (cN) | 12.5 | 9.5 | 9.5 | 12.5 | 10 |
| Rheotens Velocity (mm) | 130 | 150 | 160 | 130 | 125 |

TABLE 6F

COMPARATIVE SAMPLES

| | SAMPLE NO. | | | | |
|---|---|---|---|---|---|
| | C919 | C920 | C921 | C923 | C924 |
| DSC Melting Point (Deg C.) ASTM D-3418-03 | 129.3 | 129.22 | 129.82 | 128.79 | 129.28 |
| Heat of Fusion (J/g) ASTM D-3418-03 | 187.2 | 174.9 | 177.5 | 180.3 | 180.8 |
| DSC Crystallization point (Deg C.) ASTM D-3418-03 | 116.75 | 116.33 | 116.49 | 116.32 | 117.53 |
| Heat of Crystallization (J/g) ASTM D-3418-03 | 175.6 | 169.8 | 170.9 | 175.5 | 180 |
| DSC Induction Time (min) ASTM D-3350-05 | | | | | |
| DSC Induction Temp (Deg C.) ASTM D-3350-05 | | | | | |
| C13 NMR Wt % Hexene ASTM D-5017-91 | 2.8 | 3.6 | 2.8 | 3 | |
| Branches/1000 C. in Backbone ASTM D-5017-91 | | | | | |
| ATREF HD fraction (%) | 72.2 | 67.6 | 74.5 | 72.1 | 72.3 |
| Temperature Minimum (° C.) | 87 | 87.4 | 86.6 | 86 | 86 |
| SCB portion | 13.9 | 17.6 | 12.8 | 15.2 | 13.2 |
| SCB portion minimum temperature (° C.) | 55 | 35 | 55 | 48 | 55 |
| SCB distribution Mv | 118808 | 117914 | 104429 | 100613 | 76229 |
| ATREF Purge (%) | 13.9 | 14.8 | 12.7 | 12.7 | 14.5 |
| Purge Mv | 99009 | 104622 | 85525 | 79988 | 63014 |
| ATREF Overall Mv Average | 116056 | 115947 | 102028 | 97994 | 74313 |

TABLE 6F-continued

COMPARATIVE SAMPLES

| | SAMPLE NO. | | | | |
|---|---|---|---|---|---|
| | C919 | C920 | C921 | C923 | C924 |
| ATREF Dv viscosity - temperature slope (70° C.-90° C. region) | −0.0027 | 0.0063 | 0.00031 | −0.00078 | −0.0011 |

TABLE 6G

COMPARATIVE SAMPLE

| | SAMPLE NO. | | | | |
|---|---|---|---|---|---|
| | C919 | C920 | C921 | C923 | C924 |
| Triple Detector Results Conventional GPC | | | | | |
| Mn | 21660 | 29250 | 28640 | 22120 | 31000 |
| Mw | 196560 | 133280 | 170000 | 200480 | 186380 |
| Mz | 885000 | 453400 | 679700 | 827900 | 776200 |
| Mw/Mn Absolute | 9.1 | 4.6 | 5.9 | 9.1 | 6.0 |

TABLE 6G-continued

COMPARATIVE SAMPLE

| | SAMPLE NO. | | | | |
|---|---|---|---|---|---|
| | C919 | C920 | C921 | C923 | C924 |
| GPC | | | | | |
| Mn | 20500 | 29900 | 29900 | 21640 | 30733 |
| Mw | 199290 | 163170 | 191960 | 200750 | 194260 |
| Mw (abs)/Mn abs | 9.7 | 5.5 | 6.4 | 9.3 | 6.3 |
| Mz (BB) | 829000 | 558100 | 704000 | 790200 | 759200 |
| Mz (abs) | 811200 | 927600 | 867100 | 785600 | 865000 |
| Mz + 1 (BB) | 1540300 | 1108400 | 1356800 | 1467100 | 1440300 |
| Mz (abs)/Mw | 4.1 | 5.7 | 4.5 | 3.9 | 4.5 |

TABLE 6H

COMPARATIVE SAMPLE

| | SAMPLE NO. | | | | |
|---|---|---|---|---|---|
| Plaque Properties | C919 | C920 | C921 | C923 | C924 |
| PENT (2.4 MPa) Hrs ASTM D-1473-01 | >13513 (on test) | >13478 (on test) | >13274 (on test) | 12768 (discontinued) | 12314 (discontinued) |
| RCP Gc @ 23 C. from PENT plaque milled to 2 mm thick samples (KJ/m2) Modified (2 mm) ASTM F-2231-02 | 204.9 | 193.4 | 206 | 193.4 | 204.9 |
| RCP Gc @ 23 C. from PENT plaque milled to 3 mm thick samples (KJ/m2) ASTM F-2231-02 | | | | | |
| Flexural Modulus (psi) @ 0.5 inches/min ASTM D-790-03 | 153800 | 141250 | 151000 | 144000 | 139300 |
| SD | 3650 | 2920 | 8520 | 6580 | 8540 |
| Secant Modulus (psi) 2% @ 0.5 inches/min ASTM D-790-03 | 101600 | 93150 | 101700 | 98000 | 95400 |
| SD | 1718 | 1400 | 1907 | 2626 | 2685 |
| Secant Modulus (psi) 1% @ 0.5 inches/min ASTM D-790-03 | 122200 | 112300 | 122000 | 117500 | 114300 |
| SD | 2093 | 1310 | 2660 | 3978 | 4062 |
| Tensile Strength (PSI) ASTM D-638-03 | 5376 | 5310 | 5040 | 4980 | 5080 |
| SD | 134 | 150 | 412 | 140 | 395 |
| % Elongation ASTM D-638-03 | 620 | 682 | 725 | 590 | 695 |
| SD | 54 | 37 | 35 | 80 | 50 |
| Yield Strength (psi) ASTM D-638-03 | 2628 | 2330 | 2525 | 2438 | 2544 |

TABLE 6H-continued

COMPARATIVE SAMPLE

| Plaque Properties | SAMPLE NO. | | | | |
|---|---|---|---|---|---|
| | C919 | C920 | C921 | C923 | C924 |
| SD | 115 | 48 | 59 | 27 | 52 |
| Yield Strain (%) ASTM D-638-03 | 6.4 | 4.6 | 4.56 | 4.7 | 4.72 |
| SD | 5.3 | 0.09 | 0.23 | 0.17 | 0.38 |

TABLE 6I

COMPARATIVE SAMPLE

| Burst Properties | SAMPLE NO. | | | | |
|---|---|---|---|---|---|
| | C919 | C920 | C921 | C923 | C924 |
| 10**5 intercept at 23 C. (psi) ASTM D-1598-02 ASTM D-2837-04 | NA | NA | NA | NA | NA |
| 10**5 intercept at 60 C., (psi) ASTM D-1598-02 ASTM D-2837-04 | Failed | Failed | Failed | Failed | Failed |
| 90 C validation test (690 psi Hoop stress for >3800 hours) PPI TR #3 Section F.4.2.1 | NA | NA | NA | NA | NA |

NA = Not Applicable

TABLE 7A

COMPETITIVE SAMPLES

| | SAMPLE NO. | |
|---|---|---|
| | COM049 | COM769 |
| Type | Solvay - Fortiflex | Chevron Phillips |
| Info | K-38-20-160 | TR-418Q |
| MI2 - g/10 min (P) ASTM D-1238-04 | 0.22 | 0.14 |
| MI5 - g/10 min (P) ASTM D-1238-04 | 1.05 | 0.76 |
| MI10 - g/10 min (P) ASTM D-1238-04 | 3.85 | 3.26 |
| MI21 - g/10 min (P) ASTM D-1238-04 | 19.9 | 15.4 |
| MFR (I21/I2) (P) | 90.5 | 110 |
| MFR (I21/I5) (P) | 19.0 | 20.3 |
| MFR (I10/I2) (P) | 17.5 | 23.3 |
| Density (g/cc) (P) ASTM D-792-00 | 0.9422 | 0.9398 |
| Additive analysis | | |
| Irganox 1010 ppm | | 1312 |
| Irgafos 168 ppm total | | 700 |
| Irgafos 168 ppm Active | | 660 |
| Irgafos 168 ppm Inactive | | 40 |
| Percent Active I-168 | | 0.94 |
| RMS-100 Viscosity MPa · S at 0.01 sec-1 shear rate | 91500 | 116000 |
| RMS-800 Viscosity MPa · S at 100 sec-1 shear rate | | 1870 |
| G'/G" @ 0.01 sec-1 Shear Rate | | 0.63 |
| G'/G" @ 0.1 sec-1 Shear Rate | | 0.68 |
| Viscosity ratio 0.01/100 data | | 62 |
| Rheotens melt strength (cN) | 13 | |

TABLE 7B

COMPETITIVE SAMPLES cont.

| | SAMPLE NO. | |
|---|---|---|
| | COM049 | COM769 |
| DSC Melting Point (Deg C.) ASTM D-3418-03 | 126.63 | |
| Heat of Fusion (J/g) ASTM D-3418-03 | 181.5 | |
| DSC Crystallization point (Deg C.) ASTM D-3418-03 | 114.57 | |
| Heat of Crystallization (J/g) ASTM D-3418-03 | 164.6 | |
| DSC Induction Time (min) ASTM D-3350-05 | | |
| DSC Induction Temp (Deg C.) ASTM D-3350-05 | | |
| C13 NMR Wt % Hexene ASTM D-5017-91 Branches/1000 C in Backbone ASTM D-5017-91 | 3.2 | 3.7 |
| Atref HD fraction (%) | 70.5 | 68.8 |
| Temperature Minimum (C.) | 86 | 87 |
| SCB portion | 22.1 | 19 |
| SCB portion minimimu temperature (C.) | 55 | 62 |
| SCB distribution Mv | 98970 | 130026 |
| Aterf Purge (%) | 7.4 | 12.2 |
| Purge Mv | 71715 | 93577 |
| Atref Overall Mv Average | 96953 | 125579 |
| Atref Dv viscosity - temperature slope (70° C.-90° C. region) | 0.04 | 0.018 |
| Triple Detector Results | | |
| Conventional GPC | | |
| Mn | 14900 | 10800 |
| Mw | | 200000 |
| Mz | | 1555000 |
| Mw/Mn | | 18.5 |
| Absolute GPC | | |
| Mn | | 11000 |
| Mw | 145800 | 200500 |
| Mw (abs)/Mn abs | 9.79 | 18.6 |
| Mz(BB) | 713400 | 1533000 |
| Mz (abs) | 1480000 | 1482000 |
| Mz + 1 (BB) | | 3610000.0 |
| Mz (abs)/Mw | 4.89 | 7.4 |
| Mw (abs)/Mw (GPC) | | 1.0 |

TABLE 7C

COMPETITIVE SAMPLES cont.

| | SAMPLE NO. | |
|---|---|---|
| | COM049 | COM769 |
| Plaque Properties | | |
| PENT (2.4 MPa) Hrs ASTM D-1473-01 | 2890 | 8625 |

TABLE 7C-continued

COMPETITIVE SAMPLES cont.

| | SAMPLE NO. | |
|---|---|---|
| | COM049 | COM769 |
| RCP Gc @ 23 C. from PENT plaque milled to 2 mm thick samples (KJ/m2) Modified (2 mm) ASTM F-2231-02 | 120 | 53 |
| RCP Gc @ 23 C. from PENT plaque milled to 3 mm thick samples (KJ/m2) ASTM F-2231-02 | | |
| Flexural Modulus (psi) @ 0.5 inches/min ASTM D-790-03 SD | 130700 | 126000 |
| Secant Modulus (psi) 2% @ 0.5 inches/min ASTM D-790-03 SD | | 89400 |
| Secant Modulus (psi) 1% @ 0.5 inches/min ASTM D-790-03 SD | | 105000 |
| Tensile Strength (PSI) ASTM D-638-03 SD | 4290 | 4425 |
| % Elongation ASTM D-638-03 SD | 822 | 780 |
| Yield Strength (psi) ASTM D-638-03 SD | 2633 | 2720 |
| Yield Strain (%) ASTM D-638-03 SD | | 7.1 |
| Burst Properties | | |
| 10**5 intercept at 23 C. (psi) ASTM D-1598-02 ASTM D-2837-04 | >1260 | >1260 |
| 10**5 intercept at 60 C., (psi) ASTM D-1598-02 ASTM D-2837-04 | >960 | >960 |
| Hours on test at 60 C. 90 C. validation test (690 psi Hoop stress for >3800 hours) PPI TR #3 Section F.4.2.1 | | |

Banbury Process Data

Each sample was prepared in a conventional two stage pilot plant pelletizing system as described in Table 8.

TABLE 8

Two Stage Pelletizing System Description

| Item | Manufacturer | Model |
|---|---|---|
| Batch Mixer | Farrel | Banbury ™ 1D Batch Mixer |
| Extruder | Farrel | 8 inch by 4.5 inch dual diameter single screw extruder with a total L/D of 14.1:1 and with an 8.1:1 L/D enclosed section |
| Screen Changer | Kreyenborg | K-SWE-121 |
| Pelletizer | Gala | Model 6 Underwater Pelletizing System |

As described in Table 9 below, the batch mixer processing control parameters for each sample were based on a convention three phase mixing cycle. This table also describes the extruder, screen changer and pelletizing system processing control parameters.

TABLE 9

Processing Control Parameters

| Item | Parameter | Description | Set Point |
|---|---|---|---|
| Banbury | Phase 1 | Speed, rpm | 100 |
| | | Control Method | Time |
| | | Ram Raise Time, sec | 60 |
| | Phase 2 | Speed, rpm | 100 |
| | | Control Method | Temperature |
| | | Ram Raise Temperature, C. | 110 |
| | Phase 3 | Speed, rpm | 100 |
| | | Control Method | Temperature |
| | | Drop Temperature, C. | 160 |
| | Feed Conditions | Temperature | Ambient |
| | | Oxygen, % | 21 |
| | | Hand Charge | Yes |
| | Miscellaneous | Jacket Temperature | Neutral |
| | | Rotor Temperature | Cooling |
| | | Ram Pressure, psig | 55 |
| Extruder | Feed Hopper Temperature | | Neutral |
| | Barrel Temperature | | 60 psig steam |
| | Screw Temperature | | Neutral |
| | Transition Piece Temperatures, C. | | 180 |
| Screen | Temperature, C. | | 180 |
| Changer | Screen Pack | | 20/325/250/ 100/20 |
| Die Plate | Temperature | | 200 psig steam |

The processing conditions recorded, while processing each sample, are summarized in Table 10, and Banbury data is shown in Tables 11A and 11B. Polymer was formulated with one or more of the following additives: an Irganox stabilizer, calcium stearate, one or more Cyasorb additives, lead chromate, titanium dioxide, Dynamar additive.

TABLE 10

Two Stage Pelletizing Processing Conditions

| | Sample ID | | | | | | |
|---|---|---|---|---|---|---|---|
| | C510 1-YL | C512 3-YL | I513 4-YL | I514 5-YL | I515 6YL | I516 7-YL | I517 8-YL |
| Extruder Speed, rpm | 36 | 36 | 36 | 36 | 36 | 36 | 38 |
| Extruder Current, amps | 61 | 72 | 62 | 60 | 60 | 68 | 57 |
| Extruder Discharge Temperature, ° C. | 187 | 187 | 193 | 189 | 192 | 193 | 188 |
| Extruder Discharge Pressure, psig | 3327 | 3430 | 3850 | 3455 | 2825 | 3645 | 3286 |
| Die Pressure, psig | 2480 | 2453 | 2415 | 2322 | 2344 | 2429 | 2281 |

TABLE 11A

BANBURY DATA

| | Sample | | |
|---|---|---|---|
| | C510 (1-YL) | C512 (3-YL) | I513 (4-YL) |
| Feed Temp., ° C. | Ambient | Ambient | Ambient |
| Oxygen Conc., % | 21 | 21 | 21 |
| Number of Phases | 3 | 3 | 3 |
| Phase 1 | | | |
| Speed, rpm | 100 | 100 | 100 |
| Control Method | Time | Time | Time |
| Time, sec | 60 | 60 | 60 |
| Phase 2 | | | |
| Speed, rpm | 100 | 100 | 100 |
| Control Method | Temp | Temp | Temp |
| Raise Temperature, ° C. | 110 | 110 | 110 |
| Phase 3 | | | |
| Speed, rpm | 100 | 100 | 100 |
| Control Method | Temp | Temp | Temp |
| Drop Temperature, ° C. | 160 | 160 | 160 |
| Extruder | | | |
| Speed, rpm | 36 | 36 | 36 |
| Current, amps | 61 | 72 | 62 |
| Extruder Discharge Temperature, ° C. | 187 | 187 | 193 |
| Discharge Pressure, psig | 3327 | 3430 | 3850 |
| Die Pressure, psig | 2480 | 2453 | 2415 |
| Screen Pack | 20/325/250/100/20 | 20/325/250/100/20 | 20/325/250/100/20 |

TABLE 11B

BANBURY DATA

| | Sample | | | |
|---|---|---|---|---|
| | I514 (5-YL) | I515 (6YL) | I516 (7-YL) | I517 (8-YL) |
| Feed Temp., ° C. | Ambient | Ambient | Ambient | Ambient |
| Oxygen Conc., % | 21 | 21 | 21 | 21 |
| Number of Phases | 3 | 3 | 3 | 3 |
| Phase 1 | | | | |
| Speed, rpm | 100 | 100 | 100 | 100 |
| Control Method | Time | Time | Time | Time |
| Time, sec | 60 | 60 | 60 | 60 |
| Phase 2 | | | | |
| Speed, rpm | 100 | 100 | 100 | 100 |
| Control Method | Temp | Temp | Temp | Temp |
| Raise Temperature, ° C. | 110 | 110 | 110 | 110 |
| Phase 3 | | | | |
| Speed, rpm | 100 | 100 | 100 | 100 |
| Control Method | Temp | Temp | Temp | Temp |
| Drop Temperature, ° C. | 160 | 160 | 160 | 160 |
| Extruder | | | | |
| Speed, rpm | 36 | 36 | 36 | 38 |
| Current, amps | 60 | 60 | 68 | 57 |
| Extruder Discharge Temperature, ° C. | 189 | 192 | 193 | 188 |
| Discharge Pressure, psig | 3455 | 2825 | 3645 | 3286 |

TABLE 11B-continued

BANBURY DATA

| | Sample | | | |
|---|---|---|---|---|
| | I514 (5-YL) | I515 (6YL) | I516 (7-YL) | I517 (8-YL) |
| Die Pressure, psig | 2322 | 2344 | 2429 | 2281 |
| Screen Pack | 20/325/250/100/20 | 20/325/250/100/20 | 20/325/250/100/20 | 20/325/250/100/20 |

Scale-Up Runs

Two scale-up polymerization (inventive examples) are shown in Tables 12A and 12B.

TABLE 12A

| | SAMPLE NO. | | | |
|---|---|---|---|---|
| | 1A (First Reactor) | 1B (Second Reactor) | 2A (First Reactor) | 2B (Second Reactor) |
| Type | 0017 reduction | | 0017 reduction | |
| Temp. ° C. | 80 | 95 | 80 | 95 |
| Pressure (psig) | 283 | 353 | 281 | 345 |
| C2 Part. Pressure, psi | 36.2 | 89.7 | 39.7 | 79.5 |
| H2/C2 Molar Ratio | 0.032 | 0.6 | 0.029 | 0.60 |
| C6/C2 Molar Ratio | 0.058 | 0.026 | 0.059 | 0.026 |
| N2 Mol % | 74.6 | 52.8 | 72.5 | 51.4 |
| H2 Mol % | 0.386 | 14.6 | 0.396 | 13.2 |
| C4H4 Mol % | 12.1 | 24.4 | 13.4 | 22.1 |
| C2H6 Mol % | 0.941 | 1.53 | 0.907 | 1.48 |
| IC5 Mol % | 10.77 | 5.94 | 11.93 | 10.91 |
| C6H12 Mol % | 0.7 | 0.632 | 0.79 | 0.571 |
| Teal Flow (lbs/hr) | 6.8 | 2.5 | 8.9 | 3.4 |
| Production Rate, Mlb/hr | 37.7 | 37 | 46.4 | 42.7 |
| Catalyst Feed (lbs/hr) | 12.2 | — | 15.9 | — |
| TnHal Feed lb/hr | 1.23 | — | 1.60 | — |
| TnHal/THF | 17 | — | 17 | — |
| C2 Feed (Mlbs/hr) | 36.6 | 36.6 | 45.1 | 42.2 |
| C6 Feed (lbs/hr) | 1154 | 624 | 1413 | 738 |
| H2 Feed (lbs/hr) | 0.62 | 26.3 | 0.64 | 26.4 |
| N2 Feed (lbs/hr) | 201 | 26 | 278 | 31 |
| IC5 Feed (lbs/hr) | 941 | 0 | 1508 | 558 |
| Bed Weight (Mlbs) | 88.4 | 166 | 85.1 | 175 |
| Upper FBD (lbs/ft³) | 13 | 15.4 | 12.9 | 16.5 |
| Lower FBD (lbs/ft³) | 15.2 | 18.6 | 14.4 | 19.3 |
| Bed Level (ft) | 32.6 | 47.2 | 38.7 | 48.0 |

TABLE 12B

| | SAMPLE NO. | | | |
|---|---|---|---|---|
| | 1A (First Reactor) | 1B (Second Reactor) | 2A (First Reactor) | 2B (Second Reactor) |
| Residence Time (hr) | 2.3 | 2.2 | 1.8 | 2.0 |
| STY (lb/hr/ft³) | 6.5 | 4.2 | 7.8 | 4.7 |
| SGV (ft/s) | 1.69 | 2.03 | 1.72 | 1.83 |
| Dewpoint (° C.) | 51.4 | 40.7 | 54.2 | 55.9 |
| Inlet Temp. (° C.) | 40.9 | 56.9 | 39.2 | 51.9 |
| Wt % Condensing | 7.07 | 0 | 10.59 | 3.71 |
| Split | 0.504 | 0.496 | 0.521 | 0.479 |
| C2 Split | 0.5 | 0.5 | 0.516 | 0.484 |
| Ti (ppmw) | 2.57 | 1.25 | 3.11 | 1.65 |
| Al/Ti | 73.8 | 74.5 | 61.0 | 62.3 |
| Melt Index (I5) | | 0.66 | | 0.65 |
| Flow Index (I21) | 0.57 | 10.14 | 0.55 | 10.10 |
| MFR (I21/I5) | | 15.4 | | 15.5 |
| Density (g/cc) | 0.9243 | 0.9392 | 0.9248 | 0.9396 |

Preparation of Catalyst Precursor

A titanium trichloride catalyst precursor was prepared in an approximately 7,500 liter glass lined vessel, equipped with pressure and temperature control, and a turbine agitator. A nitrogen atmosphere (<5 ppm $H_2O$) was maintained at all times. Tetrahydrofuran (10,500 lbs, 4,800 kg, <400 ppm $H_2O$) were added to the vessel. The tetrahydrofuran was recovered from a closed cycle dryer, and contained approximately 0.1 percent Mg and 0.3 percent Ti. An "11 percent THF solution" of triethylaluminum was added to scavenge residual water. The reactor contents were heated to 40° C., and 13.7 lbs (6 kg) of granular magnesium metal (particle size 0.1-4 mm) was added, followed by 214.5 lbs (97.3 kg) of titanium tetrachloride added over a period of one-half hour.

The mixture was continuously agitated. The exotherm resulting from the addition of titanium tetrachloride causes the temperature of the mixture to rise to approximately 44° C. The temperature was then raised to 70° C. and held at that temperature for approximately four hours, then cooled to 50° C. At the end of this time, 522 pounds (238 kg) of magnesium dichloride were added, and heating initiated to raise the temperature to 70° C. The mixture was held at this temperature for another five hours, then cooled to 35° C., and filtered through a 100 mesh (150 μm) filter to remove solids.

Fumed silica (CAB-O-SIL™ TS-610, manufactured by the Cabot Corporation) (811 lbs, 368 kg) was added to the above precursor solution over a period of one hour. The mixture was stirred by means of a turbine agitator during this time and for 4 hours thereafter to thoroughly disperse the silica. The temperature of the mixture was held at 40° C. throughout this period, and a dry nitrogen atmosphere was maintained at all times. The resulting slurry was spray dried using an 8-foot diameter closed cycle spray dryer, 1 equipped with a rotary atomizer. The rotary atomizer was adjusted to give catalyst particles with a D50 on the order of 20-30 μm. The scrubber section of the spray dryer was maintained at approximately +5 to −5° C.

Nitrogen gas was introduced into the spray dryer at an inlet temperature of 140 to 165° C., and was circulated at a rate of approximately 1000-1800 kg/hour. The catalyst slurry was fed to the spray dryer at a temperature of about 35° C., and a rate of 65-150 kg/hour, or sufficient to yield an outlet gas temperature in the range of 100-125° C. The atomization pressure was maintained at slightly above atmospheric. The resulting catalyst particles are mixed with mineral oil (Kaydol™ 350, available from Witco Corporation), under a nitrogen atmosphere, in a 400 liter glass lined vessel, equipped with a turbine agitator to form a slurry containing approximately 28 percent of the catalyst precursor.

Catalyst Precursor Partial Pre-Activation

The mineral oil slurry of precursor was partially activated (0017 reduction) by contact at room temperature with an appropriate amount of a 50 percent mineral oil solution of tri-n-hexyl aluminum (TNHA). The catalyst precursor slurry was pre-contacted with the activator, and fed through a Kenics mixer to provide mixing prior to feeding to the reactor.

Polymerization

As shown in Tables 12A and 12B, ethylene was copolymerized with 1-hexene in two fluidized bed reactors. Each polymerization is continuously conducted, after equilibrium was reached, under the respective conditions, as set forth in Tables 12A and 12B. Polymerization was initiated in the first reactor by continuously feeding the catalyst (Ziegler/Natta catalyst) and cocatalyst (trialkyl aluminum (triethyl aluminum or TEAL)) into a fluidized bed of polyethylene granules, together with ethylene, 1-hexene and hydrogen. The resulting copolymer, mixed with active catalyst, was withdrawn from the first reactor, and transferred to the second reactor, using second reactor gas as a transfer medium. The second reactor also contained a fluidized bed of polyethylene granules. Ethylene, 1-hexene, and hydrogen were introduced into the second reactor, where the gases come into contact with the polymer and catalyst from the first reactor. Inert gases, nitrogen and isopentane, make up the remaining pressure in both the first and second reactors. In the second reactor, the cocatalyst was again introduced. The final product blend was continuously removed. In the second scale-up run, the second reactor (2B) was operated in condensing mode. This resulted in an improvement in reactor operation through a significant reduction in the level of static build-up in the reactor, and a reduction in the tendency for resin to be drawn toward the reactor walls.

Measurement of the Interior Surface of Pipes Made from Inventive Composition and Competitive Resin 2D Stylus Profilometry of Polyethylene 4 Inch SDR 11.5 Pipe Two pipes, Pipe 1 and Pipe 3, were examined by 2D Stylus Profilometry.

Pipe 3 was formed from an inventive composition.

Pipe 1 was formed from COM 769.

Profilometry was obtained on a KLA-Tencor P-15 stylus profilometer, using a "2 um radius" diamond tip (60 degree cone) and a load of 0.5 milligrams. Pipe samples were cut approximately one inch wide and affixed to glass slides using clay.

The 2D line profiles were collected as a sequence, and aligned perpendicular to the extrusion direction. Another set of 2D line profiles were collected with orientation in parallel to the extrusion direction. Ten (10) "5 mm lines" were spaced 0.5 mm apart. Each line consisted of 1250 points, sampled at a 50 hz sample rate, and a 200 um per second scan speed. The line data was collected using an "800 um wavelength" cut off filter. The raw line data were partitioned into two profiles—one for roughness and one for waviness. Three of these 2D line regions were collected on each pipe section, one in the center and two near each edge.

The ten (10) roughness profiles were analyzed using algorithms (ANSI/ASME B46.1-1985, Surface Texture, American Society of Mechanical Engineers, New York, 1985) provided by the software resident on the Tencor P-15 (v6.41).

Figure 29:
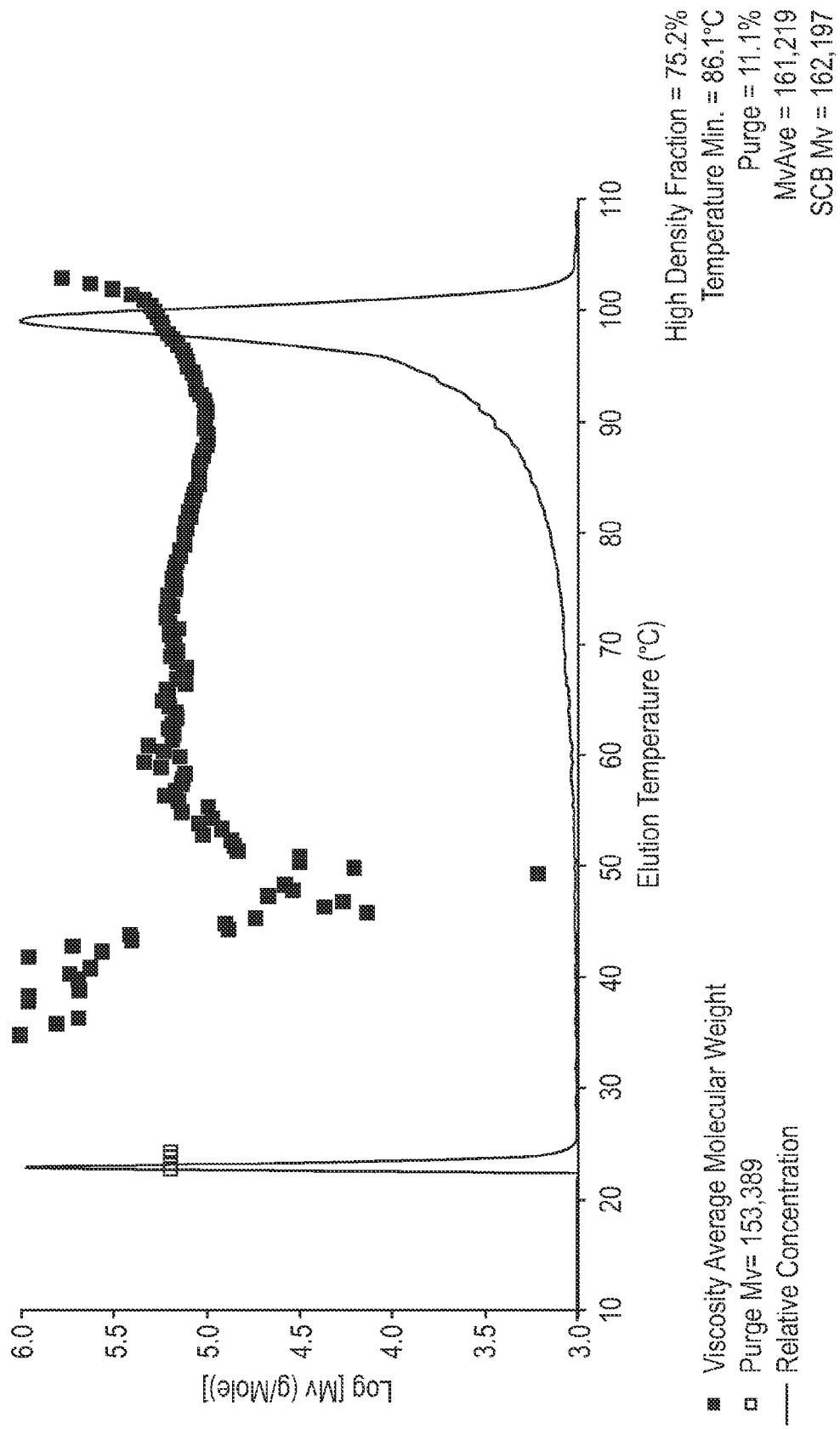
Figure 30:
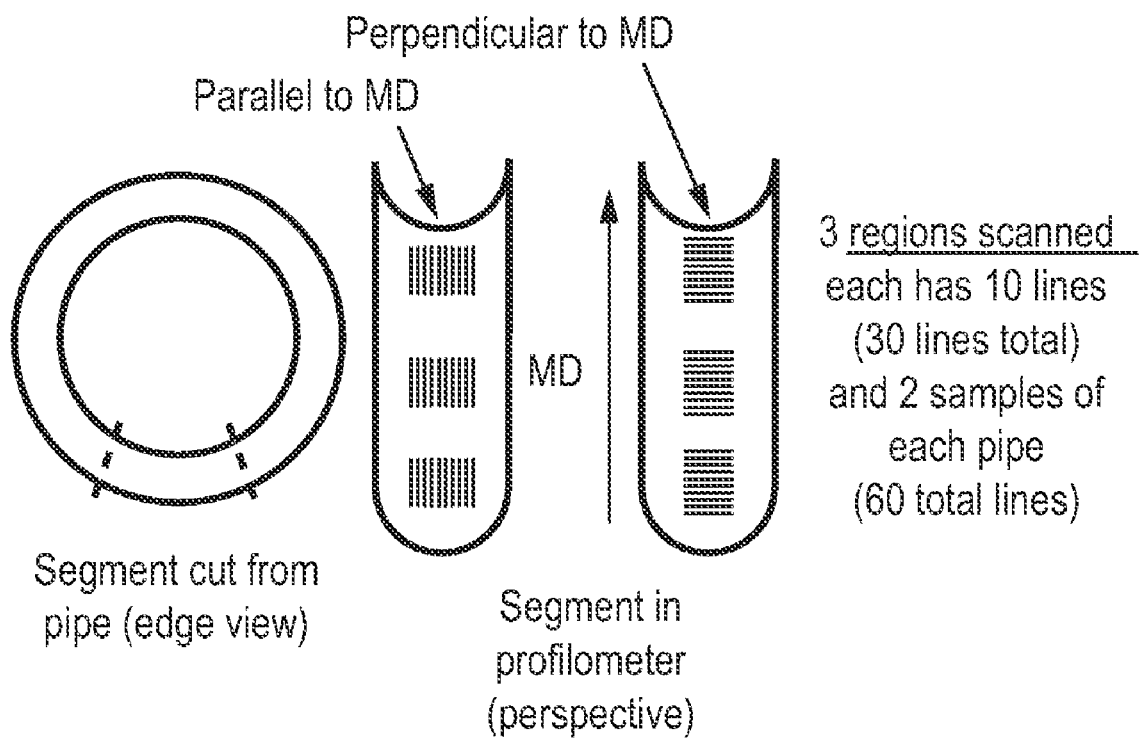
FIG. 30 is a schematic of pipe regions, one parallel to the machine direction (MD) during extrusion, and the other perpendicular to the MD direction.

A schematic of the data collection is shown in FIG. 29. Two representative line scans are shown in FIG. 30. These scans were selected since they were closest to the mean value of the 60 traces. Pipe 1 is obviously rougher, with more frequent features and a higher surface area.

The average perpendicular profilometry results are shown in Tables 13 and 14. As shown in these tables, Pipe 1 (sample 1) is five to six times rougher than Pipe 3 (Sample 3).

TABLE 13

Perpendicular Profilometry Results

| SAMPLE 1 Average (um) | Ra | Rq | Rz |
|---|---|---|---|
| Mean | 16.9 | 21.0 | 88.0 |
| SD | 1.8 | 2.1 | 8.3 |
| Min | 14.2 | 18.2 | 77.4 |
| Max | 20.2 | 24.6 | 103.5 |
| Range | 6.0 | 10.9 | 45.0 |

Ra = arithmetic average deviation of the absolute values of the roughness profile from the mean line or centerline. Also know as the centerline average roughness (CLA). The centerline divides profiles, such that all areas above it equal all areas below it.
Rq = the root-mean-square or geometric average deviation of the roughness profile from the mean line measured in the sampling length.
Rz = the average height difference between the five highest and the five deepest valleys, within the sampling length, measured from a line parallel to the mean line.

TABLE 14

Perpendicular Profilometry Results

| SAMPLE 3 Average (um) | Ra | Rq | Rz |
|---|---|---|---|
| Mean | 3.1 | 3.7 | 19.2 |
| SD | 0.2 | 0.2 | 1.5 |
| Min | 2.9 | 3.5 | 17.4 |
| Max | 3.4 | 4.2 | 22.2 |
| Range | 0.5 | 1.6 | 8.7 |

Figure 31:
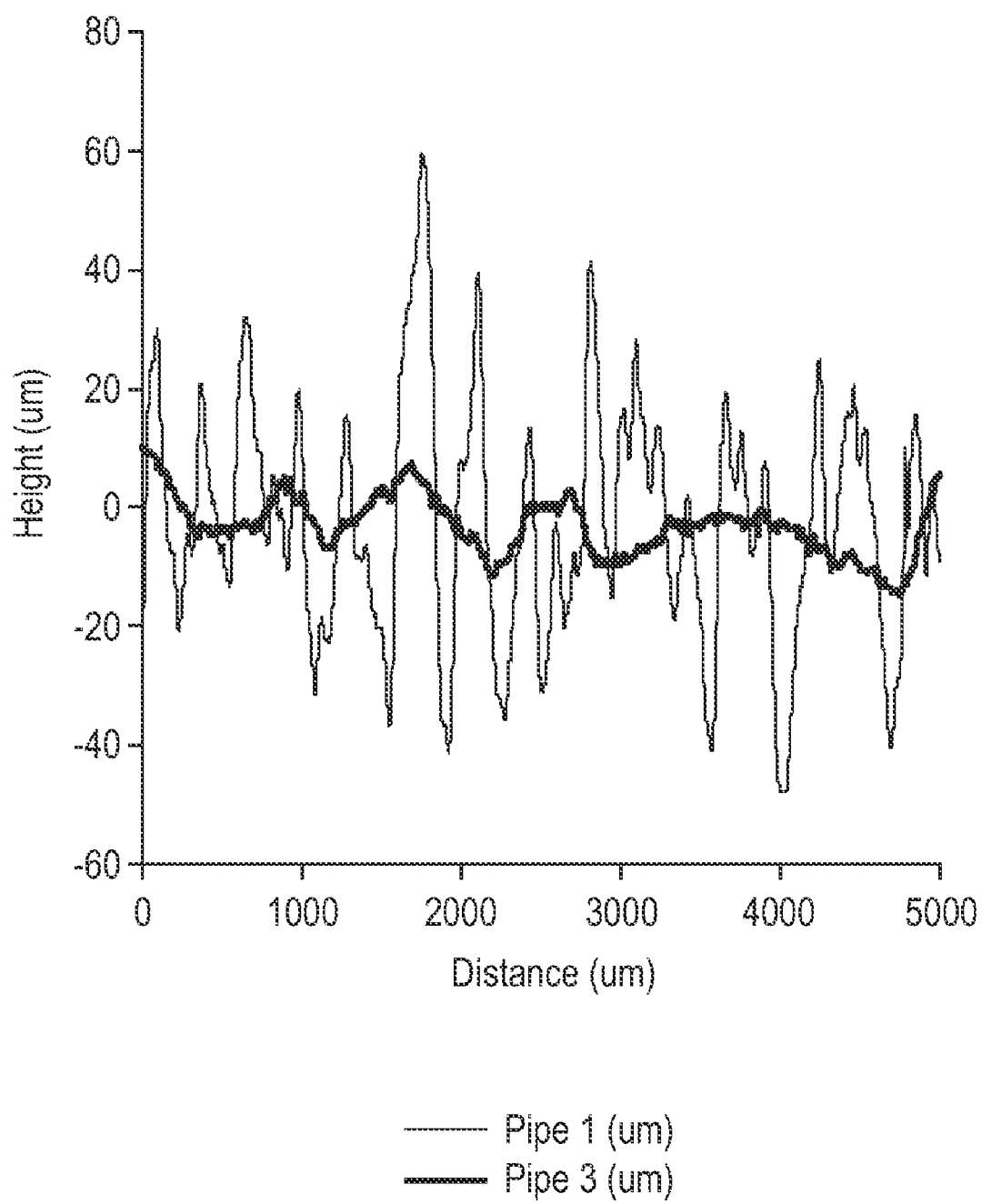
FIG. 31 depicts two representative line scans (average of 60 lines per sample) perpendicular to the machine direction (MD) in the manufacture of the pipe (pipe 3 is inventive and pipe 1 is comparative).
Figure 32:
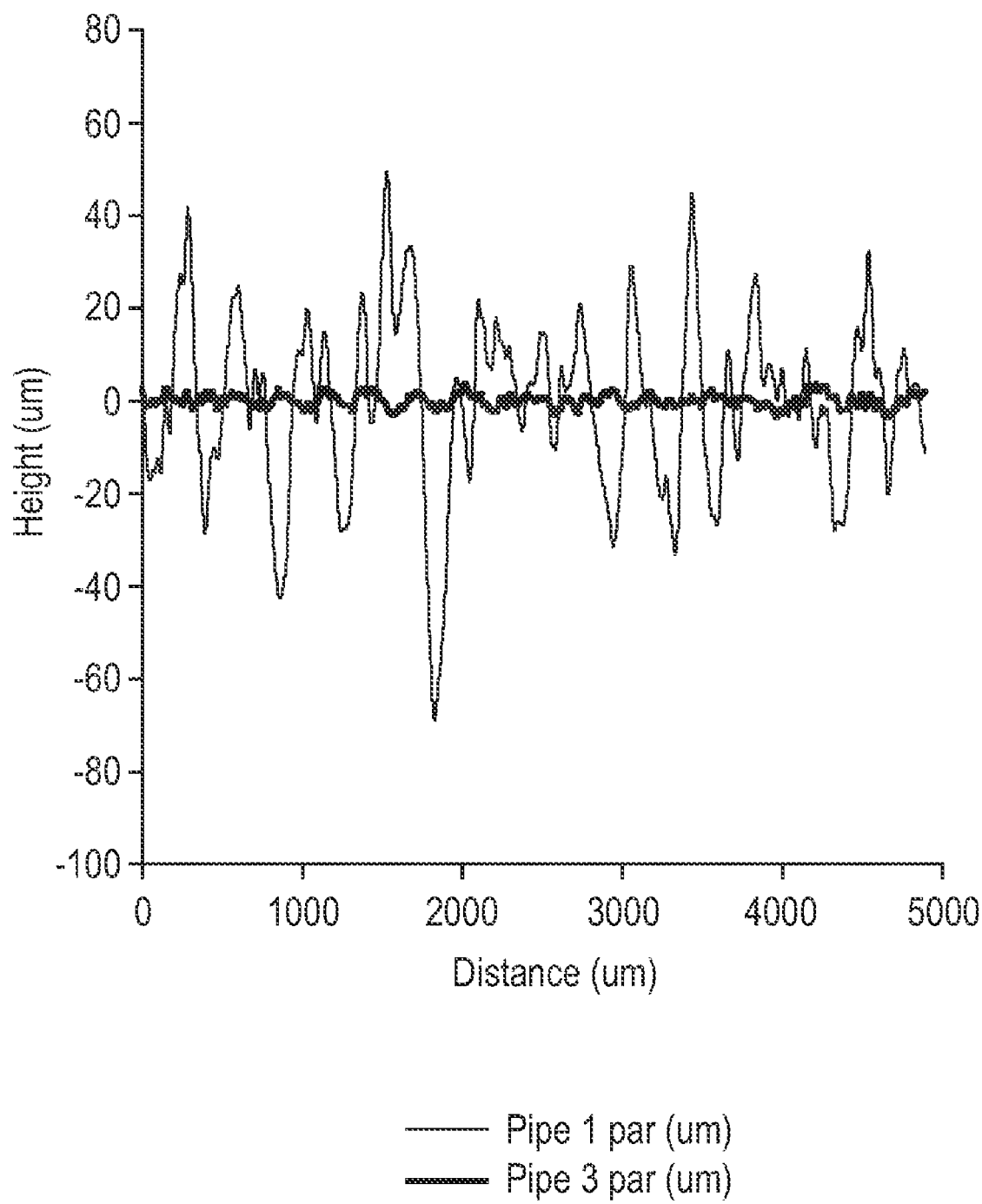
FIG. 32 depicts two representative line scans (average of 60 lines per sample) parallel to the machine direction (MD) in the manufacture of the pipe (pipe 3 is inventive and pipe 1 is comparative).

Representative line scans parallel to the MD are shown in FIG. 31. These lines were closest to the mean values of the 60 traces. Pipe 1 is again rougher, with frequent features and higher surface area. The average parallel profilometry results from all 60 line measurements on each pipe type are shown in Tables 15 and 16.

TABLE 15

Parallel Profilometry Results

| SAMPLE 1 Average (um) | Ra | Rq | Rz |
|---|---|---|---|
| Mean | 19.1 | 23.8 | 99.2 |
| SD | 1.7 | 2.1 | 8.2 |
| Min | 16.2 | 20.4 | 87.3 |
| Max | 21.5 | 27.0 | 112.4 |
| Range | 5.3 | 11.7 | 44.7 |

TABLE 16

Parallel Profilometry Results

| SAMPLE 3 Average (um) | Ra | Rq | Rz |
|---|---|---|---|
| Mean | 1.2 | 1.8 | 9.1 |
| SD | 0.2 | 0.8 | 3.4 |
| Min | 1.0 | 1.3 | 6.7 |
| Max | 1.7 | 4.0 | 17.7 |
| Range | 0.7 | 3.0 | 13.0 |

Pipe 3 has a much smoother interior surface compared to Pipe 1. The roughness of Pipe 3 is anisotropic, with a perpendicular to parallel roughness ratio of about 2.3, as compared to a ratio of 0.9 for Pipe 1.

In Transport Phenomena, Bird, R. B., Stewart, W. E., and Lightfoot, E. N., 1960, chapter 6, edition by John Wiley and Sons, there is a discussion on transport phenomena and the "friction factor". It is shown that the pressure drop is proportional to the friction factor. In turbulent flows, higher pressure drops are required for a given flow rate as the pipes become more rough. Also, in Perry's Chemical Engineering Handbook, Perry, Chilton, Kirkpatrick, Fourth Edition, Chapter 5, pages 5-19 to 5-24, published in 1963 by McGraw Hill Inc., the same dependency occurs for turbulent flows. For incompressible fluids, the "Fanning Friction Factor" is a function of the Reynolds number and the roughness of the channel inside surface, and methods to calculate pressure drop are provided. The same is true for compressible fluids. Thus, pipes with smoother interior surfaces are preferred in these situations.

The inventive compositions give pipes with smoother surfaces, and thus have utility in the field whether incompressible or compressible fluids are conveyed.

Pipe Coating

High Density Polyethylene (HDPE) has been used as top-coats for steel pipe coating for many years. The topcoat is the external layer of a typical 3-layer system composed on an epoxy layer adjacent to the steel pipe, a polyethylene with some functional groups used as an adhesive between the epoxy and the external layer that is typically a high density polyethylene. The thickness of each layer varies based on the type of material and applications, but is typically 50 to 75 microns for the epoxy, 125 to 150 microns for the adhesive and 500 microns to several millimeters for HDPE. The HDPE layer thickness is selected to withstand environmental conditions, especially during transportation and installation. The role of HDPE is to provide chemical and moisture barrier, mechanical protection and weather resistance. Harsher environmental conditions with extreme temperatures require HDPE that can perform in a temperature range of −50° C. to +40° C. The requirements are especially needed for very cold temperatures (−50° C.).

A inventive composition was tested for Charpy Impact resistance (ISO 179) over a temperature range of −40° C. to +20° C. to evaluate its impact versus commonly HDPE resins used by the steel pipe coating industry.

The inventive bimodal polyethylene resin, D2-4, had a melt index of 0.20 dg/min (by ASTM D1238; 190° C., 2.16 kg) and a density of 0.941 g/cc (ASTM D792 or ASTM D1505). Polymerization processes are shown in Tables 12A and 12B. The ATREF features of this resin are shown in Table 17 below. Additional property features of the resin are shown in Tables 18A and B.

TABLE 17

| ATREF Features of D2-4 | |
|---|---|
| ATREF HD fraction (%) | 75.2 |
| Temperature Minimum (° C.) | 86 |
| SCB portion | 13.7 |
| SCB portion minimum temperature (° C.) | 45 |
| SCB distribution Mv | 162200 |
| Aterf Purge (%) | 11.1 |
| Purge Mv | 153400 |
| ATREF Overall Mv Average | 161200 |
| ATREF Dv viscosity - temperature slope (70-90° C. region) | −0.012 |

TABLE 18A

| Resin Properties | | | | |
|---|---|---|---|---|
| Basic Property Data | ASTM Test | | CSA Z245.1 Requirements | D2-4 |
| Resin Type | | | MDPE | MDPE |
| MI2 | D-1238 | g/10 min | 0.1-1.0 | 0.17 |
| MI5 | D-1238 | g/10 min | | 0.63 |
| MI10 | D-1238 | g/10 min | | 2.2 |
| MI21 | D-1238 | g/10 min | | 10.7 |
| MI21/MI2 | | | | 62.9 |
| MI21-MI5 | | | | 17.0 |
| MI10/MI2 | | | | 12.9 |
| Density (ASTM) | D-792 | g/cc | | 0.9406 |
| | | Corrected | 0.925-0.940 | 0.9393 |
| Flexural Modulus @ 5% | D-790 | psi | | 138000 |
| Secant Modlus @ 2% | D-790 | psi | | 95000 |
| Secant Modulus @ 1% | D-790 | psi | | 113500 |
| Tensile Strength @ Break | D-638 | psi | | 5040 |
| % Elongation @ break | D-638 | | >600 | 950 |
| Yield Strength | D-638 | psi | >1800 | 2930 |
| % Elongation @ yield | D-638 | | | 7.1 |
| Vicat | D-1525 | Deg C. | 110 | 124.3 SD = 0.59 |
| Hardness | D2240 | Shore D | 50 | 63.7 SD = 0.59 |
| Brittleness Temperature | D-746 | Degrees C. | .>−70 | <−76 |
| ESCR | D-1693 Cond B | F50 hours | | >1727 hours |
| ESCR | D-1693 Cond C | F50 Hours | >300 | >1344 hours |

TABLE 18A-continued

Resin Properties

| Basic Property Data | ASTM Test | CSA Z245.1 Requirements | D2-4 |
|---|---|---|---|
| PENT | F-1473 | Hours | >5838 still testing |
| RCP* | ISO 13477 | Deg C. | Tc** = −1 at 6 bar internal pressure |
| Irganox 1010 | | ppm | 1500 |
| Irgafos 168 | | ppm | 1500 |
| UV 3529 | | ppm | 1670 |
| UV 531 | | ppm | 560 |

*RCP = Rapid Crack Propagation on 8 inch SDR 11 pipe, seized according to ASTM D-2513, and tested in accordance with ISO 13477-1997.
**Tc = Critical temperature at 6 bar internal pressure, as defined in ISO 13477

TABLE 18B

Resin Properties

| Basic Property Data | ASTM Test | CSA Z245.1 Requirements | D2-4 |
|---|---|---|---|
| Resin Type | | MDPE | MDPE |
| Conventional GPC Data | | | |
| Mn | | | 25000 |
| Mw | | | 197000 |
| Mw/Mn | | | 7.9 |
| Mz | | | 865000 |
| Absolute GPC Data | | | |
| Mn | | | 24500 |
| Mw | | | 222000 |
| Mw/Mn | | | 9.1 |
| Mz(BB) | | | 1114000 |
| Mz(abs) | | | 1461000 |
| Mz + 1 (BB) | | | 2513000 |
| Mz/Mw | | | 6.58 |
| g' | | | 0.986 |
| DMS Viscosity | | | |
| 0.01585 Sec−1 | Pa-s | | 57300 |
| 0.1 Sec−1 | Pa-s | | 40000 |
| 100 sec−1 | Pa-s | | 2028 |
| Ratio 0.01585/100 | Pa-s | | 28.2 |
| Ratio 0.1/100 | Pa-s | | 19.7 |
| DSC | | | |
| Melting Point (° C.) | | | 127.7 |
| Enthalpy (J/g) | | | 184.7 |
| Crystallization Point (° C.) | | | 116 |
| Enthalpy (J/g) | | | 183.9 |
| OIT @ 210 (° C.) | | | >100 minutes |
| OIT @ 220 (° C.) | | 10 minutes | 10.5 minutes |
| Thermal Stability (need >220 (° C.) | ASTM D-3350 | | 248.6 |

Charpy Impact Resistance test (ISO 179) for a temperature range of −40° C. to +23° C. for the inventive resin, as discussed above, and for five comparative resins. Samples A, B, C and D represent the commercial HDPE resins, typically sold for pipe topcoats. Some of the commercial resins were unimodal and some were bimodal. Dog bones were injection-molded according to procedure in ISO 179, and the Charpy Impact Resistance was measured from +23° C. to −40° C., at 20° C. intervals, on five dog bone specimens. XD-66 is a bimodal polyethylene resin made using a Z/N catalysts, gas phase technology process, and had a melt index (I2.16) of 0.3 and a density of 0.954 g/cc. The results are shown in Tables 19A and 19B.

TABLE 19A

Resin Properties

| | Sample A* | Sample B | Sample C | Sample D* | D2-4 | XD-66 |
|---|---|---|---|---|---|---|
| Density (g/cc) | 9.52* | 0.944 | 0.947 | 0.949 | 0.940 | 0.954 |
| MFI (g/10 min@190° C.) | 0.5 | 0.35 | 0.28 | 0.3 | 0.15 | 0.28 |
| Tensile Strength@23° C. (MPa) | 18.3 | 19 | 20 | 20 | 17 | 22 |
| Elongation@break 23° C. (%) | 844 | 860 | 867 | 850 | 756 | 689 |
| Tensile Strength@yield −50° C. (MPa) | 35 | 33 | 39 | 37 | 34 | 43 |
| Elongation@break −50° C. (%) | 90 | 127 | 56 | 100 | 116 | 27 |
| Charpy @ 23 C. (kJ/m2) | 78 | 47.4 | 39.1 | 28 | 125.4 | 67.8 |
| Standard Deviation (kJ/m2) | 1.7 | 1.8 | 1.6 | 0.7 | 1.6 | 1.6 |

TABLE 19A-continued

Resin Properties

| | Sample A* | Sample B | Sample C | Sample D* | D2-4 | XD-66 |
|---|---|---|---|---|---|---|
| Standard Deviation (%) | 2.2 | 3.8 | 4.1 | 2.5 | 1.3 | 2.4 |
| Charpy @ 0 C. (kJ/m2) | 61 | 25.2 | 25.2 | 14.4 | 130.6 | 49 |
| Standard Deviation (kJ/m2) | 1.3 | 1.2 | 2.5 | 0.8 | 6.1 | 3.6 |

Charpy Impact Test ISO 179.
*Samples were precompounded with black.
Note:
compound 7% of black masterbatch in the natural samples for sample preparation. Final carbon content: 2-2.5 wt %

TABLE 19B

Resin Properties

| | Sample A* | Sample B | Sample C | Sample D* | D2-4 | XD-66 |
|---|---|---|---|---|---|---|
| Charpy @ −10 C. (kJ/m2) | | | | | 93.3 | 39.3 |
| Standard Deviation (KJ/m2) | | | | | 4.8 | 3.1 |
| Standard Deviation (%) | | | | | 5.1 | 7.9. |
| Charpy @ −20 C. (kJ/m2) | 42 | 16.9 | 15.1 | 10.3 | 77.3 | 24.5 |
| Standard Deviation (kJ/m2) | 2.5 | 1.3 | 0.5 | 0.4 | 6.1 | 1.6 |
| Standard Deviation (%) | 5.9 | 7.7 | 3.3 | 3.9 | 7.9 | 6.5 |
| Charpy @ −30 C. (kJ/m2) | | | | | 68.4 | 21 |
| Standard Deviation (kJ/m2) | | | | | 1.7 | 4.5 |
| Standard Deviation (%) | | | | | 2.5 | 21.4 |
| Charpy @ −40 C. (kJ/m2) | 8 | 8.5 | 9.9 | 8 | 64.1 | 13.2 |
| Standard Deviation (kJ/m2) | 1.1 | 1.9 | 0.5 | 1 | 3.9 | 0.7 |
| Standard Deviation (%) | 13.8 | 22.3 | 5.1 | 12.5 | 6.1 | 5.3 |

Charpy Impact Test ISO 179.
*Samples were precompounded with black.
Note:
compound 7% of black masterbatch in the natural samples for sample preparation. Final carbon content: 2-2.5 wt %

Figure 33:
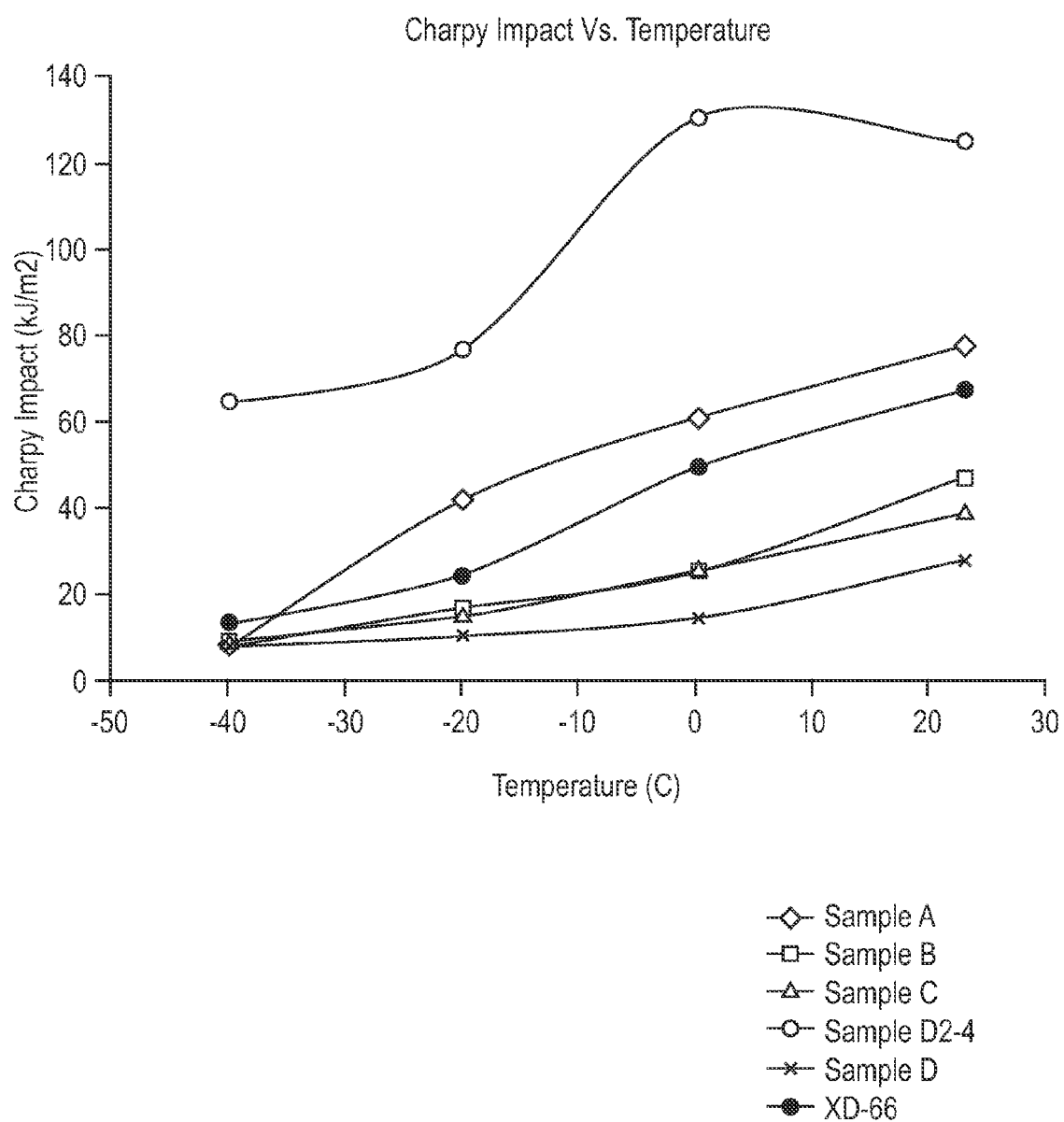
FIG. 33 depicts Charpy Impact versus Temperature (° C.) for an inventive composition (top profile) and five comparative compositions (lower profiles).

The Charpy Impact numbers of test specimens formed from the inventive composition were greater by 60% or more, as compared to those of a typical HDPE resin, over the whole range of temperature studied. Results are also shown in FIG. 33, in which the upper profile is D2-4, and lower profiles are the comparative samples.

What is claimed is:

1. A composition, comprising a blend, wherein said blend comprises a high molecular weight ethylene-based interpolymer and a low molecular weight ethylene-based interpolymer, and
wherein the high molecular weight ethylene-based interpolymer is a heterogeneously branched linear or a homogeneously branched linear ethylene-based interpolymer, and has a density from 0.922 g/cc to 0.929 g/cc, and a high load melt index (I21) from 0.2 g/10 min to 1.0 g/10 min, and
wherein the low molecular weight ethylene-based interpolymer is heterogeneously branched linear or a homogeneously branched linear ethylene-based interpolymer, and has a density from 0.940 g/cc to 0.955 g/cc, and a melt index (I2) from 6 g/10 min to 50 g/10 min; and
wherein the blend has a single peak in an ATREF profile eluting above 30° C., and has a coefficient of viscosity average molecular weight (CMv) less than −0.0032 in the log(calculated Mv) versus elution temperature, said CMv calculated in the range of elution temperatures from 70° C. to 90° C., and wherein Mv is the viscosity average molecular weight, and
wherein the composition has an I21/I2 ratio from 30 to 80 and a density less than, or equal to, 0.945 g/cc.

2. The composition of claim 1, wherein the high molecular weight ethylene interpolymer has a density from 0.9229 g/cc to 0.9271 g/cc.

3. The composition of claim 1, wherein the CMv is less than −0.0036.

4. The composition of claim 1, wherein the composition has a density from 0.930 g/cc to 0.945 g/cc.

5. The composition of claim 1, wherein the high molecular weight ethylene-based interpolymer is present in an amount from 45 to 55 weight percent, based on the sum weight of the high molecular weight ethylene-based interpolymer and the low molecular weight ethylene-based interpolymer.

6. The composition of claim 1, wherein the composition has a melt index, 12, from 0.05 g/10 min to 0.5 g/10 min.

7. The composition of claim 1, wherein the blend is an in-situ blend.

8. The composition of claim 1, wherein the high molecular weight ethylene-based interpolymer is a heterogeneously branched linear interpolymer.

9. The composition of claim 1, wherein the low molecular weight ethylene-based interpolymer is a heterogeneously branched linear interpolymer.

10. The composition of claim 1, wherein the blend has less than 0.5 vinyls/1000 carbon.

11. The composition of claim 1, wherein the high molecular weight component has a g' value of one or greater.

12. The composition of claim 1, wherein the high molecular weight ethylene-based interpolymer is an ethylene/α-olefin interpolymer.

13. The composition of claim 12, wherein the α-olefin is selected from the group consisting of C3 to C10 α-olefins.

14. The composition of claim 13, wherein the α-olefin is selected from the group consisting propylene, 1-butene, 1-pentene, 1-hexene, 1-heptene, 1-octene, 1-nonene and 1-decene.

15. The composition of claim 1, wherein the low molecular weight ethylene-based interpolymer is an ethylene/α-olefin interpolymer.

16. The composition of claim 15, wherein the α-olefin is selected from the group consisting of C3 to C10 α-olefins.

17. The composition of claim 16, wherein the α-olefin is selected from the group consisting propylene, 1-butene, 1-pentene, 1-hexene, 1-heptene, 1-octene, 1-nonene and 1-decene.

18. The composition of claim 1, further comprising from 1000 to 4000 ppm of one or more UV stabilizers, and from 1000 to 6000 ppm of one or more antioxidant/chlorine resistant additives.

19. An article comprising at least one component formed from the composition of claim 1.

20. The article of claim 19, wherein the article has a Charpy Impact, at 23° C., greater than, or equal to, 80 kJ/m², as determined by ISO 179 (version 2000).

21. The article of claim 19, wherein the article meets all the requirements of CSA Z245.1, and has a Charpy Impact, at 23° C., greater than, or equal to, 80 kJ/m², as determined by ISO 179 (version 2000).

22. The article of claim 19, wherein the article is a blow molded article.

23. The article of claim 19, wherein the article is an injection molded article.

24. The article of claim 19, wherein the article is a geomembrane.

25. The article of claim 19, wherein the article has a PENT greater than 1000 hours.

26. The article of claim 19, wherein the article has a PENT greater than 3000 hours.

27. The article of claim 19, wherein the article has a PENT greater than 5000 hours.

28. The article of claim 19, wherein the article has a PENT greater than 9000 hours.

29. A pipe comprising at least one component formed from the composition of claims 1.

30. The pipe of claim 29, wherein the pipe is an 8 inch SDR 11 pipe, sized according to ASTM D-2513-07, and has a rapid crack propagation critical temperature, Tc, less than 0° C., at a 6 bar internal pressure, in accordance with ISO method 13477.

31. The pipe of claim 29, wherein the pipe is an 8 inch SDR 11 pipe, sized according to ASTM D-2513-07, and has a rapid crack propagation critical temperature, Tc, less than 5° C., at a 6 bar internal pressure, in accordance with ISO method 13477.

32. The pipe of claim 29, wherein the pipe has an average perpendicular profilometry Ra value less than 10.

33. The pipe of claim 32, wherein the pipe has an average parallel profilometry Ra value less than 10.

34. The pipe of claim 29, wherein the pipe has a 60° C. Burst Performance that meets the 1000 psi hydrostatic design basis, in accordance with ASTM D-2837-04.

35. The pipe of claim 29, wherein the pipe has a 60° C. Burst Performance that meets the 1000 psi hydrostatic design basis, in accordance with ASTM D-2837-04, and wherein the pipe passes the primary 60° C. burst validation test protocol as per PPI TR#3, section F.4.1.2 (2003 version), and has maintained burst performance at 90° C. and 690 psi hoop stress, for over 3800 hours, without failure.

36. The pipe of claim 29, wherein the pipe is colored with one or more colors selected from the group consisting of white, yellow, orange, tan and black.

37. The pipe of claim 29, wherein the pipe is colored with black with yellow markings, or with one or more tan stripes.

38. The pipe of claim 29, wherein the pipe is a natural gas pipe.

39. The pipe of claim 38, wherein pipe is colored with at least one color selected from the group consisting white, yellow, orange, tan or black with yellow, orange, tan stripes, and combinations thereof.

40. The pipe of claim 29, wherein the pipe is an 8 inch SDR 11 pipe, sized according to ASTM D-2513-07, and has a rapid crack propagation critical temperature, Tc, less than 0° C., at a 6 bar internal pressure, in accordance with ISO method 13477, and wherein the pipe has a 60° C. Burst Performance that meets the 1000 psi hydrostatic design basis, in accordance with ASTM D-2837-04, and wherein the pipe passes the primary 60° C. burst validation test protocol as per PPI TR#3, section F.4.1.2 (2003 version), and has maintained burst performance at 90° C. and 690 psi hoop stress, for over 3800 hours, without failure.

41. A coating formed from the composition of claim 1.

42. The coating of claim 41, wherein the coating is a pipe coating.

43. The coating of claim 42, wherein the coating is a top coat for a steel pipe.

44. The coating of claim 41, wherein the composition has a Charpy impact at 23° C. greater than, or equal to, 80 kJ/m² as determined by ISO 179 (version 2000).

45. The coating of claim 41, wherein the composition has a Charpy impact at 0° C. greater than, or equal to, 70 kJ/m², as determined by ISO 179 (version 2000).

46. The coating of claim 41, wherein the composition has a Charpy impact at −20° C. greater than, or equal to, 50 kJ/m², as determined by ISO 179 (version 2000).

47. The coating of claim 41, wherein the composition has a Charpy impact at −40° C. greater than, or equal to, 20 kJ/m², as determined by ISO 179 (version 2000).

* * * * *